(12) United States Patent
Hollis et al.

(10) Patent No.: US 8,707,947 B2
(45) Date of Patent: Apr. 29, 2014

(54) SOLAR COLLECTOR

(75) Inventors: Stephen Hollis, Stanmore (AU);
Richard Howard Gentle, Wahroonga (AU)

(73) Assignee: Solfast Pty Ltd, Sydney (AU)

( * ) Notice: Subject to any disclaimer, the term of this patent is extended or adjusted under 35 U.S.C. 154(b) by 223 days.

(21) Appl. No.: 13/058,270

(22) PCT Filed: Sep. 25, 2009

(86) PCT No.: PCT/AU2009/001278
§ 371 (c)(1),
(2), (4) Date: May 9, 2011

(87) PCT Pub. No.: WO2010/034071
PCT Pub. Date: Apr. 1, 2010

(65) Prior Publication Data
US 2011/0203573 A1 Aug. 25, 2011

(30) Foreign Application Priority Data

Sep. 25, 2008 (AU) ................................ 2008905010
Sep. 25, 2008 (AU) ................................ 2008905011

(51) Int. Cl.
*F24J 2/40* (2006.01)
(52) U.S. Cl.
USPC ........................................................ 126/595
(58) Field of Classification Search
USPC ................................................. 126/595, 271
See application file for complete search history.

(56) References Cited

U.S. PATENT DOCUMENTS

| 4,033,118 | A | | 7/1977 | Powell |
|4,129,117|A||12/1978|Harvey|
|4,219,011|A||8/1980|Knoos|
|4,280,482|A||7/1981|Nilsson, Sr.|
|4,343,294|A|*|8/1982|Daniel .......................... 126/576|
|4,364,374|A||12/1982|Brazzola|
|4,449,514|A||5/1984|Selcuk|
|5,228,293|A||7/1993|Vitale|
|6,630,622|B2||10/2003|Konold|
|7,199,830|B1|*|4/2007|Tanaka et al. ................ 348/362|
|8,056,341|B2|*|11/2011|Hamer et al. .................. 60/659|
|8,378,280|B2|*|2/2013|Mills et al. ................ 250/203.4|

(Continued)

FOREIGN PATENT DOCUMENTS

| BR | 7903968 | 6/1979 |
| RU | 1776933 A1 | 11/1992 |

(Continued)

OTHER PUBLICATIONS

PCT International Search Report and Written Opinion, PCT Application No. PCT/AU2009/001278, Dec. 10, 2009, 16 pages.

(Continued)

*Primary Examiner* — Kenneth Rinehart
*Assistant Examiner* — Gajanan M Prabhu
(74) *Attorney, Agent, or Firm* — Fenwick & West LLP

(57) ABSTRACT

The invention relates to a solar collector. The collector has a heat regulating medium which defines a cavity therein. An aperture communicates with the cavity so as to allow solar energy incident on the aperture to enter the cavity. An energy collection device is disposed in the cavity and in thermal contact with the heat regulating medium to collect solar energy entering the cavity.

25 Claims, 26 Drawing Sheets

(56) References Cited

U.S. PATENT DOCUMENTS

| | | | |
|---|---|---|---|
| 2008/0184990 A1* | 8/2008 | Tuchelt | 126/684 |
| 2009/0121495 A1 | 5/2009 | Mills | |
| 2009/0322089 A1 | 12/2009 | Mills et al. | |
| 2010/0006087 A1* | 1/2010 | Gilon et al. | 126/572 |
| 2010/0236763 A1* | 9/2010 | Torok | 165/121 |

FOREIGN PATENT DOCUMENTS

| | | |
|---|---|---|
| WO | WO 00/14457 A1 | 3/2000 |
| WO | WO 2006/112747 A1 | 10/2006 |
| WO | WO 2008/153922 A1 | 12/2008 |
| WO | WO 2008/153946 A2 | 12/2008 |

OTHER PUBLICATIONS

PCT International Preliminary Report on Patentability, PCT Application No. PCT/AU2009/001278, Sep. 28, 2010, 30 pages.

European Supplementary Search Report, European Application No. 09815492, Dec. 6, 2013, 5 pages.

* cited by examiner

SOLAR COLLECTOR

TECHNICAL FIELD

The present invention relates to a device for collecting and regulating solar energy.

BACKGROUND OF THE INVENTION

There exists a well recognized need worldwide to increase the use of renewable energy sources and reduce the amount of fossil fuels consumed in energy production.

There are a number of barriers to the increased use of renewable energy. The major barriers are that renewable energy sources are, in the main, costlier than other energy sources, are not available at the times required and are of variable quality. Hence there exists a need for regulating systems which can help bridge the time gap between availability and demand and also maintain the quality of the electricity produced from renewable sources. In this way the renewable energy would become more inherently valuable. Adding value to renewable energy by improving its quality and making it available on demand would substantially help to overcome the higher capital cost of systems and the cost of production. This would then facilitate the increased use of renewable sources.

Currently, solar power systems fall into two categories:—

1) Photovoltaic (PV) systems, in which solar energy is absorbed into materials that convert the suns rays directly into electricity;

2) Concentrating Solar Power (CSP), in which solar energy is used to heat a fluid and that heated fluid is used to directly or indirectly drive a mechanical device (such as a turbine) to convert the heat energy into electrical energy. To enable solar radiation to be used as heat for a thermodynamic cycle to produce process steam or electricity, it must be first concentrated to achieve higher temperatures, as solar radiation reaches the earth at a density too low to produce such temperatures.

Systems currently in use include:—

Trough type linear collector systems, which comprise a linear reflector, parabolic in cross, section, and one collector tube running along the focal point of the parabola in each reflector. This tube contains a fluid which is heated. The heated fluid is then pumped to a heat engine (e.g. a turbine) which it drives directly (if the collector fluid is water/steam) or through a heat exchanger (if the collector fluid is oil);

"Fresnel" type linear collector systems, which comprise multiple flat linear reflectors, all at different angles, to simulate a large parabolic shape with one collector tube set high above the multiple reflectors also collecting energy in a fluid in the tube as above.

It is a feature of these linear systems that maximum temperatures consistently achievable are in the range of 350° C., which means that the heat engines operate at low efficiency levels, i.e. in the 250° C. to 300° C. range.

In order to achieve higher temperatures, and to be able to run more efficient heat engines, systems in use include:

Single High Towers which collect solar energy concentrated to a target from a large number of flat mirrors which track the sun and focus the large number of images at one collection point, where the high temperatures achieved are used to heat a fluid which is transmitted to an engine and converted to electricity;

Dish/Engine systems, where a small heat engine is placed at the focal point of a parabolic dish and driven directly by the concentrated solar energy;

Multi tower solar thermal systems where a number of smeller towers are used to collect the solar energy in a similar way to the high towers, but the mirrors can also be curved, so that the concentration of the energy is much greater and high temperatures (over 1000° C.) are achieved with less mirrors per tower.

In each of these systems the solar energy if not used immediately has to be used as it is collected or the hot fluid conveyed away to a fluid based storage system, such as hot water, steam or molten salt, or a solid based storage system, such as hot rock, concrete or sand.

OBJECT OF THE INVENTION

It is an object of the present invention to substantially overcome or at least ameliorate one or more of the above disadvantages.

SUMMARY OF THE INVENTION

In a first aspect of the invention there is provided a solar collector comprising:
   a heat regulating medium defining a cavity therein and having an aperture communicating with the cavity for allowing solar energy incident on the aperture to enter the cavity through the aperture, and
   an energy collection device disposed in the cavity and in thermal contact with the heat regulating medium to collect solar energy entering the cavity.

The following options may be used in conjunction with the first aspect, either individually or in any suitable combination.

The heat regulating medium may be solid. It may comprise a high carbon content material. It may be synthetic graphite. It may be non synthetic graphite. It may comprise graphite, graphite particles, sythetic graphite or synthetic graphite particles or a combination thereof, embedded in a thermally conductive matrix. The thermally conductive matrix may comprise copper, gold, aluminium or silver, or a mixture or alloy of any two or more of these. If a mixture or alloy is used, it may be in any desired proportion of components. The non synthetic graphite or synthetic graphite may be at least about 95% pure. A thickness of the heat regulating medium may be between about 10 and about 1500 mm.

The energy collection device may be in physical contact with the heat regulating medium. The energy collection device may comprise stainless steel or other metal or alloy suitable for use at high temperatures, for example suitable for use at the operating temperature of the device. It may be, or may be in the form of, a layer, e.g. a layer having a thickness of about 1 to about 10 mm. The layer may cover substantially all of the inner surface of the cavity. The energy collection device may be capable of absorbing solar energy and converting it into heat. It may be capable of transferring the heat to the heat regulating medium.

The solar collector may comprise a protective layer on a surface of the energy collection device abutting the cavity. The protective layer may be about 1 to about 200 microns thick. The protective layer may comprise metal and/or ceramic. It may comprise aluminium metal. It may comprise alumina.

The protective layer may protect the energy collection device from damage e.g. physical damage or oxidative damage.

The solar collector may additionally comprise a heat exchanger in thermal contact with the heat regulating medium. The heat exchanger may comprise heat exchange tubing capable of accepting a heat transfer fluid. The heat exchange tubing may be at least partly embedded in the heat regulating medium. It may be at least about 50 mm from the energy collection layer. Different portions of the heat exchange tubing may be embedded in the heat regulating medium at different distances from the energy collection device. Portions of the heat exchanger may be distributed substantially evenly throughout the thickness of the heat regulating medium.

The heat exchange tubing may be coupled to a source of water or other suitable heat exchange fluid. In use, the heat exchanger tubing may be capable of withstanding an internal steam pressure (or pressure of other heated heat exchange fluid, e.g. liquid water) of up to a pressure between about 10 and about 200 bar (e.g. up to about 10 bar, or up to about 20, 30, 40, 50, 60, 70, 80, 90, 100, 120, 140, 160, 180 or 200 bar). The heat regulating medium may be formed from a plurality of adjoining heat regulator slabs. At least some of said portions may have grooves therein, whereby the heat exchanger tubing is disposed within said grooves.

The solar collector may additionally comprise a thermally insulating layer at least partially surrounding the heat regulating medium. The insulating layer may comprise a thermally insulating solid having pores and/or voids. The pores and/or voids may have an inert gas therein. The thermally insulating layer may comprise fibrous, granular or particulate insulation. The insulating layer may be coupled to a source of inert gas. The source of inert gas may be regulated or controlled. The source of inert gas may comprise a pressure control device for controlling a pressure of the inert gas in the insulating layer. The pressure control device may for example be capable of controlling the pressure of the inert gas in the insulating layer to slightly above atmospheric pressure. This may ensure that no oxygen or air is drawn into the insulating layer. The solar collector may therefore comprise an inert gas supply system coupled to the insulating layer for supplying the inert gas thereto. A suitable inert gas supply system comprises a source of inert gas coupled to the insulating layer, a controllable valve for controlling flow of the inert gas to the insulating layer and a gas pressure detector coupled to the insulating layer for detecting a pressure of gas therein, said detector being coupled to the controllable valve for controlling said valve.

The aperture of the solar collector may be surrounded by a lip comprising a high temperature lip material, i.e. a material which will withstand very high temperatures. This may be regarded as a high temperature resistant lip material The aperture may be lined by a high temperature aperture ceramic lining material. The high temperature lip material may be a high temperature ceramic lip material, i.e. it may be suitable for withstanding very high temperature operations. The high temperature lip material or lining material may be, or may comprise, silicon carbide, an alumina based fabric, tungsten, molybdenum, alumina, zirconia, zircon, aluminosilica (each independently being optionally in a fibrous or foamed form) or a mixture of any two or more of these.

The heat regulating medium may be located on a thermally insulating support. The thermally insulating support may comprise a ceramic material.

The heat regulating medium and, if present, the thermally insulating layer and the thermally insulating support, may be disposed within a housing. The housing may be constructed from steel or some other suitable material. The housing may be sealed against the energy collection device so as to form a substantially gas tight enclosure surrounding the heat regulating medium and, if present, the thermally insulating layer.

The solar collector may comprise a shield disposed below the housing for protecting a lower portion of the housing from damage by the reflected solar energy. The shield should have a shield aperture for allowing solar energy to pass through the shield into the cavity. A gap may be present between the housing and the shield. This may serve to allow heat to escape from the shield. The shield may comprise a plurality of ribs for improving the structural strength and for radiating heat from said shield. The ribs may extend radially from the shield aperture. The shield may be at least partially covered with ceramic insulation fibres to protect the surface of the shield. The shield may comprise stainless steel, aluminised mild steel or a combination of both. The shield may not only be disposed to protect the lower portion of the housing but also may be disposed to shield fire bricks facing into the cavity.

The solar collector may comprise a removable plug for restricting flow of a gas into and/or out of the cavity. The plug may be opaque to shier energy. It may be thermally insulating. It may be for example constructed from steel or some other material, optionally coated or partially coated with a thermally insulating material, for example a ceramic such as ceramic cloth. The plug may be disposed and/or shaped so as to be capable of being inserted into the aperture or, if present, the shield aperture. It may for example be circular, square, triangular, pentagonal, oval or some other suitable shape. The solar collector may comprise a plug insertion mechanism for inserting and removing the plug. Alternatively the plug may be manually insertable into the aperture or shield aperture. The plug insertion mechanism may be manually operable or may be as automatically operable. It may comprise for example a scissor lift type mechanism, a pneumatic ram or a hydraulic ram for raising the plug into place when required. The plug insertion mechanism may be coupled to a module controller. The module controller may be capable (e.g. may be programmed so as to be capable) of controlling the plug insertion mechanism so as to insert the plug at times when solar energy ceases to be directed to the aperture and to remove the plug at times shortly before solar energy commences to be directed to the aperture. This enables solar energy to enter the cavity when required. The plug restricts convective loss from the cavity when there is no solar energy input and/or serves to restrict re-irradiation of heat energy front the cavity at such times. This in turn serves to maintain the heat regulating medium and the cavity at a higher temperature for a longer time than would be the case without the plug.

In some cases the solar collector may have a plurality of apertures. Each aperture may communicate with a cavity in the heat regulating medium so as to allow solar energy incident on the aperture to enter the cavity through the aperture. In some cases, each aperture communicates with a different cavity in the heat regulating medium.

The solar collector may comprise at least one thermocouple for determining a temperature within the solar collector. Commonly the collector has between about 10 and about 40 thermocouples, or 10 to 30, 10 to 20, 20 to 30, 30 to 40 or 25 to 35 thermocouples, e.g. about 10, 12, 14, 16, 18, 20, 30, 40 or 50 thermocouples. These may be arranged symmetrically or may be arranged asymmetrically in the collector. The thermocouple, or at least one of the thermocouples, may be disposed in a location near or adjacent a position on the energy collection device which is capable of directly receiving solar energy from outside the cavity. It/they may be disposed in a lower portion of the solar collector. At least one thermocouple may be in contact with the energy collection device for measuring a temperature thereof. At least one thermocouple may be disposed in the heat regulating medium for determining a temperature thereof. There may be thermocouples disposed at different depths within the heat regulating medium. The thermocouple, or each thermocouple independently, may be disposed so as to be capable of measuring the temperature in a location selected from in the energy collection device, in the body of the heat regulating medium, on the outside of heat exchange tubing (if present) and in the thermally insulating layer (if present). Throughout this specification, it should be recognised that appropriate temperature measuring devices other than thermocouples may be used wherever thermocouples are indicated for use. Such suitable devices include non-contact thermometers and infra-red thermometers.

In an embodiment there is provided a solar collector comprising:
- a graphite heat regulating medium defining a cavity therein and having an aperture communicating with the cavity for allowing solar energy incident on the aperture to enter the cavity through the aperture,
- an energy collection device disposed in the cavity and in thermal contact with the heat regulating medium to collect solar energy entering the cavity; and
- a protective layer on a surface of the energy collection device abutting the cavity.

In another embodiment there is provided a solar collector comprising:
- a graphite heat regulating medium defining a cavity therein and having an aperture communicating with the cavity for allowing solar energy incident on the aperture to enter the cavity through the aperture,
- a lip comprising a high temperature lip material surrounding the aperture;
- an energy collection device disposed in the cavity and in thermal contact with the heat regulating medium to collect solar energy entering the cavity;
- a protective layer on a surface of the energy collection device abutting the cavity; and
- a heat exchanger in thermal contact with the heat regulating medium, said to heat exchanger comprising heat exchange tubing capable of accepting a heat transfer fluid.

In another embodiment there is provided a solar collector comprising:
- a graphite heat regulating medium defining a cavity therein and having an aperture communicating with the cavity for allowing solar energy incident on the aperture to enter the cavity through the aperture;
- a thermally insulating layer at least partially surrounding the heat regulating medium;
- a lip comprising a high temperature lip material surrounding the aperture;
- an energy collection device disposed in the cavity and in thermal contact with the heat regulating medium to collect solar energy entering the cavity;
- a protective layer on a surface of the energy collection device abutting the cavity; and
- a heat exchanger in thermal contact with the heat regulating medium, said heat exchanger comprising heat exchange tubing capable of accepting a heat transfer fluid.

In another embodiment there is provided a solar collector comprising:
- a heat regulating medium defining a cavity therein and having an aperture communicating with the cavity for allowing solar energy incident on the aperture to enter the cavity through the aperture,
- an energy collection device disposed in the cavity and in thermal contact with the heat regulating medium to collect solar energy entering the cavity,
- a heat exchanger comprising heat exchange tubing capable of accepting a heat transfer fluid, said heat exchange tubing being least partly embedded in the heat regulating medium,
- a thermally insulating layer at least partially surrounding the heat regulating medium, said layer being optionally coupled to an inert gas supply system for supplying an inert gas thereto, and
- a housing surrounding the heat regulating medium and the thermally insulating layer, said housing being sealed against the energy collection device so as to form a substantially gas tight enclosure surrounding the heat regulating medium and the thermally insulating layer.

This embodiment may comprise a shield disposed below the housing for protecting a lower portion of the housing from reflected solar energy, said shield having a shield aperture for allowing solar energy to pass through the shield into the cavity. It may, have a removable plug which is insertable into either the aperture or (if present) the shield aperture, optionally with a plug insertion mechanism for inserting and removing the plug. It may comprise one or more thermocouples for determining a temperature at one or more locations within the solar collector. It may comprise any two or all of the shield, the plug (optionally with insertion mechanism) and the one or more thermocouples.

In a second aspect of the invention there is provided a solar energy collection device comprising:
- a solar collector according to the first aspect; and
- a solar energy concentrator capable of concentrating solar energy and disposed so as to be capable of directing the concentrated solar energy through the aperture of the solar collector and into the cavity.

The following options may be used in conjunction with the second aspect, either individually or in any suitable combination.

The solar energy concentrator may comprise at least one reflector. It may comprise an array of reflectors. It may additionally comprise a tracking device for moving the solar energy concentrator or one or more parts thereof so as to direct the concentrated solar energy through the aperture of the solar collector and into the cavity thereof. The reflector may be a mirror. It may be heliostat.

The aperture of the solar collector may be directed downwards. The reflectors may be located at a lower height than the aperture. They may be located to the side of solar collector. They may be located to the side of the solar collector at a lower height than the solar collector.

The solar collector may be mounted at a height of about 5 to about 20 m, or about 5 to about 30 m, above the ground. It may be mounted at a height of at least about 15 m above ground. It may comprise a support structure, e.g. a tower, on which the solar collector is mounted. The support structure may comprise a tower. The solar collector may be mounted on said tower by means of at least three, optionally four, substantially, vertical poles.

The solar concentrator may comprise an array of reflectors. The array may comprise one corridor corresponding to each of the substantially vertical poles. The corridors may have no reflectors therein, whereby the array is capable of directing the concentrated solar energy between the poles and through the aperture. The array may be capable of directing the concentrated solar energy between the poles without substantial amounts of solar energy onto the poles. This serves to prevent damage to the poles from the concentrated solar energy. Each of the poles may be at least partially surrounded by a protector so as to protect said pole from damage from the concentrated solar energy from the array of reflectors. The protector may comprise a thermal insulator. Alternatively or additionally the pole may be treated or coated so as to protect the pole from damage from the concentrated solar energy.

At least one of the poles may be hollow. Heat transfer fluid may pass through the hollow pole into heat exchanger tubing of the solar collector (if present). Steam (or high temperature heat transfer fluid such as water) formed (or heated) in the heat exchanger tubing of the solar collector (if present) may pass through the hollow pole (preferably through a conduit disposed in the hollow pole). Electrical connections for conveying a signal from one or more thermocouples in the solar collector to a module controller (if these are present) may pass through the hollow pole.

The solar energy collection device may comprise a module controller for controlling the operation of the solar collection device. The module controller may comprise the tracking device described previously. The module controller may be capable of controlling at least one of (i) movement of the solar collection device so as to direct the concentrated solar energy through the aperture of the solar collector and into the cavity if required, or so as to place the solar collection deviser, or at least one reflector of said solar collection device, in a non-collecting orientation if required;

(ii) insertion or removal of a plug (if present) into the aperture or into a shield aperture (if present);

(iii) water inflow into the collector; and (iv) hot water or steam outflow from the collector.

The solar collector of the device may comprise at least one thermocouple for determining a temperature within the solar collector. The thermocouples may be configured to provide a temperature related signal to the module controller for controlling the operation of the solar collection device. Suitable thermocouples have been described above.

The solar energy collection device may comprise a heat exchanger in thermal contact, optionally in direct contact, with the heat regulating medium. The heat exchanger may be coupled to an electricity generator which is capable of being powered by a heated heat transfer fluid, so that, in use, solar energy incident on the aperture of the concentrator is transmitted in the form of heat to a heat transfer fluid in the heat exchanger, which heat exchange fluid is transferred to the electricity generator so as to generate electricity. Alternatively, if industrial steam and/or hot water applications are required, the heat exchange fluid may be transferred to a location so that it may be used, for example in a boiler. In this specification the terms "heat exchange fluid" and "heat transfer fluid" may be used interchangeably and should be taken to encompass the same range of materials.

Using a heat exchanger, the steam or hot water may be used to preheat boiler water but a more common use is for generating process steam. A heat exchanger may be used to produce steam for heating or drying products.

The solar energy collection device may comprise a heat transfer fluid circuit comprising a first heat exchanger in thermal contact with the heat regulating medium and a second heat exchanger external to the heat regulating medium. The second heat exchanger may be configured such that, in use, heat transfer fluid passes from an outlet of the first heat exchanger to an inlet of the second heat exchanger. The second heat exchanger may be configured such that, in use, the heat transfer fluid passes from an outlet of the second heat exchanger to an inlet of the first heat exchanger, whereby the heat transfer fluid circuit is a closed loop system. The second heat exchanger may be designed for generating steam.

The heat transfer fluid may be water, which, in use, may be heated to a high temperature and/or converted to steam as it passes through the first heat exchanger. The steam may be condensed to form water prior to reentering the first heat exchanger. The solar energy collection device may comprise a water purifier, e.g. a reverse osmosis system and/or a deioniser, for purifying the water prior to said water entering the first heat exchanger. The water purifier may be capable of purifying the water to a purity of at least about 99%, or at least about 99.9% on a weight/volume basis, in some cases to a purity of 99.99999%. Typically a reverse osmosis system will remove up to about 98% of dissolved solids. If this is followed by a deioniser (ion exchanger) the water may be improved to about 20 ppb dissolved solids.

The second heat exchanger may be coupled to either an electricity generator or a boiler for generating steam, and in the case in which high temperature water is produced may be coupled to a device which regulates the temperature and pressure of said water for use in industrial applications. It may be designed for generating steam. This may be accomplished by passing water through a tube of the second heat exchanger.

The said second heat exchanger system may or may not use water which has not been purified as described above.

The solar energy collection device may be capable of providing an energy output which drops by no more than 5% when solar energy incident on the solar energy concentrator is blocked for no more than minute. It may be capable of providing an energy output which drops by no more than 10% when solar energy incident on the solar energy concentrator is blocked for no more than about 16 hours. The thickness of the heat regulating medium and/or the heat capacity of the heat regulating medium may be such that the above criteria are met. The device may be used to regulate the time that the solar energy can be used to generate electricity or to produce steam or high temperature hot water for industrial or other purposes.

In an embodiment there is provided a solar energy collection device comprising:

a solar collector comprising:

a graphite heat regulating medium defining a cavity therein and having an aperture communicating with the cavity for allowing solar energy incident on the aperture to enter the cavity through the aperture;

a thermally insulating layer at least partially surrounding the heat regulating medium;

a lip comprising a high temperature lip material surrounding the aperture;

an energy collection device disposed in the cavity and in thermal contact with the heat regulating medium to collect solar energy entering the cavity;

a protective layer on a surface of the energy collection device abutting the cavity; and a heat exchanger in thermal contact with the heat regulating medium, said heat exchanger comprising heat exchange tubing capable of accepting a heat transfer fluid; and a solar energy concentrator capable of concentrating solar energy and disposed so as to be capable of directing the concentrated solar energy through the aperture of the solar collector and into the cavity.

In another embodiment there is provided a solar energy collection device comprising:

a solar collector comprising:

a graphite heat regulating medium defining a cavity therein and having an aperture communicating with the cavity for allowing solar energy incident on the aperture to enter the cavity through the aperture;

a thermally insulating layer at least partially surrounding the heat regulating medium;

a lip comprising a high temperature lip material surrounding the aperture;

an energy collection device disposed in the cavity and in thermal contact with the heat regulating medium to collect solar energy entering the cavity;

a protective layer on a surface of the energy collection device abutting the cavity; and a heat exchanger in thermal contact with the heat regulating medium, said heat exchanger comprising heat exchange tubing capable of accepting a heat transfer fluid; and a solar energy concentrator capable of concentrating solar energy and disposed so as to be capable of directing the concentrated solar energy through the aperture of the solar collector and into the cavity, said concentrator comprising an array of reflectors and a tracking device for moving the reflectors so as to direct the concentrated solar energy through the aperture of the solar collector and into the cavity thereof.

In another embodiment there is provided a solar energy collection device comprising:

a solar collector according to the first aspect;

a tower on which the solar collector is mounted by means of at least three, optionally four, substantially vertical poles;

a solar energy concentrator capable of concentrating solar energy and disposed so as to be capable of directing the concentrated solar energy through the aperture of the solar collector and into the cavity, said concentrator comprising an array of reflectors having one corridor having no reflectors therein corresponding to each of the substantially vertical poles, whereby the array is capable of directing the concentrated solar energy between the poles without directing substantial amounts of solar energy onto the poles;

a module controller for controlling the operation of the solar collection device.

In a third aspect of the invention there is provided a solar energy collection system comprising a plurality of solar energy collectors, each being according to the first aspect (as described above), and at least one solar energy concentrator. Each solar energy collector is disposed so as to be capable of receiving concentrated solar energy from at least one solar energy concentrator.

The following options maybe used in conjunction with the third aspect, either individually or in any suitable combination.

The solar energy collection system may comprise only one solar energy concentrator. The solar energy concentrator may be disposed so as to be capable of directing concentrated solar energy to the aperture of at least one of said solar energy collectors when solar energy impacts on said solar energy concentrator, optionally to the aperture of each collector (although not necessarily concurrently).

The solar energy concentrator may comprise an array of solar reflectors.

The solar energy collection system may comprise a plurality of solar energy collection devices, said devices each being according to the second aspect (as described above). These devices may be coupled so as to generate a single system energy output.

At least some, optionally all, of the solar energy collection devices may be connected in series. At least some, optionally all, may be connected in parallel. In some embodiments some of the solar collection devices are connected in series and some in parallel.

The solar energy collection system may be such that each solar energy collection device is coupled to a separate corresponding electricity generator which is capable of being powered by a heated heat transfer fluid. In use, solar energy incident on the solar energy concentrator of each solar energy collection device may be transmitted in the form of heat to the heat transfer fluid, which is transferred to the corresponding electricity generator so as to generate electrical energy or for industrial or other uses. The electrical energy from said generators, or the steam or the high temperature hot water, may be combined to provide the single system energy output.

The solar energy collection system may be such that all of the solar energy collection devices are coupled, to one electricity generator, or steam or hot water output in the case of industrial steam or high temperature hot water. In use, solar energy incident on the solar energy concentrator of each solar energy collection device may be transmitted in the form of heat to the heat transfer fluid, which is transferred to the electricity generator so as to generate electrical energy, or to a location for use (e.g. including a boiler) in the case of industrial steam or high temperature hot water, which represents the single system energy output.

The system may additionally comprise a tracking device, or more than one tracking device, for moving the solar energy concentrators or parts thereof so as to direct the concentrated solar energy through the apertures of the solar collectors and into the cavities thereof.

Each solar energy collection device of the system may comprise a heat transfer fluid circuit comprising a first heat exchanger in thermal contact with the heat regulating medium and external heat exchanger tubing which is external to the heat regulating medium. The external heat exchanger tubing may be configured such that, in use, heat transfer fluid passes from an outlet of the first heat exchanger to an inlet of the external heat exchanger tubing and from an outlet of the second heat exchanger to an inlet of the first heat exchanger, whereby the heat transfer fluid circuit is a closed loop system. The external heat exchanger tubings of the solar energy collection devices may form part of a system heat exchanger for transferring heat energy from the solar energy collection devices to a second fluid.

The external heat exchanger tubing may be coupled to a turbine which in turn is coupled to an electricity generator (ac or dc) for generating electricity or to a device for using steam or hot water (e.g. a boiler) in the case of industrial steam or high temperature hot water. It may be coupled to a steam generator (e.g. boiler) for converting liquid water to steam. In some instances a mixture of steam and high temperature hot water are produced.

Water to be used in a closed loop system should be of very high purity. Commonly it is purified by means of a reverse osmosis system. It is then sent to a holding tank (also called condensate tank). If additional make up water is required (e.g. to make up for losses due to minor leaks, evaporation etc.) this may also be purified, for example using reverse osmosis optionally together with deionising, before being added to the holding tank.

With electrical generation, the steam used in the turbine goes firstly to a condenser which condenses it to form liquid water, which is then fed back to the condensate tank for reuse. This may in some oases go via a two heat exchanger system (one in the solar collector and one external thereto) if that is the desired means of managing the steam quality output. In either case, the water goes via a condenser to the holding tank for reuse. Before it is reused, shortly after it exits the condensate tank to return to first heat exchanger, the water may pass through a "polishing" process to remove accumulated impurities. A suitable polishing process is a deionising process.

With industrial steam or high temperature hot water applications, the internal heat exchanger system in the solar collector operates in the same manner as described above, however the second heat exchanger may or may not be used for the same purpose as electrical generation or steam quality control described above. The second heat exchanger may be located in a boiler system in which hot water and/or steam from the first heat exchanger is used to heat the boiler fluid (which may be water or some other suitable fluid). The second heat exchanger may be located in the boiler and may contain less pure water than that used in the closed loop and which may be used, for example, for process applications. It may be used in high pressure applications. This water is not recovered in the systems of, the present invention. The water may be briny water or some other low quality water. However the reuse of the first heat exchanger water (i.e. the high purity water in the closed loop) is as described above for an electrical generation cycle. In some cases, therefore, the second fluid is water, whereby the system produces steam in the second heat exchanger.

The solar energy collection system may comprise a station controller for controlling the solar energy collection devices and/or the solar energy concentrator(s). The controller may be coupled to the solar energy concentrator(s) so as to increase or decrease the total solar energy input to the solar energy collectors as required. This may be achieved for example by manoeuvring one or more of the solar energy concentrators:

In a fourth aspect of the invention there is provided a method for collecting and regulating solar energy, said method comprising:

a) providing a solar energy collection device according to the third aspect; and b) allowing solar energy to impinge on the solar energy concentrator of said device; thereby concentrating said solar energy on the solar collector of said device so as to heat the heat regulating medium of said device.

The following options may be used in conjunction with the fourth aspect, either individually or in any suitable combination.

The method may comprise moving the solar energy concentrator(s) or a part thereof by means of a tracking device so as to direct the solar energy through the aperture of the solar collector.

Step a) (above) may comprise controlling the solar energy concentrator(s) so as to direct concentrated solar energy into the aperture. The solar energy concentrator(s) may comprise an array of reflectors in which case the step of controlling may comprise detecting a temperature at a position within the solar energy collector and, if necessary, orienting at least one of said reflectors to a non-collecting orientation so as to prevent said temperature exceeding a predetermined upper limit. The upper limit may be predetermined in order to prevent damage to materials of the solar energy collector. It may be predetermined to improve efficiency of the collector. The method may comprise passing a temperature related signal from one or more thermocouples disposed in the solar energy collector to a module controller. If necessary, a control signal may be generated in said module controller and sent to one or more motors. Each of the motors is coupled to one of the reflectors. This enables control of the orientation of the reflectors.

The method may additionally comprise controlling the solar energy concentrator(s) so that said concentrator(s) is (are) in a non-collecting orientation and inserting a plug so as to restrict loss of heat from the cavity of the solar energy collector when it is desired not to collect solar energy. In the case where the solar concentrator comprises a plurality of reflectors, the non-concentrating orientation may be one in which said reflectors are in a substantially horizontal orientation. This minimises the chance of damage to the reflectors from high wind gusts when they are not in use. The plug may be inserted into the aperture of the solar energy collector or into the shield aperture in the shield (if present).

The method may additionally comprise removing the plug so as to allow concentrated thermal energy to enter the cavity through the aperture and controlling the solar energy concentrator so that said concentrator is in a collecting orientation in which it directs concentrated solar energy through the aperture into the cavity, when it is again desired to collect solar energy.

The method may comprise passing a heat transfer fluid through heat exchanger tubing disposed within the heat regulating medium so as to heat said heat transfer fluid. The heated heat transfer fluid may then be passed to a second heat exchanger so as to heat a second heat transfer fluid in said second heat exchanger. The heated second heat transfer fluid may then be used to generate electricity or to generate steam or high temperature hot water.

The solar energy collection device may be controlled so as to generate steam or high temperature hot water of substantially constant temperature, pressure and flow rate.

The heat exchanger tubing and second heat exchanger may form parts of a closed loop whereby the heat transfer fluid is returned from the second heat exchanger to the heat exchanger tubing. The heat transfer fluid may be purified before it is returned to the heat exchanger tubing. The purification may be for example by means of ion exchange etc. The heat transfer fluid may be water, which is converted to steam as it passes through the heat exchanger tubing and is condensed to liquid water prior to being returned to the heat exchanger tubing.

The heat regulating medium may be maintained in an atmosphere of inert gas. The inert gas may be maintained at a pressure slightly above atmospheric pressure. The method may comprise detecting a pressure in the solar energy collector and, if necessary, as adjusting the pressure of the inert gas in said collector in order to maintain the pressure in said collector within a predetermined pressure range. In an example, the method comprises passing a pressure related signal from a pressure sensor in the solar energy collector to a module controller, if necessary generating a control signal in response to the pressure related signal and passing the control signal (if generated) to a controllable valve in a gas line leading from a reservoir of the inert gas to the solar energy collector so as to cause said valve to open for sufficient time for the pressure in the solar energy collector to return to the predetermined pressure range.

The solar energy collection device may form part of a solar energy collection system as described previously. The system may have a single system output. The single system output may comprise either steam, high temperature hot water or electrical energy. The method may comprise combining outputs from the solar energy collection devices of said solar energy collection system so as to form the single system output. The solar energy collection devices of said solar energy collection system my be controlled by means of a station controller capable of switching one or more of the devices on or off as required to obtain a desired quality of system energy output. The switching may comprise returning the solar energy concentrator of the device into a non-collecting orientation. It may comprise insertion of a plug. The system may be controlled so as to obtain a substantially constant quality of system energy output. The constant quality may comprise constant voltage and current of an electrical output, or constant pressure and temperature, and optionally also volume and flow rate, of a steam or high temperature hot water output.

In a fifth aspect of the invention there is provided a method of generating electricity comprising:
  providing a solar energy collection device according second aspect, wherein said device comprises a heat exchanger in thermal contact with the heat regulating medium, wherein the heat exchanger is coupled to an electricity generator which is capable of being powered by a heated heat transfer fluid;
  allowing solar energy to impinge on the solar energy concentrator of said to device so as to heat a heat transfer fluid in the heat exchanger of the device; and
  passing the heated heat transfer fluid to the generator of said device so as to cause said generator to convert heat energy in said heated heat transfer fluid into electricity.

The method may comprise moving the solar energy concentrator or a part thereof by means of a tracking device so as to direct the solar energy through the aperture of the solar collector.

In a sixth aspect of the invention there is provided use of a solar collector or a solar energy collection device or a solar energy collection system according to the invention for generation of electricity and/or of steam. The generation may be continuous.

In a seventh aspect of the invention there is provided a slab of heat regulating medium having:
  an upper face and a lower face, said upper and lower faces being substantially parallel,
  a substantially straight energy collection device contacting edge between, and substantially orthogonal to, said upper and lower faces; and
  an outer edge opposite said energy collection device contacting edge and substantially orthogonal to said upper and lower faces.

In the slab, the upper and lower faces each have at least one groove extending at either end to an edge of the slab for accepting a heat exchanger tubing. It may comprise for example 1, 2, 3, 4, 5 or 6 grooves. The groove(s) are approximately parallel to the energy collection device contacting edge. The energy collection device contacting edge adjoins an angled edge at either end. The angled edges are angled at about 45 degrees to the energy collection device contacting edge and are substantially orthogonal to the upper and lower faces.

The slab may be shaped such that four of said slabs can be arranged such that each angled face faces an angled edge of a neighbouring slab such that the energy collection device contacting edges of the slabs describe a square. The heat regulating medium may comprise graphite or graphite particles embedded in a thermally conductive matrix. Other heat regulating media as described elsewhere herein may also be used.

The slab may have angled lugs on the end so as to provide a thickness of graphite around the receiver cavity. Two 45 degree corners coming together form a suitably strong means to achieve an inner cover. The slab may be tapered towards the lug for reasons of mechanical strength. The lug may be vulnerable to fracture and the obtuse angle minimises the stress concentration effect as graphite is brittle.

In an eighth aspect of the invention there is provided a slab assembly comprising a plurality of slab sets, each slab set comprising four slabs. Each slab is as described above (in the seventh aspect). The slabs are arranged such that the energy collection device contacting edges of the slabs describe a square. The slab sets therefore define an internal space having four vertical rectangular faces. The slab assembly also comprises an energy collection device comprising four vertical rectangular panels, each of said panels being in thermal contact with one of said vertical rectangular faces and heat exchanger tubing disposed in the grooves in the slabs.

The energy collection device may comprise a square top attached to an upper horizontal edge of the four vertical panels (or, of each of the four vertical panels) and at least one slab of heat regulating medium above and in thermal contact with the square top.

The slab assembly may also comprise an inlet manifold and an outlet manifold, each being in fluid communication with the heat exchanger tubing. In some embodiments there are more than one set of heat exchanger tubing extending between the inlet and outlet manifolds, there may be for example 1, 2, 3, 4, 5, 6, 7, 8, 9, 10, 11 or 12 or more than 12 sets of heat exchanger tubing. There may be for example two eats near each face of the energy collection device (i.e. a total of 8 sets of heat exchanger tubing).

The lowermost slab of the slab assembly set may rest on a thermally insulating material, which may comprise one or more layers of ceramic bricks or ceramic tiles.

There may be spaces between the slabs of each slab set (in particular between the angled faces of the slabs thereof) to allow for thermal expansion of the assembly in use.

In a ninth aspect of the invention there is provided a method for preparing a solar collector. The method comprises providing heat exchanger tubing and assembling between said tubing portions a plurality of slabs of heat regulating medium such that the heat regulating medium contacts the four outer vertical faces and the top of the energy collection device. The heat exchanger tubing comprises a plurality of parallel tubing portions disposed around an energy collection device and mounted on a base. The energy collection device comprises four vertical rectangular panels arranged in a square and a square top attached to an upper horizontal edge of the four vertical panels.

The step of assembling may be such that the parallel tubing portions are disposed inside grooves formed in faces of the slabs of heat regulating medium. It may comprise sliding the slabs in from the side so that the parallel tubing portions are disposed inside the grooves. The assembling may be such that a semicircular groove in one of the slabs faces a corresponding semicircular groove in an adjacent slab so as to form a cylindrical hole in which a tubing portion of the heat exchanger tubing is disposed.

The method may additionally comprise clamping the slabs in position. This may be performed after assembling the slabs. The method may additionally comprise locating a is thermally insulating solid around the outside of the heat regulating medium.

It may additionally comprise locating the energy collection device, assembled slabs and thermally insulating solid within a housing and sealing said housing to a lower rim of the energy collection device. A source of inert gas may be coupled to the housing so as to allow the inert gas to diffuse through the thermally insulating solid. The method may comprise passing the inert gas through the housing so as to suffuse the thermally insulating solid and displace oxygen therein.

The method may additionally comprise the step of inserting one or more thermocouples through the housing into the heat regulating medium through holes preformed in said housing and heat regulating medium.

BRIEF DESCRIPTION OF THE DRAWINGS

A preferred embodiment of the present invention will now be described, by way of an example only, with reference to the accompanying drawings wherein:

FIGS. 28 and 29 illustrate applications of the invention.

DETAILED DESCRIPTION OF THE INVENTION

Figure 1:
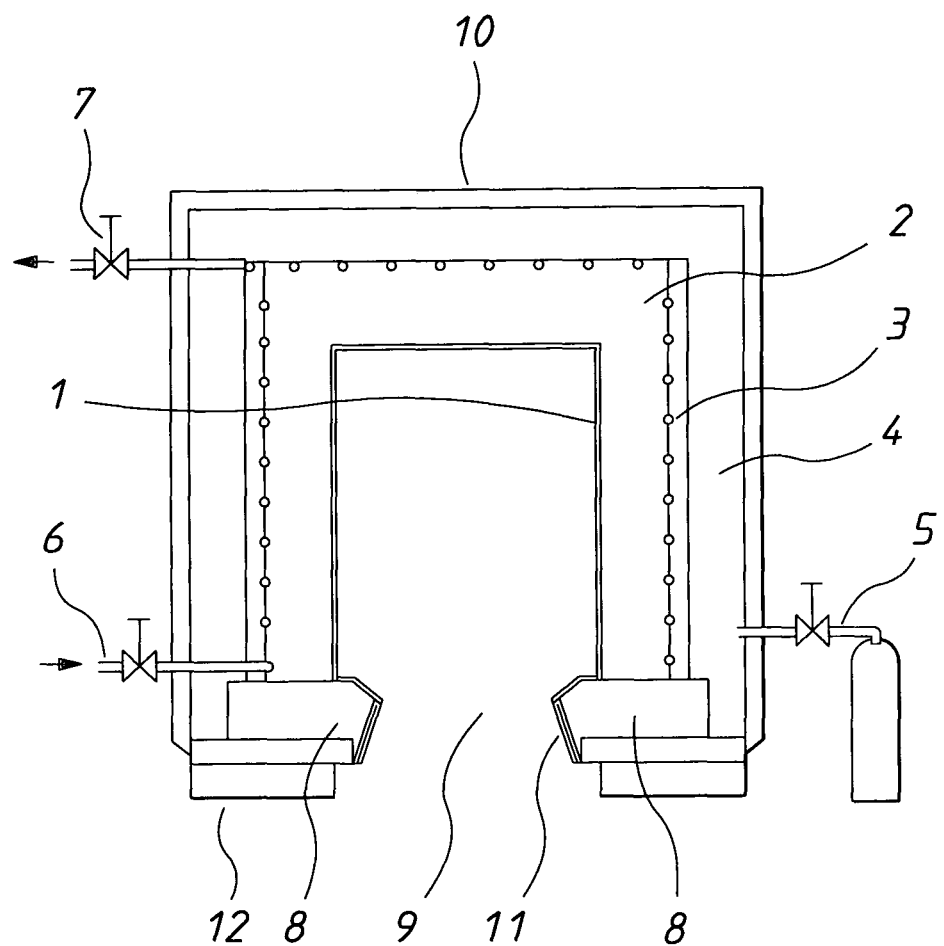
FIG. 1 is a diagrammatic representation of a collector for use in the solar energy collection device.

The present invention relates to a solar collector, and to a solar energy collection device comprising a solar energy concentrator and the solar collector. In particular it relates to collecting concentrated solar thermal energy and controlling the time of transfer of that thermal energy to a heat exchanger system prior to its extraction for subsequent use. The concentrator and the collector may be disposed so that solar energy impinging on the concentrator is concentrated on a collection region of the collector. The energy so collected may then be transferred from the heat transfer material in the collector to a heat transfer fluid in the heat exchanger.

The heat regulating medium may be a solid. Suitable heat regulating solids commonly have a high carbon content. Suitable materials include for example graphite, graphite particles embedded in a thermally conductive matrix such as a metallic matrix (e.g. copper, gold, aluminium, silver, mixtures or alloys of any two or more of these etc.), cast iron (optionally in the form of blocks), steel, aluminium, copper, alumina, silica, aluminosilicates, silicon carbide, silicon nitride, firebrick, chromite, magnetite, dense refractory concrete or a mixture of any two or more of these. Other suitable materials include metal oxides such as beryllium oxide, magnesium oxide, calcium oxide, strontium oxide, osmium oxide, lanthanum trioxide, yttrium trioxide, scandium trioxide, titanium dioxide, zirconium dioxide, hafnium dioxide, tantalum pentoxide, niobium pentoxide, alumina, silica, nickel oxide, and other inorganic materials such an silicon nitride, silicon carbide, boron carbide, tantalum carbide, titanium carbide, tungsten carbide, zirconium carbide, aluminium nitride, zirconium boride, spinel, mullite, forsterite, fireclay, dolomite, magnesite, high-alumina porcelains, high-magnesia porcelains, sillimanite, kyanite, zirconium silicate and mixtures of any two or more of the above. The graphite may be of high purity, e.g. at least about 95%, or at least about 96, 97, 98, 99, 99.5, 99.9, 99.95 or 99.99, or about 95 to about 99.99% or about 95 to 99.9, 95 to 99, 99 to 99.99, 99.9 to 99.99, 99 to 99.9 or 99 to 99.5 e.g. about 95, 96, 97, 98, 99, 99.1, 99.2, 99.3, 99.4, 99.5, 99.6, 99.7, 99.8, 99.9, 99.91, 99.92, 99.93, 99.94, 99.95, 99.96, 99.97, 99.98 or 99.99%. It may have a low ash content. The ash content may be less than about 3%, or less than about 2, 1.5, 1, 0.5 or 0.2%. The heat regulating medium should have a high heat capacity, e.g. above about 1 J·cm$^{-3}$·K$^{-1}$, or at least about 1.1, 1.2, 1.3, 1.4 or 1.5 J·cm$^{-3}$·K$^{-1}$, or about 1 to 5, 1 to 3, 1.5 to 5 or 1.5 to 3 J·cm$^{-3}$·K$^{-1}$, e.g. about 1.1, 1.2, 1.3, 1.4 or 1.5 J·cm$^{-3}$·K$^{-1}$. It should also have a high thermal conductivity, e.g. at least about 100 W/m·K, or at least about 150 or 200 W/m·K, or about 100, 110, 120, 130, 140, 150, 160, 170, 180, 190 or 200 W/m·K. It should also be capable of withstanding high temperatures, such as those present in use in the device, without substantial degradation or vapourisation, optionally without melting or fracturing. It should be capable of withstanding temperatures of at least about 1000° C., or at least about 1500 or 2000° C., e.g. capable of withstanding a temperature of about 1000, 1100, 1200, 1300, 1400, 1500, is 1600, 1700, 1800, 1900, 2000, 2100 or 2200° C. without substantial degradation or vapourisation, optionally without melting or fracturing. The heat regulating medium may be in the form of a layer. The layer may be about 10 to about 1500 mm thick, or about 10 to 1000, 10 to 500, 10 to 250, 10 to 100, 10 to 50, 10 to 20, 20 to 500, 100 to 500, 200 to 500, 50 to 200, 50 to 100, 500 to 1500, 1000 to 1500, 500 to 100 or 100 to 200 mm thick, e.g. about 10, 20, 30, 40, 50, 60, 70, 80, 90, 100, 150, 200, 250, 300, 350, 400, 450, 500, 600, 700, 800, 900, 1000, 1100, 1200, 1300, 1400 or 1500 mm thick. In some embodiments the heat regulating medium is a liquid. In this case, the heat capacity requirements described above are still applicable, however the heat regulating medium may have thermal conductivity less than that described above. The heat regulating medium in a single collector may be about 2 to about 20 tonnes or more, or about 2 to 10, 2 to 5, 5 to 20, 10 to 20 or 5 to 15 tonnes; e.g. about 2, 3, 4, 5, 10, 15 or 20 tonnes. In some cases, particularly where the collector is not on a tower, collectors may have more than 20 tonnes of heat regulating medium, e.g. 25, 30, 35, 40, 45, 50, 60, 70, 80, 90 or 100 tonnes. The total weight of the collector may be about 10 to about 30 tonnes, or about 10 to 20, 20 to 30 or 10 to 15 tonnes, e.g. about 10, 15, 20, 25 or 30 tonnes. For lager heat regulating media, the total weight will be correspondingly greater. A tower and its footings which supports the collector (and the poles which support the collector on the tower) should be sufficient to support the weight of the collector, even under high wind load.

A commonly used heat regulating medium for use in the present invention is graphite. This may be synthetic graphite. It may be made from petroleum coke. Graphite occurs naturally as flake graphite and consists of a succession of layers of carbon atoms linked in a flat hexagonal crystal structure, in layered sheets similar to mica. This product is usually not processed into graphite block but is used to make items like nozzles and crucibles.

In forming synthetic graphite, for example for use in the present invention, a suitable method involves heating petroleum pitch to remove volatile compounds and form petroleum coke. This calcined petroleum coke is crushed and size graded. The sized grain is then recombined in set ratios with hot liquid pitch. This is mixed into a paste and then extruded or pressed into blocks of desired shape and size. Round blocks, like electrodes, are commonly extruded whereas rectangular blocks are commonly pressed. There are many pressing processes but the grade of graphite block used in the present invention typically is vibratory pressed. The idea of vibratory pressing is to eliminate the flaws that would occur if vibration were not employed in the pressing process. The grains in the mix can move to allow entrapped air to escape and to aid consolidation. These blocks are then heated with gas to a temperature of about 1200° C. to 1300° C. to remove volatile compounds and to bake the blocks. The blocks are then cooled and then vacuum impregnated with hot liquid pitch. The blocks are then rebaked to remove the pitch volatiles.

The graphitisation process is then begun. The cycle is typically around 100 hours long for large blocks such as those used in the present invention. The transition to graphite occurs at a faster rate as the temperature is increased. Graphitisation occurs weakly from about 1500° C. and the blocks used in the present invention typically are heated to at least about 2400° C. up to a maximum of about 2800° C. The blocks are only held at the maximum temperature for about 1 to 2 hours, as at elevated temperatures the graphitisation process proceeds rapidly. The higher the graphitisation temperature, the better ordered the crystal structure and the lower the electrical resistance. With the lower electrical resistance, the thermal conduction of the graphite increases. The downside for the product is that with lower electrical resistivity, the mechanical strength of the block decreases. The graphitisation temperature is critical to the physical properties that the graphite exhibits.

The heat regulating medium in the present invention defines a cavity or chamber. Otherwise expressed, the solar collector comprises a heat regulator which defines a cavity, wherein the heat regulator comprises, or consists essentially of, the heat regulating medium. The heat regulator has an aperture communicating with the cavity so that solar energy incident on the aperture enters the cavity through the aperture. In this way the solar energy is able to heat the heat regulator. Solar radiation which enters the cavity may be partially absorbed so as to heat the heat regulator and partially reflected. The reflected portion may be reflected so as to impact a different part of the heat regulator, and again may be partially absorbed and partially reflected. Thus multiple resections result in the effective absorption of the majority of the incident solar energy, so that only a small portion will escape through the aperture. Less than about 20% of the incident energy may escape, or less than about 10 or 5%. The remainder will be absorbed so as to heat the heat regulator.

Figure 10:
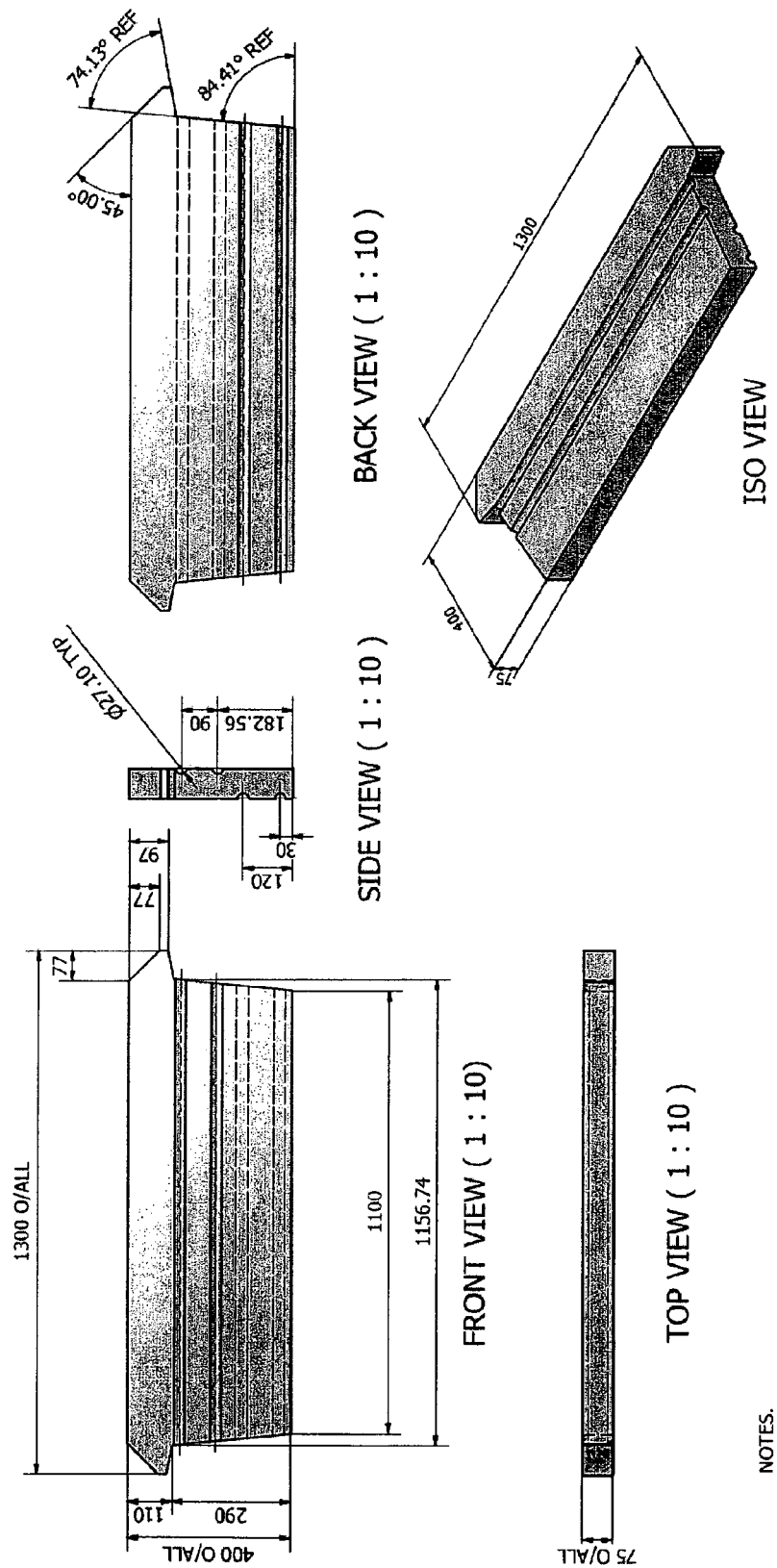
FIG. 10 shows drawings of a slab of heat regulating material.

The heat regulating medium may be provided in a single portion or monolith, or may be provided in more than one section. These sections may be in at least partial thermal contact with each other. The sections may be disposed so as to allow for thermal expansion thereof without causing physical damage to the solar collector. In some embodiments in which the heat regulating medium is in the shape of a cube having a cubic cavity therein, the heat regulating medium may comprise a number of trapezoidal sections which fit together to form the overall cubic shape (optionally together with other shaped sections for example square sections). The heat regulating medium may be in layers. This may facilitate construction of the solar collector (or of the heat regulator). Thus it, may be convenient to transport the heat regulating medium and other portions of the solar collector to the site at which the system is to be located and fit them together on site to form the heat regulator. The provision of the heat regulating medium in layers (or portions of layers) may also facilitate fabrication, in particular it may facilitate the fitting of the heat exchanger into the solar collector. Thus heat exchange tubes, or portions thereof, may be fitted around a layer of heat regulating medium, or portion of a layer, and these layers or portions may be then fitted together when constructing the solar collector such that the heat exchange tubes are at least partially embedded in the heat regulating medium so as to facilitate efficient heat exchange between the heat regulating medium and a heat exchange fluid in the heat exchange tubes. In particular, the heat regulating medium may be in the form of a plurality of slabs. These slabs may be about 20 to about 200 mm thick, or about 20 to 150, 20 to 100, 50 to 200, 100 to 200, 50 to 150 or 50 to 100 mm thick, e.g. about 20, 30, 40, 50, 60, 70, 75, 80, 90, 100, 120, 140, 160, 180 or 200 mm thick. In this context the thickness represents the vertical dimension when the slabs are assembled. Each slab may weigh about 50 to about 200 kg, or about 50 to 100, 100 to 200, 100 to 150, 70 to 130, 50 to 80, 70 to 100 or 60 to 80 kg, e.g. about 50, 55, 60, 65, 70, 75, 80, 85, 90, 95, 100, 110, 120, 130, 140, 150, 160, 170, 180, 190 or 200 kg. The slabs may have grooves in their upper and/or lower faces into which the heat exchange tubing may be fitted. The grooves may be semicircular, square, rectangular, trapezoidal, triangular or some other shape in cross section. In preferred embodiments they are semicircular, and are disposed so that, when assembled in the solar collector, a groove on a face of one slab together with a corresponding groove on a face of an adjoining slab form a groove with circular cross section suitable for fitting a cylindrical portion of heat exchange tubing. The slabs may have a depth of about 10 to about 1500 mm thick, or about 10 to 1000, 10 to 500, 10 to 250, 10 to 100, 10 to 50, 10 to 20, 20 to 500, 100 to 500, 200 to 500, 50 to 200, 50 to 100, 500 to 1500, 1000 to 1500, 500 to 100 or 100 to 200 min thick, e.g. about 10, 20, 30, 40, 50, 60, 70, 80, 90, 100, 150, 200, 250, 300, 350, 400, 450, 500, 600, 700, 800, 900, 1000, 1100, 1200, 1300, 1400 or 1500 mm thick. This dimension represents the thickness of the heat regulating medium (i.e. the distance from the energy collection device to the outside of the heat regulating medium) when the slabs are assembled. The grooves may extend along the length of the slabs, and may extend to opposing edges thereof. This facilitates construction of the collector, as it enables slabs to be slid in from the side so as to fit them into a preexisting heat exchange tubing. Drawings of a suitable design of slab are shown in FIG. 10.

The solar collector may have an overall shape of a cube, or a rectangular parallelepiped or a cylinder or a sphere or a polyhedron (e.g. dodecahedron, icosahedron, icosidodecahedron, triacontahedron etc.) or some other shape. It may have a cross-section that is round, square, rectangular, pentagonal, hexagonal or some other suitable shape. It may have a constant cross-section over its height, or it may have a variable cross-section with height. The aperture may be round, square, rectangular, pentagonal, hexagonal or some other suitable shape. The cavity may be in the shape of a cube, or a rectangular parallelepiped or a cylinder or a sphere or a polyhedron or some other shape. It may have a cross-section that is round, square, rectangular, pentagonal, hexagonal or some other suitable shape. It may have a constant cross-section over its height, or it may have a variable cross-section with height.

The heat regulating medium may have a single cavity therein, or it may have more than one cavity therein, e.g. 2, 3, 4, 5, 6, 7, 8, 9 or 10 or more than 10 cavities. In the event that more than one cavity is present, each may be separated from the others by the heat regulating medium, or by some other form of separation material. Alternatively at least two of the cavities may be connected internally to the collector by a connecting passage. The connecting passage may have air therein, or may have an inert gas, for example nitrogen, helium, neon, argon, carbon dioxide or some other inert gas. In the present context, the term "inert" refers to the feature that the gas does not react substantially with the heat regulating medium at the maximum operating temperature of the solar collector. In some embodiments, the cavity (or each cavity) has a single aperture communicating therewith allowing solar energy incident on the aperture to enter the cavity through the aperture. In other embodiments the cavity (or at least one of the cavities) has more than one aperture (e.g. 2, 3, 4, 5 or more than 5) apertures communicating therewith allowing solar energy incident on the apertures to enter the cavity through the apertures. Commonly, although not necessarily, the aperture(s) and cavity(s) are oriented so as to reduce or minimise convective heat loss from the solar collector. For that reason it is common that the apertures do not communicate with the upper surface of the heat regulating medium, since hot air rising from an aperture on an upper surface would facilitate heat loss. An aperture may communicate with a side surface. It may communicate with a lower surface. It may communicate with a lower edge and/or corner of the heat regulating medium. An aperture in a side surface may communicate with a cavity which extends upwards so as to partially trap heated gas and restrict loss of heat by means of heated gases flowing out of the cavity. A cavity may have a reflective surface angled so as to restrict or prevent reirradiation of solar energy which enters the cavity.

Notwithstanding the above, in some embodiments, the heat regulating medium is located on or near the surface of the ground, optionally at least partially buried in the ground. In such cases it may be convenient to have an aperture in an upper surface of the heat regulating medium, and/or in an upper edge and/or corner thereof. In such cases it may be convenient to have a solar energy transmitting window (e.g. quartz) located in the aperture so as to restrict convective losses. A benefit of such a configuration is that a large, heavy solar collector is more conveniently and safely located on or near the ground rather than in an elevated position such as on a tower. This also enables a larger solar collector to be constructed, as there is no requirement to build a supporting tower. In such cases, one or more reflectors may be disposed so as to be capable of reflecting solar energy from a solar energy concentrator through the aperture and into the cavity. There may be one reflector disposed directly above the aperture or may be several reflectors at an angle to a vertical line upwards from the aperture. These reflector(s) may be flat or may be concave so as to further focus incident solar energy into the cavity. These reflector(s) may be supported on one or more towers.

In some embodiments of solar collectors located on the ground, the aperture may be rounded, e.g. spherical or teardrop shaped. This may serve to restrict reirradiation of absorbed solar energy.

The solar collector may employ a plug that closes the receiver cavity aperture when the heliostats are not tracking. The plug may be constructed from materials that are capable of resisting the temperature in the receiver cavity. The plug may be capable of fully sealing the cavity or may be capable of sealing only about 95% (or about 99, 98, 97 or 96%) of the receiver cavity opening. In the event that the aperture is upward facing, the plug may seal approximately 100% of the opening.

The station controller may have one or more weather sensors connected thereto that will, among other weather data inputs, download data on the Direct Normal Irradiance is (DNI). The DNI is an absolute measure of how much energy is available to the heliostat fields from the sun. The station controller may use the DNI level to determine when the heliostat field starts to track, and to send a signal to the heliostats (or to the module controllers, which in turn may send a signal to the heliostats) in order to place some or all of them in a collecting orientation (i.e. to turn them on). Once tracking, the DNI may be monitored continuously to ensure that the energy delivered to the receiver cavity by the heliostats is adequate. If the DNI drops, for example because of heavy cloud cover or a change in the weather, then the station controller may instruct the module controller(s) to park some or all of the heliostats, i.e. to return them to a non-collecting orientation, and to close the receiver cavity aperture with the plug (if all heliostats are parked).

The heliostat fields may be started to track progressively. The heliostats in the west of the field may be started in the morning, in order to cope with the low angle of the sun. The heliostats in the east of the field may be started once the sun has risen to sufficient elevation that the images produced by these heliostats can be captured in the receiver cavity. The heliostats in the west of the field are commonly the first ones to be late in the day as the angle between the sun, the heliostat and the receiver cavity becomes too great. The heliostats in the east of the field are commonly the last ones to be parked late in the day, as the sun is at an advantageous elevation for these.

The solar energy concentrator is provided to focus solar energy into the aperture of the solar collector. The solar energy as it enters the aperture should have a maximum beam focal point diameter which is no wider than the aperture, preferably narrower. The concentrator may focus the solar energy beam focal point at or near the aperture. The focal point may be within about 300 mm of the aperture, or within about 250, 200, 250 or 100 mm of the aperture, and may be either inside the cavity or outside the cavity. Typically, since the solar energy enters from an angle in the form of a circular beam, it will cast an elliptical beam cross-section at the aperture. It may have an aspect ratio of about 1.5 to about 3, or about 1.5 to 2, 2 to 3 or 1.8 to 2.5, commonly about 2.

In certain embodiments of the invention the solar collector has facility for absorbing energy from other sources than solar energy. For example, it may be heated by resistive heating by means of one or more resistor embedded in the heat regulating medium. The resistors) may be electrically insulated from the heat regulating medium, particularly in cases where said medium is thermally conductive (e.g. graphite, metals or combinations thereof). The electric current to the resistor may be obtained from a renewable source such as wind energy. Thus a wind turbine, e.g. located on top of the solar collector, may be sufficient to heat, or at least partially heat, the heat regulating medium in the absence of solar energy input. The wind turbine may for example provide up to 10-500 kW of energy or more, depending on design of the turbine and on wind speed and direction. This option enables energy input to the solar collector to be continued at times when there is insufficient solar energy flux, for example on overcast days or at night. The non-solar input may be controlled by a module controller for the solar collector. This may reduce the non-solar input if necessary to prevent overheating of the heat regulating medium.

The heat regulating medium may be in the form of a shell. It defines an internal cavity and the cavity communicates to the outside through an aperture. The aperture and/or the cavity may, independently, have an energy transmitting substance therein. Suitable energy transmitting substances may be gases, e.g. air, nitrogen, argon, helium, carbon dioxide or mixtures of these. Additionally or alternatively solid and/or liquid energy transmitting substances, e.g. quartz, may also be present in some embodiments. For example a quartz window may be present in the aperture. This may be useful in cases where it is desired to maintain an inert gas (e.g. nitrogen) in the cavity. The window may be in the form of a lens. In this case, solar energy incident on the lens from the solar energy concentrator may be distributed by the lens so as to impact a larger portion of the solar energy collector inside the cavity. It may be a convex lens. It may be a planoconvex lens. It may be some other suitable shape. In the event that a window or lens is present in the aperture, it may seal the aperture or may not seal the aperture. Sealing has the advantage of maintaining the atmosphere within the cavity, however a lack of sealing prevents pressure buildup due to thermal expansion of gases in the cavity. However in many embodiments the cavity and aperture contain air and are open to the atmosphere. A suitable shape for the heat regulating medium is shown in FIG. 1, which is described in detail later in this specification. The heat regulating medium may be about 10 to about 1500 mm thick, or about 10 to 1000, 10 to 500, 10 to 250, 10 to 100, 10 to 50, 10 to 20, 20 to 500, 100 to 500, 200 to 500, 50 to 200, 50 to 100, 500 to 1500, 1000 to 1500, 500 to 100 or 100 to 200 mm thick, e.g. about 10, 20, 30, 40, 50, 60, 70, 80, 90, 100, 150, 200, 250, 300, 350, 400, 450, 500, 600, 700, 800, 900, 1000, 1100, 1200, 1300, 1400 or 1500 mm thick. The thickness of the heat regulating medium may depend on the intended use of the collection device. The heat regulating medium serves to buffer the solar energy input so that short reductions or interruptions in the supply of solar energy to the device can be tolerated with little or no drop in the energy output from the device. In some embodiments such interruptions are of the order of seconds or minutes, for example due to a cloud passing between the sun and the concentrator. In other embodiments such interruptions are of the order of hours, for example extended storms, or night time. The solar energy collection device may be capable of providing an energy output which drops by no more than about 20%, or no more than about 10, 5, 2 or 1%, when solar energy incident on the concentrator is blocked for no more than about 1 minute, or no more than about 2, 3, 4, 5, 6, 7, 8, 9 or 10 minutes. It may be capable of providing an energy output which drops by no more than about 25%, or no more than about 20, 15, 10 or 5% when solar energy incident on the concentrator is blocked for no more than about 2 hours, or no more than about 5, 10, 12, 14, 16, 18 or 20 hours. The thicker the heat regulating medium, the greater its thermal mass, and consequently the longer it can withstand interruption in energy input without suffering a large interruption in energy output. The blockage of energy input may represent for example night time (which represents an extended blockage) or it may represent the passage of a cloud or other obstacle between the sun and the solar energy concentrator or a portion thereof, representing a blockage of shorter duration. In the latter case solar energy may still reach the concentrator, but may be incapable of being focussed on the collector due to the diffuse (non-directional) nature thereof. A typical installation may comprise multiple heliostat modules (solar energy concentrators) and regulator modules (solar collectors) so that the time that the overall energy collection device may be operated is increased while maintaining the required output. Thus the heat regulating medium, and the solar collector, and the solar energy collection device, and the solar energy collection system, are capable of regulating the time that solar energy can be used to generate electricity or to generate steam.

In some applications it is required to produce superheated steam. This may be generated in some cases in a single solar energy collection device, as described herein. However in some cases it may be preferable to use two or more such devices in series in order to achieve this. For example, a first device may be used to heat the water to generate high temperature water. This may then be used as an input fluid for a second device which may convert the high temperature water to steam. This may be used as an input fluid for a third device, in which the steam is superheated to generate superheated steam. This may in some cases be accomplished with two devices in series—a first device to generate steam and a second device to superheat the steam.

The collector comprises an energy collection device in the internal cavity so as to enhance the collection of solar energy. The energy collection device may comprise stainless steel or some other suitable thermally conductive substance which is capable of tolerating (i.e. not degrading chemically or physically, or melting or vapourising) at the operating temperature of the device, e.g. up to about 1000° C., or up to about 1500 or 2000° C., e.g. about 1000, 1100, 1200, 1300, 1400, 1500, 1600, 1706, 1800, 1900, 2000, 2100 or 2200° C. The energy collection device may be about 1 to 10 mm thick, or about 1 to 5, 1 to 2, 2 to 10, 5 to 10, 2 to 8 or 4 to 7 mm thick, e.g. about 1, 2, 3, 4, 5, 6, 7, 8, 9 or 10 mm thick. It may be in the form of a layer of the thermally conductive substance on the wall of the cavity. It may cover a portion of the wall of the cavity, or it may cover substantially the entire wall of the cavity. It may cover at least about 50% of the area of the cavity, or at least about 60, 70, 80, 90 or 95% thereof. There may be a protective layer between the energy collection device and the internal cavity. The protective layer may be on the surface of the energy collection device. It may cover a portion of the surface of the energy collection device, or it may cover substantially the entire surface thereof. It may cover at least about 50% of the surface of the energy collection device, or at least about 60, 70, 80, 90 or 95% thereof. It may be about 1 to 200 microns thick, or about 1 to 100, 1 to 50, 1 to 20, 10 to 200, 50 to 200, 100 to 200, 50 to 100, 5 to 20, 50 to 150 or 100 to 150 microns thick, e.g. about 1, 2, 3, 4, 5, 6, 7, 8, 9, 10, 20, 30, 40, 50, 60, 70, 80, 90, 100, 110, 120, 130, 140, 150, 160, 170, 130, 190 or 200 microns thick. Suitable materials for a surface coating (protective layer) on the energy collection device include any high temperature resistant surface coating. The energy collection device is commonly in contact, thermal and/or physical, with the heat regulating medium. The surface coating may be any thermal, flame or plasma applied material such as a metal (e.g. aluminium, chromium, cobalt, nickel or an alloy of any of these), and oxide (e.g. alumina, chromia, zirconia or a combination of any two or more such materials), a carbide, or nitride (e.g. silicon nitride, silicon carbide, tungsten carbide or a combination of any two or more of these). The surface coating may comprise combination of any two or more of the above classes of materials. It may comprise metals, ceramics and/or cermets (a composite comprising ceramic and metal). The surface coating may have a single layer or may have multiple layers (e.g. 2, 3, 4 or 5 layers). Each layer may, independently, be as described above.

The energy collection device may have an energy absorbing surface or coating. The coating or surface may be black. It may be profiled. It may comprise a plurality of projections shaped and disposed so as to reduce reflection of radiation so as to increase absorption of incident solar radiation. The projections may be microprojections. They may be about 0.1 to 20 microns in length, or about 0.5 to 20, 1 to 20, 5 to 20, 0.1 to 10, 0.1 to 5, 0.1 to 1, 0.5 to 5, 1 to 5 or 1 to 10 microns, e.g. about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 or 20 microns.

Thus in an embodiment, the collector is in the form of a layered shell surrounding a cavity, said cavity communicating to the outside through an aperture. The layer adjacent the cavity can be a high temperature resistant surface coating or protective layer. Behind the surface coating, and in physical and thermal communication therewith, is an energy collection layer. Behind the energy collection layer, and in thermal and physical communication therewith, is a heat regulating medium. Commonly the bulk (i.e. greater than 50% of the volume) of the collector will be the heat regulating medium. Surrounding the heat regulating medium is commonly an insulating layer.

The heat exchanger may comprise heat exchange tubing, which may be in the form of one or more heat exchange tubes. The heat exchange tubing is in thermal contact with, optionally embedded in, the heat regulating medium. The internal diameter of the tubing should be sized so that it is capable of the desired heat transfer. It may be between about 0.5 and about 5 cm internal diameter or about 0.5 to 2, 0.5 to 1, 1 to 5, 2 to 5 or 1 to 3 cm internal diameter. The tubing should be made of a material that does not degrade, soften or melt at the operating temperature of the device. The tubing should be at least about 10 mm from the surface that receives the solar energy from the concentrator, or at least about 20, 30, 40, 50, 60, 70, 80, 90 or 1000 mm therefrom. This ensures that sufficient heat transfer material is present between the heat transfer tubing and the receiving surface (protective layer and/or energy collection device) to provide the required buffering effect. Thus the greater the energy buffering that is required (see above) the greater distance should be allowed between the heat transfer tubing and the receiving surface. The tubing should have a heat transfer fluid therein. Suitable heat transfer fluids are thermally stable to the operating temperature of the device, and preferably have a high heat capacity. Commonly the heat transfer fluid used in the present invention is water. In operation the water is heated and may volatilise to form steam, which may be used as an energy source for example in an electricity generator. In the event that water is used as a heat transfer fluid, it may be high purity water, so as to minimise deposition of scale when it volatilises. It may be at least about 99% pure, or at least about 99.5, 99.9, 99.95, 99.99, 99.995 or 99.999% pure. It may be purified prior to entering the heat exchanger. Common purification techniques such as reverse osmosis, ultrafiltration, microfiltration, ion exchange etc. are well known. Other suitable heat transfer fluids include any organic or inorganic fluid capable of withstanding the required operating temperatures. Examples include biphenyl, biphenyl oxide (diphenyl ether), silicone fluid (e.g. polydimethylsiloxane), partially hydrogenated terphenyls, dibenzyl toluene fluids, alkylbenzenes, diaryl alkyl diphenylethane, alkylated aromatics, diaryl ethers and triaryl methanes as well as similar or related fluid compounds or combinations of any two or more of the above. Particular examples are: modified terphenyl, synthetic hydrocarbon mixture, alkyl substituted aromatic, isopropyl biphenyl mixture, a mixture of synthetic aromatics, terphenyl/quaterphenyl, phenylcyclohexane/bicyclohexyl 90:10 mixture, and biphenyl/diphenyl oxide (DPO) eutectic mixture. Many of these are commercially available, and it other similar products may also be used in this application.

It is preferred that a thermally insulating layer at least partially surrounds the heat regulating medium. This reduces thermal losses from the collector during operation. The insulating layer may comprise a thermally insulating solid having pores and/or voids. Preferably the pores and/or voids have an inert or non-oxidising gas therein, such as nitrogen, helium, argon, neon, or a mixture of any two or more of these. The presence of such a gas serves to reduce high temperature oxidation of the heat transfer device, the heat transfer tubes, the insulating material etc. Suitable insulating materials are capable of withstanding the operating temperatures of the device. They include any fibrous or porous or particulate ceramic materials. There may be tubing and valves so as to supply the gas to the insulation and optionally to remove the gas from the insulation. This the gas may flow through the insulation. Alternatively it may be sealed in the insulation. In some embodiments the thermally insulating layer comprises an at least partial vacuum in order to insulate the heat regulating medium. In this event it may be maintained at an absolute pressure of less than about 0.1 atmosphere, or less than about 0.05, 0.02, 0.01, 0.005, 0.002 or 0.001 atmosphere. The atmosphere of the containment (i.e. in the thermally insulating layer) may be maintained at a pressure slightly above atmospheric pressure so that a failure in the containment seal results in an outflow of the containment atmosphere gas rather than an inflow of air. The exclusion of oxygen protects the high temperature components of the solar collector from corrosion. The solar collector is provided with an input valve to allow entry of the protective gas and an exhaust valve to discharge the gas if the containment pressure rises above design limits. The balance between admission of the protective gas and the exhaust of the containment atmosphere may be achieved by monitoring the containment pressure and utilising this signal to allow the control system to set the inlet and exhaust valve positions. The protective (i.e. inert) gas may be maintained in the insulating layer and also optionally in the heat regulating medium, optionally also in the thermal collection device.

The solar collector may comprise a housing, which surrounds the heat regulating material. The housing may be sealed against the energy collection device so as to form a substantially gas tight enclosure surrounding the heat regulating medium and, if present, the thermally insulating layer. It should be understood that in practice, the housing (which is disposed around the outside of the solar collector) in combination with the energy collection device (which commonly coats the inner surface of the aperture and cavity) will not form a completely sealed system, and minor leaks may occur. It is for that reason that the inert gas system maintains the inert gas system within the housing/energy collection device enclosure at slightly above atmospheric pressure, so that any leaks occur out of the enclosure rather than into the enclosure. If air were to leak into the enclosure, this may come in contact with the heat regulating medium. In the event that this comprises carbon, or a carbonaceous material (e.g. graphite) this could cause oxidation at the operating temperature of the collector, leading to loss and/or degradation of the heat regulating medium. Other suitable heat regulating media, such as silicon carbide, may equally require protection from oxygen. Thus in a commonly used arrangement, when a pressure below a preset threshold is detected in the enclosure, a valve to the source of inert gas is opened so as to produce a brief burst of inert gas flow into the enclosure. This is sufficient to raise the pressure above the preset threshold, at which stage the valve is closed again. An alternative, though less preferred, procedure is to maintain a very low constant flow of inert gas into the enclosure sufficient to maintain the pressure therein within a desired range.

The aperture of the collector may be surrounded by a lip comprising a high temperature lip material. This material serves to protect and contain the heat transfer material. It should be capable of withstanding the high operating temperatures of the device, and is preferably a thermal insulator. Suitable materials include silicon carbide and alumina based fabrics, tungsten, molybdenum, alumina, zirconia, zircon, aluminosilica, optionally in fibrous or foamed form, and mixtures of any two or more of these.

There may be a separate shield below the housing in order to protect the lower surface of the housing from thermal energy. This may be useful in cases where focussing of the solar radiation from the solar energy concentrator is not sufficient to direct all of the solar energy into the aperture. The shield should have a shield aperture at least the size of the aperture leading to the cavity and aligned therewith, so as to allow the concentrated solar energy to enter the cavity. A suitable shield is in the form of a frustum of a cone with a very shallow angle, where the decapitated portion of the cone represents the shield aperture. The angle is commonly around 1 to 15 degrees, or about 1 to 10, 5 to 10, 10 to 15, 7 to 12, 1 to 5, 1 to 3, 3 to 7, 5 to 7 or 3 to 3 degrees, e.g. about 1, 2, 3, 4, 5, 6, 7, 8, 9, 10, 11, 12, 13, 14 or 15 degrees. The distance between the shield and the lower portion of the housing may be about 2 to about 50 cm at its closest point, or about 2 to 20, 2 to 10, 2 to 5, 5 to 10, 5 to 20, 20 to 50 or 10 to 40 cm, e.g. about 2, 3, 4, 5, 10, 15, 20, 25, 30, 35, 40, 45 or 50 cm. It may be sufficiently large to allow reasonable airflow between the housing and the shield so as to prevent overheating of the housing. It may be sufficiently small so as to not substantially interfere with the focussing of solar energy into the aperture. It may have ribs, commonly radial ribs. Those assist in strengthening the shield. They may also serve to improve heat loss from the shield so as to maintain it at as low a temperature as possible. The shield may be made for example from steel, e.g. mild steel. It may have thermal insulation thereon. The thermal insulation may be for example a ceramic fibre insulation or some other suitable insulation. It may be about 10 to about 100 mm thick (or about 10 to 50, 10 to 20, 50 to 100 or 40 to 80 mm, e.g. about 10, 20, 30, 40, 50, 60, 70, 80, 90 or 100 mm), or thicker if required.

In some cases there may be an inner shield extending to about the upper level of the a support which supports the heat regulating medium. As described elsewhere herein, the heat regulating medium may be supported for example on ceramic bricks. It is preferable that solar energy does not impact the energy collection device adjacent these bricks. Thus an inner shield can shield the energy collection device in this region. The inner shield may be for example stainless steel. It may have thermal insulation thereon. The thermal insulation may be for example as described above on the shield. There may be a space between the inner shield and the energy collection device. The space may be about 2 to about 50 cm at its closest point, or about 2 to 20, 2 to 10, 2 to 5, 5 to 10, 5 to 20, 20 to 50 or 10 to 40 cm, e.g. about 2, 3, 4, 5, 10, 15, 20, 25, 30, 35, 40, 45 or 50 cm. This allows for air movement between the inner shield and the energy collection device to reduce heating of the energy collection device in this region. The inner shield may be angled inwards towards its lower portion. In some cases the inner shield is contiguous with the shield below the aperture, to form a single shield which protects both, the lower portion of the collector and a lower portion of the energy collection device.

The concentrator may comprise a lens. It may comprise a reflector. It may comprise a plurality of lenses. It may comprise a plurality of reflectors. It may comprise an array of reflectors. In the event that the concentrator comprises a plurality of reflectors or a plurality of lenses, these may all have approximately the same focal point, or may be disposed so as to reflect and/or focus light towards the same area. They may be disposed so as, to reflect and/or focus light towards the cavity of the collector. The, or each, reflector may be a flat mirror, or may be a concave reflector. It (each independently) may be, for example, a spherical or a parabolic concave reflector.

The device may comprise a tracking device for moving the concentrator so as to provide concentrated solar energy to the collector. Such tracking devices are known. Since the sun changes position during the course of the day, it is advantageous for the concentrator to move correspondingly, so that whenever solar energy is incident on the concentrator is directed towards the collector that solar energy is directed to the collector. The tracking device may comprise a detector for detecting an angle of the sun. It may comprise one or more motors for moving the concentrator. It may comprise a processor for determining from the angle of the sun detected by the detector the angle(s) required for the concentrator to direct the solar energy to the collector (i.e. into the aperture thereof). The processor may generate one or more signals dependent on said determined angle(s) of the concentrator and send said signal(s) to the one or motors so as to cause the motors to move the concentrator so as to direct the solar energy into the aperture of the collector.

In some embodiments, the tracking device may move the concentrator to a position suitable to deliver the concentrated solar energy to the receiver aperture, by employing predetermined calculations based on the predicted sun position. In such embodiments the tracking device may comprise a processor (e.g. a computer) for calculating from a predicted position of the sun (including at sun rise each day), the required position of the concentrator. The processor may also be capable of predicting the position of the sun so as to calculate the required position of the concentrator. The processor may also be capable of measuring the insolation rate from day to day and from that data calculating the number of concentrators required to be active from day to day to achieve the desired energy output needs of a system. Such calculations would take into account seasonal variations in insolation rates.

The mirror position may be adjusted on the basis of an algorithm that predicts the position of the sun at a given time of day for the particular geographic position. Each heliostat, or sun tracking mirror, has its own individual path. This tracking path may be programmed into the controller on each heliostat post. The module controller may instruct the heliostats to track at the start of their operating cycle and to park (i.e. return to a non-collecting orientation) at the end of the operating cycle. The heliostat tracking path for each heliostat may alternatively be embedded in the module controller with the control instructions issued centrally.

The module controller also may instruct the heliostats to park, e.g. move to a near horizontal position, if the wind velocity increases above a preset level. This prevents damage to the heliostats in the event of high wind velocities.

The heliostats target the centre of the aperture in the base of the solar collector and delivery the solar energy into the cavity. The temperature of the interface between the cavity and the heat regulating medium may be measured by means of a number of thermocouples, which may be inserted through the heat regulating medium to the surface of the energy collection device on the cavity wall. If the temperature of the heat regulating medium increases above the design level (for example about 800° C.) then the module controller may instruct a number (for example in around 10% of the field increments) of the heliostats to track so as to focus to a point (e.g. in the sky) away from the solar collector. If the temperature continues to rise then the module controller may instruct more heliostats to likewise track away from the solar collector. The module controller may repeat this cycle until control is achieved and the temperature stops rising.

An advantage of sending the heliostats to track so as to focus on a position in the sky is that they can be quickly brought back into operation if the need arises.

The module controller may be capable of predicting (or may be programmed with) sunrise and/or sunset times. This enables the module controller to signal some or all of the heliostats to be prepared for the commencement of insolation at sunrise, or to commence collection of solar energy once the sun has reached a suitable elevation, e.g. about 1 hour after sunrise, when the insolation rate is sufficiently great. It may also enable the module controller to signal the heliostats to return to non-collecting orientations when insolation ceases at sunset.

The collector may be mounted above the ground. It may be mounted at a height of about 5 to about 50 m above the ground, or at least about 15 m or at least about 20 m above the ground, or about 5 to 10, 5 to 7, 7 to 20, 10 to 20, 15 to 20, 10 to 15 or 8 to 12 m above the ground, e.g. about 5, 6, 7, 8, 9, 10, 11, 12, 13, 14, 15, 16, 17, 18, 19 or 50 m above the ground. This is particularly convenient in cases where the concentrator comprises reflectors. In this event the reflectors may be located near the ground, and the collector may be mounted at a sufficient height that reflected solar energy from all reflectors can efficiently be directed towards the collector, in particular without one or more concentrators shadowing one or more other concentrators. The solar energy collection device may comprise a support structure on which the collector is mounted. The support structure may be a tower, or a stand, pole or post. It should be sufficiently strong to support the weight of the collector, including under strong wind conditions.

Figure 2:
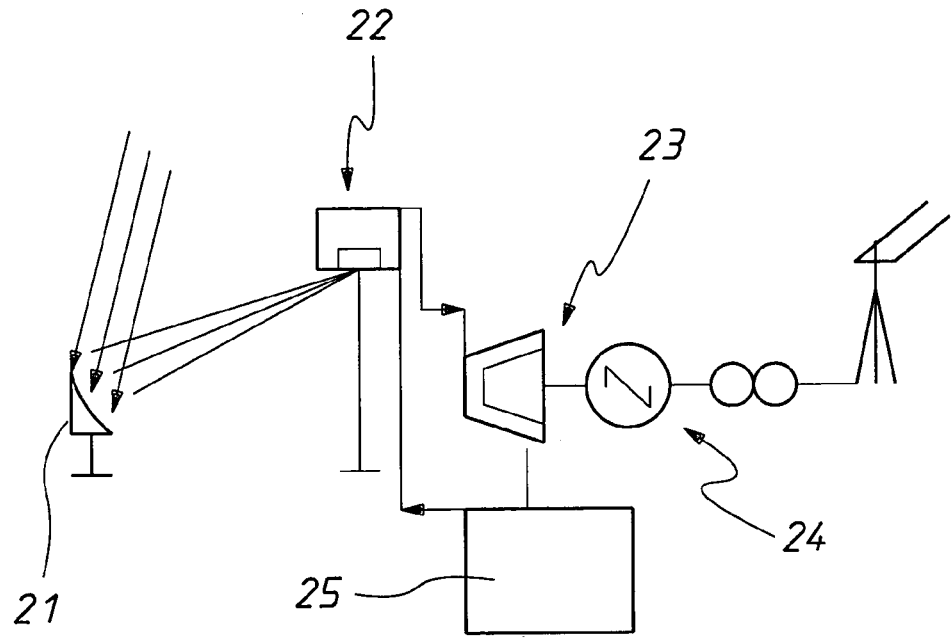
FIGS. 2 and 2A are diagrammatic representations of a solar energy collection device according to the present invention.

The heat exchanger of the solar collector may be coupled to an electricity generator so that, in use, solar energy incident on the concentrator is converted to electrical energy. The electricity generator may a turbine. It may be a steam driven turbine. The steam turbine may operate with water/steam pressures of about 10 to about 200 bar (or 10 to 50 or 50 to 100 or 20 to 80 or 20 to 50 or 50 to 80 or 100 to 200 or 50 to 150 bar) and temperatures up to about 600° C. A gas turbine would operate at higher temperatures up to 1100° C. at lower pressures. Thus a device according to the present invention is illustrated in FIG. 2. In reference to FIG. 2, the following numberings apply: 21 is a heliostat array; 22 is a tower/graphite block; 23 is an STG power island; 24 is a transformer and grid connection; and 25 is an ACC/water treatment plant. Thus solar energy impinges on a concentrator (heliostat array 21), which concentrates the solar thermal energy into the aperture in the collector (tower/graphite block 22) for distribution within the collector. This thermal energy is then held in the regulating medium for short periods of time (seconds, minutes), if it is acting as a buffer to overcome natural fluctuations in energy input so the heat exchanger output does not fluctuate; or for long periods of time (hours; days) acting as a regulator for on-demand energy availability. The thermal energy then heats heat transfer fluid, which is then passed to an electricity generator (STG power island 23). The electricity generated by generator 23 may be passed to a transformer to the electricity grid (24). Pure water (or at least high purity water) is provided as a heat transfer fluid to collector 22 from water treatment plant 25.

Figure 2A:
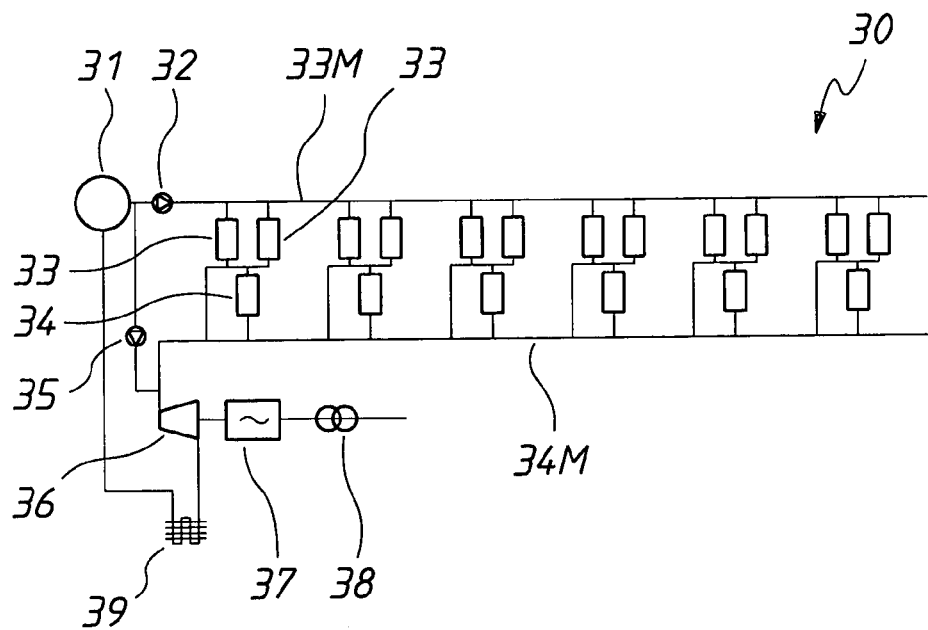

Whilst one solar collector and heliostat module may be capable of producing superheated steam, a solar energy collection system commonly comprises a number of such modules, connected in series or in parallel or as a combination of these arrangements. In FIG. 2A the concept depicted in FIG. 2 is expanded to illustrate how a representative system may operate.

In regard to FIG. 2A the following numbering applies:
31: purified water storage;
32: feedwater pump;
33: typical collector;
34: typical collector (used for superheating);
35: attemperating water pump;
36: steam turbine;
37: generator;
38: transformer;
39: air cooled condenser.

The rate of steam production depends on the temperature difference between a regulator block (i.e. the heat regulating medium) and the heat transfer fluid in the heat exchange tubing. If there is no energy input to the solar collector simultaneous with the energy being depleted or discharged from the collector (by the heat exchanger) then the heat transfer fluid flow rate should be lowered to maintain the quality of the steam produced. As there are commonly multiple solar collectors in the system, any shortfall in throughput from one or more collectors can be made up by bringing more collectors into operation.

At any given time not all areas within the collectors will be at the same temperature and not all the collectors will be at the same average temperature and so by appropriate programming of the control system, suitable regulator blocks (collectors) can be brought into operation to maintain the required steam output conditions.

A suitable arrangement of solar collectors, shown in FIG. 2A comprises a number of collectors connected in parallel (e.g. collectors 33) and then combined in series (e.g. collectors 33 and 34), and then the output of the resultant sets connected in parallel to a common manifold 34M. This arrangement is designed to provide redundancy for the system as a whole.

Thus in system 30 of FIG. 2A, reservoir 31 is provided as a source of purified water to the collectors of the system. Pump 32 is coupled to the outlet of reservoir 31 and provides water to inlet manifold 33M. Inlet manifold 33M is coupled to a series of modules. These may all have similar construction, as indicated in FIG. 2A, or may be of different construction. In FIG. 2A, each module comprises two collectors 33 according to the invention, the heat exchangers of which are connected in parallel to manifold 33M. The outlet from collectors 33 are coupled so as to direct their combined output either directly to outlet manifold 34M or to the inlet of the heat exchanger of collector 34. A valve (not shown) may be provided in order to direct the output from collectors 33 as desired. The outlet from collector 34 is coupled to manifold 34M. Outlet manifold 34M is coupled to steam turbine 36, which is coupled to electricity generator 37, which is in turn coupled to transformer 38. Attemperating pump 35 is provided to take water, unheated or heated, from reservoir 31 so as to combine it with heated water or steam from manifold 34M. Condenser 39 is provided so as to condense the steam from turbine 36. In FIG. 2A, each module is shown as having two collectors 33 in parallel. In practice this may be more (e.g. 3, 4, 5 or more than 5) or may be a single collector 33. Similarly FIG. 2A shows each module has having a single collector 34, however in practice there may be more than one (e.g. 2, 3, 4 or 5) connected in parallel. The valves of the different modules that direct the output from modules 33 either to manifold 34M or to collector 34 may be individually controlled. The various components of the system, including in particular these valves and the attemperating pump 35, may be controlled by a control system (comprising e.g. a computer or programmable logic controller or PLC), which is not shown in FIG. 2A.

In operation of system 30, then, purified water is pumped from reservoir 31 by means of pump 32 into manifold 33M. From manifold 33M the water passes into the heat exchangers of collectors 33, where they accept heat energy from the heat regulating media therein so as to generate a heated water or steam output. This is then directed to outlet manifold 34M, either directly or after first passing through the heat exchanger of collector 34 so as to heat the water/steam further. The result of this is that high temperature water and/or steam passes into manifold 34M. In some cases the temperature of this steam will be higher than is desirable for efficient running of turbine 36. In this event unheated water from reservoir 31 may be combined with the steam in manifold 34 by means of attemperating pump 35. In this way, steam of the optimum temperature is used to operate turbine 36, which powers generator 37 so as to generate electricity which passes to transformer 38 prior to being directed as required for use. Following its use in turbine 36, the steam passes into condenser 39, which may suitably be an air cooled condenser, so as to condense the steam to liquid water which is stored in reservoir 31 for reuse. In some cases there may be a purifier (not shown) in the line so as to remove contaminants from the water that may have entered during the above process, prior to returning the purified water to reservoir 31. It will be clear that at various points through system 30 pressure regulating valves may be present to control the pressure of the steam in the system. This enables the state of the water/steam to be controlled as desired.

This arrangement can be run so as to produce steam at steam turbine operating pressure, or alternatively the feedwater pressure may be raised so that modules 33 produce water that is above 100° C. and is near to its boiling temperature at that pressure. The pressure in the resultant fluid may then be reduced before it enters the heat exchanger of the third collector 34 in the set. When the pressure is reduced, the fluid flashes (i.e. rapidly volatilises) to produce a binary fluid consisting of heated water and steam. This binary fluid is then introduced into the heat exchanger of collector 34 to produce superheated steam for process usage or to drive a steam turbine.

Each of the collectors in system 30 may have thermocouples embedded in the heat regulating medium thereof. This enables the control system to determine what the output temperature will be from the particular collector. In a representative setup as shown in FIG. 2A, two or more collectors 33 and 34 are connected in parallel and/or series and so if the temperature of the heat regulating medium is high then the control system will predict the parameters for, the resultant fluid and set the heat exchanger operating pressure either at a low pressure to produce steam or a high pressure to produce hot water. If steam is produced then this fluid can be sent to the steam manifold 34M, to be mixed with output from the parallel sets. The output steam from the steam manifold 34M can be attemperated, if required, by spraying water into the steam line by means of pump 35 to achieve the steam conditions required for the process steam or the steam turbine 36. By appropriate programming of the control system the combination of the operation of the requisite number of collectors and steam attemperation, the steam quality (temperature, pressure) required by the process or by the steam turbine 36 can be maintained at a desirable level.

Figure 3:
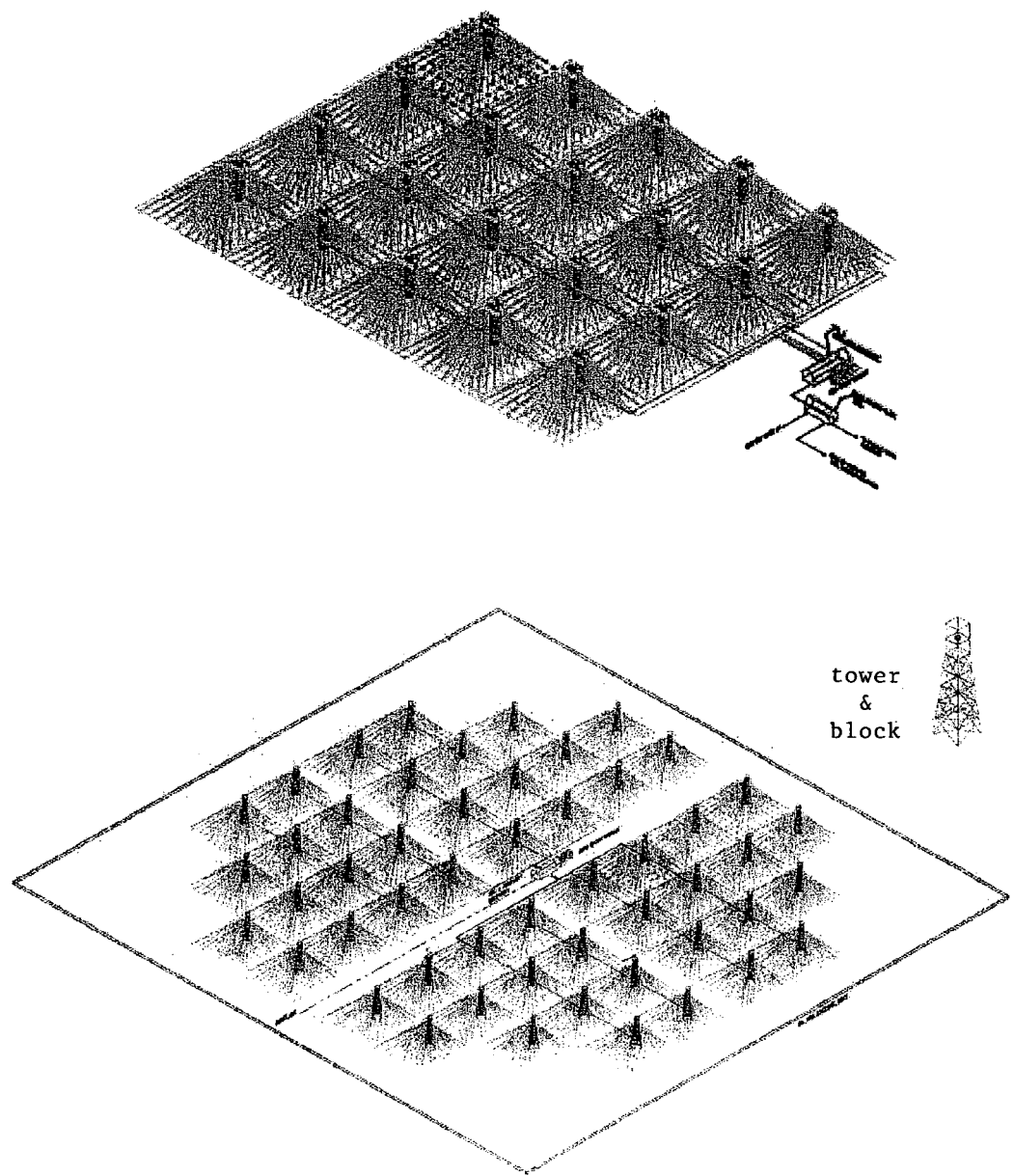
FIG. 3 shows computer representations of solar energy collection systems.

A plurality of solar energy collection devices as described above may be combined into a solar energy collection system. In such a system, the devices are coupled so as to generate a single system energy output. FIG. 3 shows computer visualisations of such a system.

Figure 4:
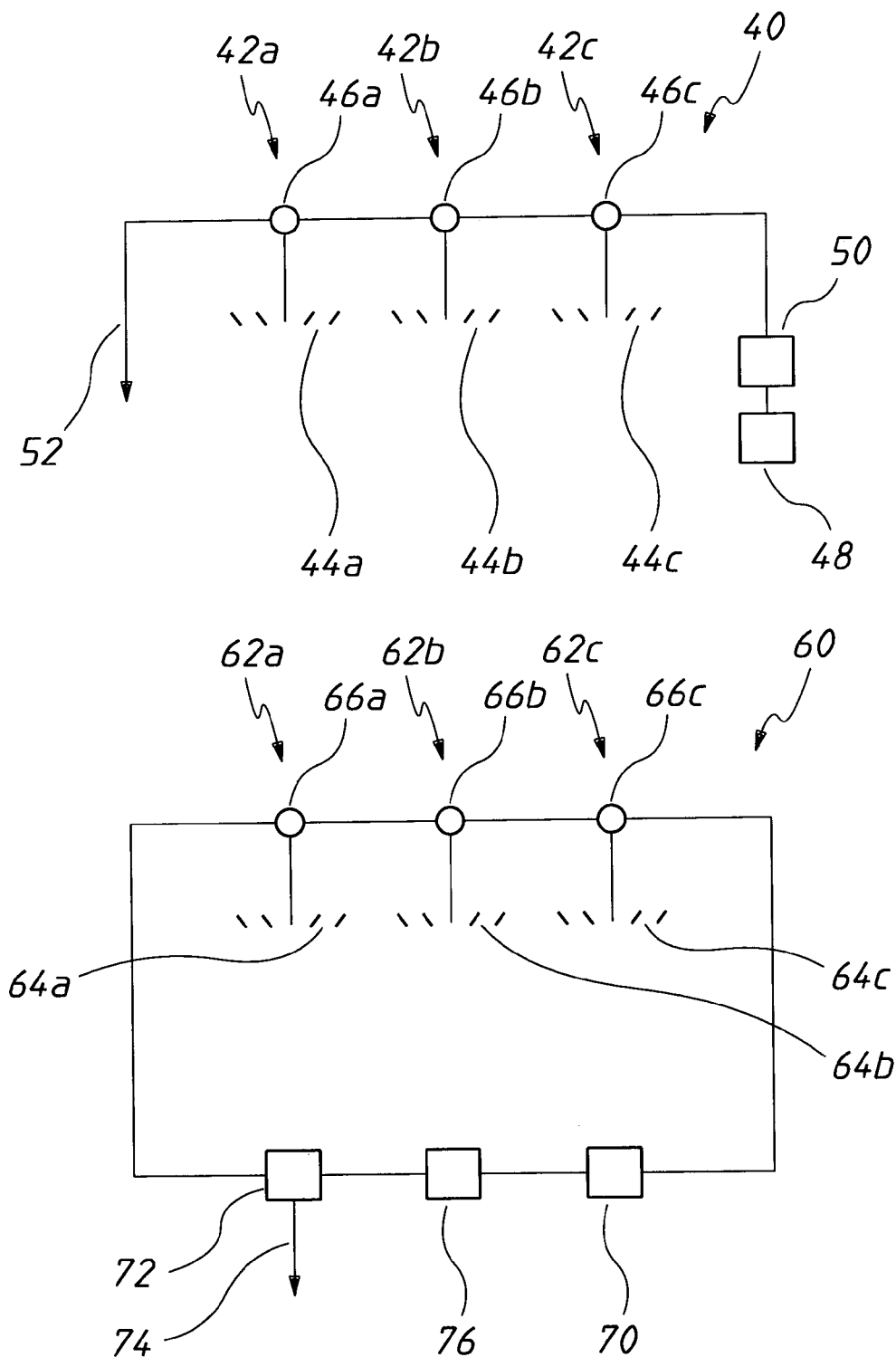
FIG. 4 shows a diagrammatic representation of a solar energy collection system.

The solar energy collection devices may be connected in series. Thus heat transfer fluid may pass from a first device to a second device and optionally subsequent devices. At each device, more energy is transferred to the heat transfer fluid, thereby either increasing its temperature or causing it to volatilise, or both. Thus the heat transfer fluid exiting the final device will have a large quantity of energy, and will be suitable for efficient electricity generation or other use. It may then be passed to an electricity generator or some other application for the hot heat transfer fluid. Two such systems are illustrated in FIG. 4. In system 40 of FIG. 4, devices 42a to c are connected in series. Each device 42 comprises a solar concentrator 44 (comprising multiple reflectors), focussed on a corresponding collector 46 (i.e. 44a on 46a, 44b on 46b and 44c on 46c). Water source 48 (e.g. a reservoir) provides water for the system and purifier 50 is provided to purify the water from source 48. Suitable purifiers are well known and may comprise, for example, one or more of reverse osmosis, microfiltration, ultrafiltration, activated carbon adsorption, ion exchange, flocculation/sedimentation and other known purification elements. Outlet 52 provides process steam to a device capable of using it. Thus in use, water from source 48 is passed to purifier 50 where it is purified to a desired level of purity. Solar energy from the sun impacts on concentrators 44 and is passed to collectors 46, thereby heating a heat regulating medium in collectors 46 to a desired operating temperature. As water from purifier 50 passes sequentially through collectors 46c, 46b and 46a, it is heated so as to generate steam of a desired temperature and pressure. This exits system 40 through outlet 52 as required.

Similarly, system 60 comprises devices 62a to c connected in series. Each device 62 comprises a solar concentrator 64 (comprising multiple reflectors), focussed on a corresponding collector 66 (i.e. 64a on 66a, 64b on 66b and 64c on 66c). Purifier 70 is provided to purify the water in the system. Suitable purifiers are described above. Generator 72 is provided to generate electricity from steam from devices 62 and line 74 is provided to transfer the generated electricity to a suitable destination. Condenser 76 is provided to condense steam from generator 72 prior to purification. Thus in operation water from purifier 70 passes to collector 66c. Solar energy is reflected from reflectors 64a to 64c, thereby heating collectors 66a to 66c to their operating temperature, typically above 600° C. As the water passes through the heat exchanger of collector 66c it is heated, and the heated water passes to collector 66b, where it is heated further. It then passes to collector 66a, where it receives its final energy input. At some stage through this heating process (depending on such factors as volume of fluid, flow rate of fluid, incident solar energy, number and efficiency of reflectors etc.) the water will be converted to steam and will be superheated. The resulting superheated steam passes to generator 72 where it is used to generate electricity, which is outputted from the system through line 74. The steam is condensed in condenser 76 and returned to purifier 70 to remove any impurities that may have entered the water. The resulting purified water is then returned to devices 62a, 62b, 62c as described above. In FIG. 4 only three collectors are shown in series, however it will be apparent that other numbers of collectors may be used, either in parallel or in series or in a combination thereof.

Thus in an alternative arrangement, the devices are connected in parallel. In this event, water may be passed into each collector, and the resulting heated water (or steam) may be combined and fed to a single generator for generating electricity or other suitable device for utilising the heated water or steam. In this arrangement it is important that the devices are efficient at heating the heat transfer fluid, as each device must alone raise the heat transfer fluid to the usable temperature.

Figure 5:
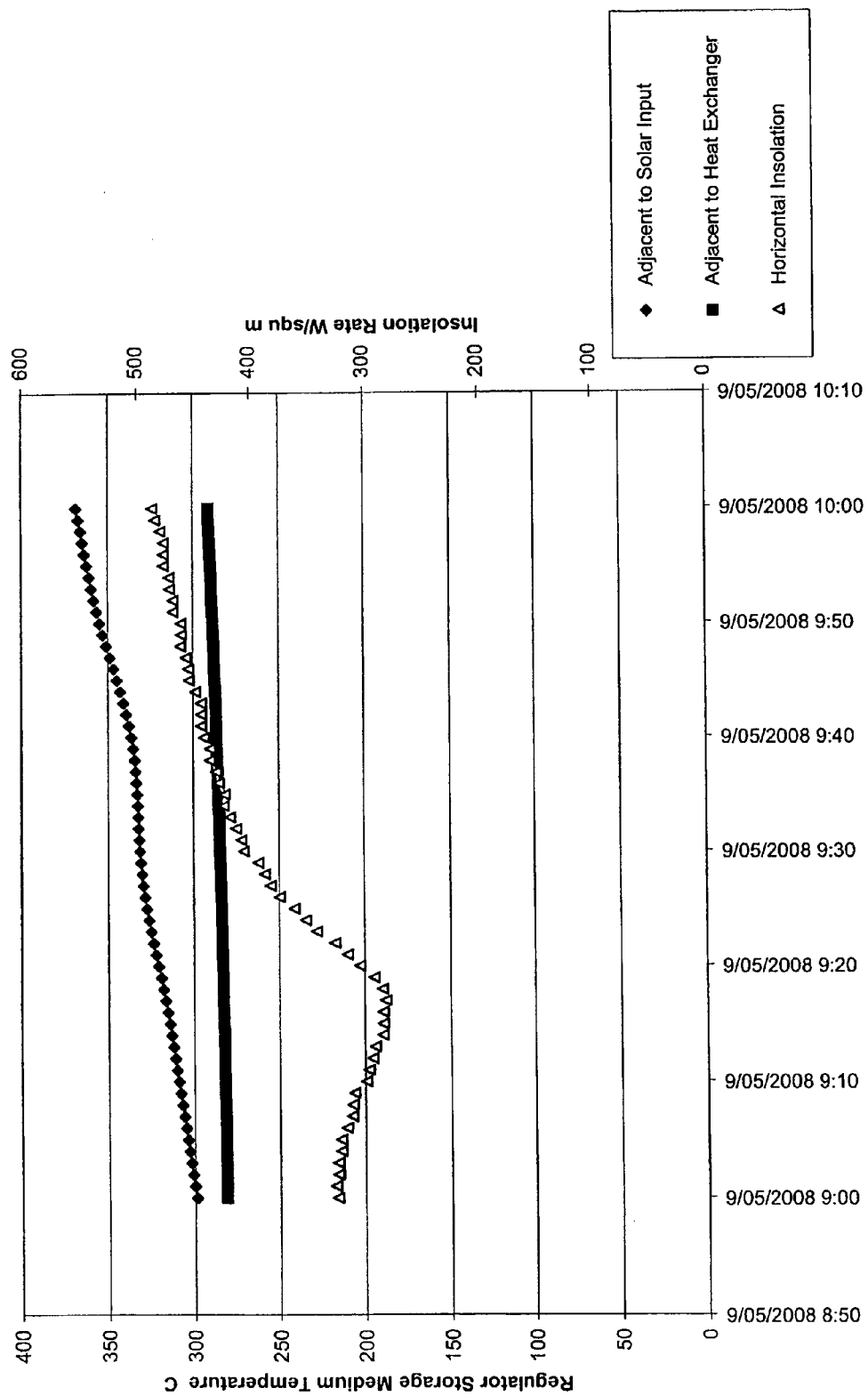
FIG. 5 shows a graph of temperatures in a solar collector and of insolation to the collector.

FIG. 5 is a chart from the Inventor's test module where solar insolation is measured as insolation incident on a horizontal surface and demonstrates the regulating action of the system. This chart compares the response to insolation of two of the thermocouples in the regulator blocks. One thermocouple is at the interface between the heat regulating medium and the energy collection device whilst the other is located adjacent to the heat exchanger pipes. The dramatic changes in insolation rate can be seen in the horizontal insolation line on the chart. The difference in temperatures between the location adjacent to the solar input and the heat exchanger pipes represents the means by which, the regulator system is able to provide an uninterrupted supply of the correct quality steam.

The invention also provides a method for collecting and regulating solar energy. Thus either a single collection device or a collection system comprising a number of such devices, as described earlier, is set up so as to be capable of receiving solar energy. Solar energy is then allowed to impinge on the concentrator of the device, or on the concentrators of the system. This energy is then concentrated and/or focussed by the concentrator(s) and the concentrated/focussed energy is directed to the collector(s). In particular it is directed into the aperture(s) of the collector(s) so as to collect the concentrated solar energy by way of the protective and collection layers. These layers do not hold substantial amounts of thermal energy, however are capable of collecting and transmitting the energy so as to heat the heat regulating medium. The heated heat regulating medium can then transfer the heat to a heat transfer fluid in the heat exchanger, thereby enabling the energy to be transferred when it is required.

An important aspect of the invention is the fact that the large thermal mass of the heat regulating medium enables fluctuations in the incident solar energy to be evened out so as to generate a relatively constant output of heated heat transfer fluid if required. Such fluctuations may be short term, for example a cloud passing in front of the sun, or they may longer term, such as night time. The ability of the system to absorb and even out such fluctuations depends on the thermal mass of heat regulating medium. Thus the larger thermal mass of the heat transfer fluid (i.e. the larger its mass and the higher its heat capacity) and the lower the removal rate of heat (i.e. the lower the flow rate of heat transfer fluid) the greater the ability of the device/system will be to absorb sharper and/or longer fluctuations in incident solar energy.

The invention also provides a method of generating electricity. Once the solar energy has been collected and transferred via the heat regulating medium to a heat transfer fluid as described above, the heated heat transfer fluid may be passed to one or more generator so as to cause the generator(s) to convert the heat energy into electricity. In some embodiments, the heat transfer fluid is heated to the point where it evaporates, and optionally superheats. The resulting vapour may be used to drive a turbine for generating electricity. Various other methods for converting heated fluid to electricity are well known and documented. As noted earlier, the collection devices may be connected in parallel or in series, or some may be in parallel and some in series (e.g. groups of more than one device connected in parallel may then be connected in series). A suitable heat transfer fluid is water, which may be converted to steam. The steam may then be superheated, and may be maintained under pressure prior to its use for generating electricity. The temperature of the steam may be greater than 100° C., but may be superheated to at least about 150, 200, 250, 300, 350, 400, 450, 500, 600, 700, 800, 900 or 1000° C., or about 150 to 1200, 200 to 1200, 500 to 1200, 1000 to 1200, 150 to 1000, 150 to 500, 500 to 1000 or 250 to 1000° C., e.g. about 150, 200, 250, 300, 350, 400, 450, 500, 550, 600, 650, 700, 750, 800, 850, 900, 950, 1000, 1050, 1100, 1150 or 1200° C. The steam may be at a pressure of up to about 200 bar, or up to about 150, 100, 50, 20 or 10 bar, or about 1 to about 200 bar, or about 5 to 200, 10 to 200, 20 to 200, 50 to 200, 100 to 200, 1 to 100, 1 to 50, 1 to 20, 1 to 10, 5 to 100, 5 to 50, 5 to 20, 10 to 100, 50 to 100 or 10 to 50 bar, e.g. about 1, 2, 3, 4, 5, 10, 15, 20, 25, 30, 35, 40, 45, 50, 60, 70, 80, 90, 100, 110, 120, 130, 140, 150, 160, 170, 180, 190 or 200 bar. In some instances the steam may be at a pressure higher than about 200 bar, e.g. up to about 300, 400 or 500 bar, or about 200 to 500, 300 to 500, 200 to 400 or 300 to 400 bar, e.g. about 250, 300, 350, 400, 450 or 500 bar. Commonly pressures of up to about 350 bar are used in commercial supercritical plants. The solar collector of the present invention is commonly operated such that the heat regulating medium is at a temperature of about 400 to about 1000° C., or about 400 to 800, 400 to 600, 500 to 1000, 500 to 800 or 600 to 800° C., e.g. about 400, 450, 500, 550, 600, 650, 700, 750, 800, 850, 900, 950 or 1000° C. Commonly when starting operation, the lower portion of the cavity will heat up more rapidly than the upper portion. This is because solar energy will be directly incident on the lower regions of the energy collection device, since the solar energy is reflected into the cavity at an angle. The upper regions of the energy collection device will be heated in part by thermal conduction through the heat regulating medium and energy collection device, in part through reflection of solar energy within the cavity and in part through convection of heated gas within the cavity. As heat exchange tubing is commonly present throughout the full height of the heat regulating medium, the total heat energy transferred to heat transfer fluid in the heat exchange tubing is not substantially affected by this phenomenon. If necessary, the temperature of the heat regulating medium in use may be adjusted by altering the flow rate of heat transfer fluid through the heat exchange tubing embedded therein.

The present invention is designed to address the disadvantages of solar energy only being available in daylight hours and also the problem of variations in output quality (as clouds pass over for example). The invention relates to solar thermal power generation. It relates regulation of solar energy conversion so as to ensure that the converted energy is produced at a consistent quality and also enabling it to be produced at any time on demand.

Disclosed herein is a device which can absorb concentrated solar energy that has been reflected off a number of mirrors which track the sun's position and allows for the time of use of solar thermal energy for such purposes as heating or generating electricity, to be regulated using a steam generation system embedded in the device.

In some embodiments the present invention uses multi-tower collection system technology. However instead of a collector/boiler unit on each tower (as has been used previously), a collector/regulator/boiler unit is located on each tower. In this way the thermal energy is held at the point of collection in a heat regulating medium, commonly a solid thermal conducting heat regulating medium, until there is a need to utilize it for conversion to electricity or some other purpose. This avoids the need to convert the heat energy immediately to electricity or to have to transfer it to a fluid based regulating system. In particular embodiments, the heat energy in a solar collector according to the invention may be extracted into a working fluid in a heat exchanger in thermal communication with, the heat regulating medium and converted into electrical energy and may utilise a Rankine cycle (organic or steam), Brayton cycle, Carnot cycle, thermionic generation, thermo-photovoltaic generation, magneto-hydrodynamic generation or similar thermodynamic process for conversion of heat energy into work (i.e. electrical energy). Where there are 2 or more solar collectors of the invention (e.g. 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, or 100 or more) the heated working fluid from each collector may be combined in equal or non equal proportions in a single manifold to form a combined heated working fluid prior to conversion of the heat in the combined heated working fluid into electrical energy (ac or dc). The heated working fluid (or combined heated working fluid) may be passed through an atemperator to cool it to a desired temperature prior to conversion of the heat in the combined heated working fluid into electrical energy (ac or dc). The apparatus for the conversion of heat into electrical energy may comprise one or more turbines or turbine-generator combinations, which may also comprise compressor systems, condenser systems, and/or coolant systems as would be appreciated by the skilled addressee for implementation of a particular thermodynamic process. The thermodynamic process may be a closed loop process or an open process. In particular embodiments, the conversion of heat energy to electrical energy may take place in more than one thermodynamic processes, whereas for example a portion of heat energy is converted to electrical energy via a first thermodynamic process, for example an open-loop thermodynamic process such as a Brayton cycle process, and any residual heat energy from the first process may be subsequently converted to electrical energy via a second thermodynamic process, for example a closed loop thermodynamic process such as a Rankine cycle process. Of course, it will be appreciated that the first and any subsequent thermodynamic process may be the same processes where a primary stage converts a first portion of heat energy to electrical energy, and subsequent secondary, tertiary, quaternary etc stages may be used to convert any residual heat energy from the preceding stage as required.

In an exemplary embodiment, the conversion of heat to electrical energy may, at least initially, be accomplished in an open-loop cycle heat engine arrangement. In this arrangement, the Brayton cycle heat engine comprises a compressor to compress a gaseous open-loop working fluid which is transferred to a second heat exchanger comprising tubes where heat energy is transferred to the compressed gaseous open loop cycle working fluid from a heated first working fluid therein. In a solar collector of the invention the first working fluid is heated by a first heat exchanger in thermal communication with a heat regulating medium to recover heat stored in the heat regulating medium, the first heat exchanger comprising tubes for heating the first working fluid contained therein. A compressor may be operatively coupled to the heat exchanger to compress the first working fluid prior to heating. The heated gaseous open-loop cycle working fluid is then transferred to a gas turbine which is coupled to an electricity generator, where the heat energy in the heated gaseous Brayton cycle working fluid is converted to electrical energy, typically by expansion of the heated gaseous open-loop cycle working fluid which provides a rotary drive to a shaft connected to the generator. The first working fluid may be, for example either a vapour fluid, e.g. steam, or a gaseous fluid such as an inert gas (e.g. Ar, He, Ne) or a non-inert gas (e.g. air, or nitrogen). The first working fluid may be compressed (e.g. 1.1-30 bar or 1.1-20 bar or 1.1 to 10 bar or 1.1 to 5 bar or 2-10 bar or 3-8 bar or or 4-8 bar) or uncompressed. The open-loop cycle working fluid may be, for example either a gaseous fluid such as tin inert gas (e.g. Ar, He, Ne) or a non-inert gas (e.g. air, or nitrogen) and is compressed (e.g. 1.1-30 bar or 1.1-20 bar or 1.1 to 10 bar or 1.1 to 5 bar or 2-10 bar or 3-8 bar or or 4-8 bar). Any residual heat in the open-loop cycle working fluid may be subsequently transferred to a secondary heat conversion stage. For example the residual heat in the open-loop cycle working fluid may be optionally extracted via an additional heat exchanger and optionally stored in a thermal storage medium (e.g. synthetic graphite or non-synthetic graphite). The additional heat exchanger may be coupled to the secondary heat conversion stage. In an exemplary arrangement, the secondary heat conversion stage may be a closed-loop thermodynamic system such as a Rankine cycle heat engine.

The invention thus extends to a plant for the production of electricity, optionally during peak times, comprising one or more solar collectors (e.g. 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, or 100 or more) in accordance with the invention, each solar collector comprising a heat regulating medium, a (first) heat exchanger comprising tubes for evaporating or heating a (first) working fluid contained therein the tubes being in thermal communication with the heat regulating medium to recover heat stored in the heat regulating medium. The heat may be recovered from the heat regulating medium during periods of peak demand for electricity or at other times as required. The heated first working fluid from each collector may be combined in equal or non equal proportions in a single manifold to form a combined heated working fluid prior to conversion of the heat in the combined heated working fluid into electrical energy (ac or dc). The heated first working fluid from each collector may be combined in equal or non equal proportions in order to output a constant pressure and temperature heated working fluid. The heated working fluid (or combined heated working fluid) may be passed through an atemperator to cool it to a desired temperature prior to conversion of the heat in the combined heated working fluid into electrical energy (ac or dc). The plant may also comprise a turbine or engine adapted to be driven directly by the heated working fluid or combined heated working fluid (in an open system) or indirectly via a second working fluid operatively associated with a second heat exchanger whereby the second working fluid in the second heat exchanger is heated by the first working fluid or combined heated working fluid (the solar collector comprising a heat regulating medium, heat exchanger and first working fluid in the latter case being in a closed loop system) and electric power generation means adapted to be driven by the turbine for generating electric power, the electric power generation means being operatively coupled (e.g. via a shaft) to the turbine. In some embodiments, the working fluid(s) (first and, if present, the second) may be independently a non-inert gas or an inert gas or it may be water/steam. The first working fluid may be compressed or uncompressed. The second working fluid may be compressed or uncompressed. In operation, the first working fluid is compressed and then heated in the tubes of the (first) heat exchanger as a consequence of being in communication with a body of material (eg synthetic graphite or non-synthetic graphite) comprising the heat regulating medium in which heat has been stored in accordance with the invention and such heat is converted to electrical energy as described above. Where there is more than one solar collector the heated first working fluid from each collector may be combined in equal or non equal proportions in a single manifold to form a combined heated working fluid prior to conversion of the heat in the combined heated working fluid into electrical energy (ac or dc). The heated first working fluid from each collector may be combined in equal or non equal proportions in order to output a constant pressure and temperature heated working fluid. The heated working fluid (or combined heated working fluid) may be passed through an atemperator to cool it to a desired temperature prior to conversion of the heat in the combined heated working fluid into electrical energy (ac or dc).

In particular embodiments, the use of the plant for the generation of electricity employs a steam driven turbine that in turn drives an electric power generator in the form of an alternator or a dc excitor which is operatively coupled to the turbine (e.g. via a shaft). For this purpose, in the one or more solar collectors (e.g. 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, or 100 or more) of the invention steam may be generated in a solar collector of the invention by evaporating water in tubes in a heat exchanger which tubes are in thermal communication with a heat regulating medium comprising a body of material (eg synthetic graphite or non-synthetic graphite) in which heat has been stored in accordance with the invention. In order to improve the efficiency of recovery means associated with a solar collector of the invention, the steam may be superheated in superheater tubes which are also in thermal communication with the heat regulating medium (e.g. synthetic graphite or non-synthetic graphite). The tubes and superheating tubes may be, for example, continuous tubes as are utilised in a "once through steam generator" system. Where there is more than one solar collector the steam from each collector may be combined in equal or non equal proportions in a single manifold to form a combined output steam at constant or substantially constant pressure and temperature.

The invention thus may extend to a plant for the production of steam, comprising one or more solar collectors (e.g. 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, or 100 or more) in accordance with the invention, comprising a heat regulating medium, a (first) heat exchanger comprising tubes for evaporating or heating a (first) working fluid contained therein the tubes being in thermal communication with the heat regulating medium to recover or extract heat stored in the heat regulating medium. The heat may be recovered or extracted from the heat regulating medium during periods of peak demand for steam or at other times as required. The plant may also comprise a second heat exchanger comprising tubes comprising a second working fluid therein whereby the second working fluid in the second heat exchanger is heated by the heated first working fluid which is contained in tubes in thermal communication with the tubes of the second heat exchanger (the solar collector comprising a heat regulating medium, heat exchanger and first working fluid being in a closed loop system). The closed loop system may comprise a cooler to cool the first working fluid after it has exited the second heat exchanger. The closed loop system may comprise a compressor to compress the first working fluid after cooling. The second working fluid may be water/steam (when the end product is steam or a steam turbine is used to generate electricity) or an inert or non-inert gas (when a gas turbine or reactive gas turbine is used to generate electricity). In some embodiments, the first working fluid(s) may be water/steam or a gas (inert or non-inert). In operation the first working fluid (which may be a compressed first working fluid when it is a gas) is heated in the tubes of the (first) heat exchanger as a consequence of being in thermal communication with a heat regulating medium (eg synthetic graphite or non-synthetic graphite) in which heat has been stored in accordance with the invention and such heat is transferred to the second working fluid where it is either converted to steam or, if it is already in the form of steam, raises the temperature of that steam, as described above, or if it is a gas (inert or non inert gas) raises the temperature of the gas. Where there is more than one solar collector the first working fluid from each collector may be combined in equal or non equal proportions in a single manifold to form a combined output first working fluid at constant or substantially constant pressure and temperature so as to produce steam or a heated gas from the second heat exchanger at constant or substantially constant pressure and temperature.

The invention may alternatively extend to a plant for the production of steam, or a hot gas, comprising one or more solar collectors (e.g. 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, or 100 or more) in accordance with the invention, each solar collector comprising a heat regulating medium, a heat exchanger comprising tubes for evaporating or heating a working fluid contained therein, the tubes being in thermal communication with the heat regulating medium, to recover heat stored in the heat regulating medium. The heat may be recovered from the heat regulating medium during periods of peak demand for steam or at other times as required. The working fluid may be water/steam whereby, in operation, the working fluid is heated in the tubes of the heat exchanger which are in thermal communication with the heat regulating medium (e.g. synthetic graphite or non-synthetic graphite) in which heat has been stored in accordance with the invention where it is either converted to steam or, if it is already in the form of steam, raises the temperature of that steam, as described above, such that the steam may be output from the plant for use in a desired application. Prior to being outputted the steam may be combined in equal or non equal proportions in a manifold with steam generated elsewhere (e.g. in another solar collector in accordance with the invention or in a heat storage apparatus comprising a heat regulating medium, a heat exchanger comprising tubes for evaporating or heating a working fluid contained therein, the tubes being in thermal communication with the heat regulating medium, to recover heat stored in the heat regulating medium and one or more electrical resistors operatively associated with the heat regulating medium to heat the heat regulating medium—examples of such heat storage apparatus are described in WO2005088218 the contents of which are incorporated by cross reference). The steam from the solar collector of the invention may be combined with steam from another source in equal or non equal proportions in order to output steam at a constant pressure and temperature. The working fluid may be an inert or non inert gas. A solar collector of the invention may comprise a collector to compress the inert or non inert gas. A solar collector of the invention may comprise a cooler to, cool the inert or non inert gas. The inert or non inert gas may be cooled prior to being compressed. The inert or non inert gas may be compressed to e.g. 1.1-30 bar or 1.1-20 bar or 1.1 to 10 bar or 1.1 to 5 bar or 2-10 bar or 3-8 bar or 4-8 bar. Steam may be generated by thermally contacting water/steam passed through a second heat exchanger with the inert or non inert heated gas from the heat exchanger in the heat regulating medium. After passing through the second heat exchanger the inert or non inert gas may then be cooled, compressed and recycled to the heat exchanger in the heat regulating medium.

Throughout the specification and claims the term "working fluid" is used interchangeably with the term "heat transfer fluid".

The use of the heat regulating medium, positioned between the solar receiver and the heat exchangers, serves to regulate the flow of thermal energy from the solar receiver cavity to the heat exchangers, thus damping the effects of solar input fluctuations, such as is caused by clouds passing between the sun and the collector, and ensures that the output energy remains relatively constant. This promotes efficient operation of the generating plant. Depending on the amount of regulating medium used, the regulation function can operate for seconds, minutes, hour or days.

Therefore, the invention encompasses the provision of either a small regulating capability in the device to cover short term loss or reduction in energy input from the sun, or of a large regulating capability which can provide solar thermal energy output continuously, e.g. overnight when there is no sunshine. In both cases, the device is capable of providing energy output at the same time as the energy is being received.

It is an important feature of the present device that the energy regulator is located at the point of collection. This provides high efficiency.

It is a further feature of this system that it may be modular. In each module, the solar receiver/regulator/boiler unit is sized such that it can be supported on a low cost tower structure, between about 5 and about 100 m above the ground, or about 15 to about 100 m or about 15 to about 50 m above the ground to absorb the energy reflected in a day from, for example, approximately 1000 m² of heliostats. In order to have a power station of a particular output requirement, these modules may be provided side by side in a grid formation on the ground and then connected together before being connected to a steam turbine generator. There is then no theoretical limit to the size of power station that these modules, connected together, can create.

Heliostat systems with the required solar concentrating characteristics and tracking control system capabilities to operate with the invention are commercially available.

In a particular embodiment the present invention comprises three components, which may be contained within a box and placed on top of a tower. These are:
- a solar receiver (solar energy collection layer) which is open at the bottom of the box (the aperture) such that the concentrated sun's rays can pass through the aperture, enter the solar receiver cavity and impinge on the cavity side of the solar receiver.
- a solid mass of heat regulating medium inside the box and in contact directly with the inner surface of the solar receiver.
- a tubular heat exchanger inside the box in thermal contact with the heat regulating medium, some distance away from the solar receiver cavity wall, through which a fluid may be passed to extract the heat energy from the solid medium.

The box in which these components are located may be fabricated from mild steel and the solar receiver at the aperture is attached to the box such that it forms part of the casing, and makes the casing continuous, thus the box is sealed to the atmosphere. An inert gas and or low pressure atmosphere may be provided in the box to inhibit, or preferably prevent, oxidation of any of the components which might otherwise occur at elevated temperatures.

All of the functional components in the box are thermally insulated from the casing using insulation materials except for the regulating medium which is in direct contact with the solar receiver casing inside the aperture.

A description of each of the components above is as follows:—

The solar receiver is manufactured from a special stainless steel alloy which is resistant to high temperatures. It is shaped such as to minimize the effects of re-radiation of heat energy back out through the aperture after it has been absorbed into the regulating medium, when the temperature within this medium exceeds the ambient temperature. The heat regulating medium is manufactured such that it forms a shell around the receiver cavity. The thickness of this shell determines the heat regulating capacity of the system. The amount of energy in the system is proportional to the mass of the regulating medium and to the heat capacity of the medium.

The regulating medium is desirably a material with properties including the ability to withstand very high temperatures, (up to 1200° C.), to have high thermal conductivity (in excess of 100 W/m²/K), to be thermally stable (not change form at high temperatures), have a low emissivity (low levels of heat radiation leading to losses from the storage), have a high specific heat (the ratio of the heat supplied to a unit mass of a substance to its consequent rise in temperature), chemically inert, so that it does not react with the other materials in the system and be non-toxic and non-hazardous so as to present minimal danger to workers or the environment.

Materials that possess these properties include materials with a high carbon content, such as graphite, pure carbon and hard coals (anthracite), silica, silicon carbide etc, or combinations of these materials, such as mixtures of carbon based materials and highly conductive metals (copper, gold, aluminium). Other suitable materials include cast iron, steel, aluminium, copper, alumina, silica, aluminosilicates, silicon carbide, silicon nitride, firebrick, chromite, magnetite, dense refractory concrete, metal oxides such as beryllium oxide, magnesium oxide, calcium oxide, strontium oxide, osmium oxide, lanthanum trioxide, yttrium trioxide, scandium trioxide, titanium dioxide, zirconium dioxide, hafnium dioxide, tantalum pentoxide, niobium pentoxide, alumina, silica, nickel oxide, and other inorganic materials such as silicon nitride, silicon carbide, boron carbide, tantalum carbide, titanium carbide, tungsten carbide, zirconium carbide, aluminium nitride, zirconium boride, spinel, mullite, forsterite, fireclay, dolomite, magnesite, high-alumina porcelains, high-magnesia porcelains, sillimanite, kyanite, zirconium silicate and mixtures of any two or more of the above.

The thickness of the regulating medium shell around the solar receiver may be as little as 40-50 mm, which would provide attenuation of the energy transfer from the solar receiver to the heat exchangers to cover fluctuations and short term gaps (of the order of seconds to minutes) in solar input, to thicknesses of 200-1000 mm which, depending on the total mass of the regulating medium, could provide a number of hours or days of output.

The heat exchanger system is embedded in the heat regulating medium, but on the outer edges of the shell of the regulating medium material. The heat exchanger may be made of a high nickel alloy or a stainless steel alloy tubing capable of withstanding temperatures up to 1000° C. and pressures of 200 bar although not necessarily both at the same time.

The heat exchanger tubing is designed to produce steam using the once through steam cycle. In this system, commonly used in cogeneration steam plants, the feedwater is preheated and pumped directly into the heat exchanger tubing embedded in the block. The water boils, undergoes the phase change from water to saturated steam, then is superheated all in the one length of tubing, before it emerges as superheated steam at the condition required to drive a steam turbine, commonly about 150° C. to about 550° C. and about 10 bar to about 80 bar.

Alternatively, the heat exchangers in the regulating media may be connected in series of 1, 2, 3, 4 or more, with the energy being progressively extracted as very high pressure hot water, commonly about 300° C. and 200 bar pressure, and then being converted to steam by reducing the pressure to create steam after it leaves the first blocks and then using the heat from the last blocks in the series for superheating before the steam reaches the turbine. In this way, the costs and losses associated with transporting the heat transfer fluid between the storage/boiler units and the turbine may be minimized.

A system according to the invention may, as discussed earlier, be used for steam production. Any suitable working fluid may be used to extract thermal energy from the stored heat. The following description is illustrative of a suitable system.

The station controller is programmed for a required steam temperature, pressure and flow rate. The station controller controls the water input pressure and determines which of the individual solar thermal regulators (solar energy collection devices) are employed for steam production. The station controller will utilise as many solar thermal regulators as necessary to meet the required steam temperature and quantity. The station controller receives information on the average temperature from the module controller of each individual solar thermal regulator and is programmed to predict the rate that each particular block will produce steam. The station controller decides which solar thermal regulators will be brought into operation and, from the average temperature of the block, is programmed to determine the rate of decline in the steam output.

There is also a steam attemperator, that uses water sprayed into the steam line, before the steam is sent to a process requirement or to a steam turbine and the station controller can make a final adjustment to the steam temperature to ensure that it is as required. The station controller receives the water flow rate from the module controller for each solar thermal regulator and the steam attemperator. The station controller determines the total flow from these sources to confirm that the final total steam quantity is as required. The station controller is continuously assessing the steam flow and will predict when it will be necessary to start the next solar thermal regulator.

The module controller is programmed to introduce water into the embedded heat exchanger within the solar thermal regulator at a rate so that the steam produced is within the predetermined range for steam temperature. If the steam temperature is too high then the water is introduced at a higher rate. Thus each solar thermal regulator may have a flow rate controller for controlling the flow rate of water.

As energy is extracted from the heat regulating medium, and the temperature thereof declines as a result, the rate at which water is introduced into the heat exchanger is decreased to maintain the output temperature for the steam within the predetermined range for steam temperature. The module controller manages the steam production for the individual solar thermal regulator, maintaining the steam production within the predetermined temperature range by controlling the rate that water is introduced into the embedded heat exchanger. The module controller is programmed to set the rate that the water is introduced dependant on the average temperature of the heat regulating material. The module controller opens or closes the control valve to ensure the required steam temperature is maintained. The variable flow rate is measured at a flow meter and this rate is sent by the module controller to the station controller.

As steam production decreases for an individual solar thermal regulator over time, to maintain a constant output from the overall system, multiple Regulators are used. Higher temperature regulators can potentially produce steam towards the top of the predetermined temperature range whereas regulators at a lower temperature would potentially produce steam at the lower end of the predetermined range. The different output of the individual regulators is used to advantage by the station controller.

A collector for use in a solar energy collection device according to the present invention is shown in FIG. 1. The principle features of the concentrator of FIG. 1 are:

1. energy collection layer 1—this functions as a solar receiver and is shaped so as to define a cavity inside the solar collector. The energy collection layer is constructed of stainless steel and coated with a protective layer (not shown) comprising a protective material.

2. Solid heat regulating medium 2 having high specific heat, high temperature tolerance, high, thermal conductivity, low emissivity, thermally stable, non toxic and low environmental risk.

3. Heat exchanger tubing 3 embedded in the heat regulating medium matrix 2, 4. Insulation material 4 surrounding the heat regulating medium 2 to reduce heat losses.

5. Inert gas supply and control valve 5 for supplying inert gas to the insulation material 4 so as to reduce or minimise thermal oxidation.

6. Feedwater inlet control valve system 6. This is provided in order to feed heat transfer fluid to the heat exchanger tubing 3.

7. Steam/H.T. hot water outlet and control valve system 7. This is provided in order to allow the heated heat transfer fluid (either in liquid or vapour form) to leave the collector for use, e.g. in generating electricity.

8. Porous insulating material (e.g. insulating bricks) 8 to support regulating medium 2.

9. Aperture 9 to solar receiver/collector. Commonly the concentrator (not, shown in FIG. 1) will focus energy into the aperture 9 so that the maximum available energy is provided to the cavity.

10. Mild steel casing 10 of collector. This surrounds insulation 4.

11. Heat shield 11 constructed of high temperature lip material around aperture 9. This is provided to prevent damage to surrounding materials due to the high temperatures generated about the aperture due to concentration of solar energy there.

12. Steel support structure 12 for box. This is insulated from the heat regulating medium 2 by porous insulation 8, and may be used to mount the collector on a tower.

In use, solar energy from the concentrator is focussed into aperture 9. It then passes into the collector, and impinges on energy collection layer 1. The protective layer on layer 1 enhances absorption of solar energy, and may also inhibit reradiation of the energy out of the collector. Energy collection layer 1 transfers the solar energy in the form of heat to heat regulating medium 2, which heats the heat transfer fluid in heat exchanger tubing 3. As noted earlier, due to the high thermal mass of medium 2, fluctuations in the solar energy entering aperture 9 are evened out so that a constant supply of heated heat transfer fluid may be provided. Inert gas supply 5 supplies inert gas to insulation 4 so as to as prevent or inhibit oxidation of materials in the collector. Insulation. 4 reduces heat loss from heat regulating medium 2 to the outside, and is contained in mild steel casing 10 for structural integrity. Heated heat transfer fluid exits the collector via outlet 7. It may then be used directly for heating purposes, or may be converted using conventional means to electricity.

Figure 6:
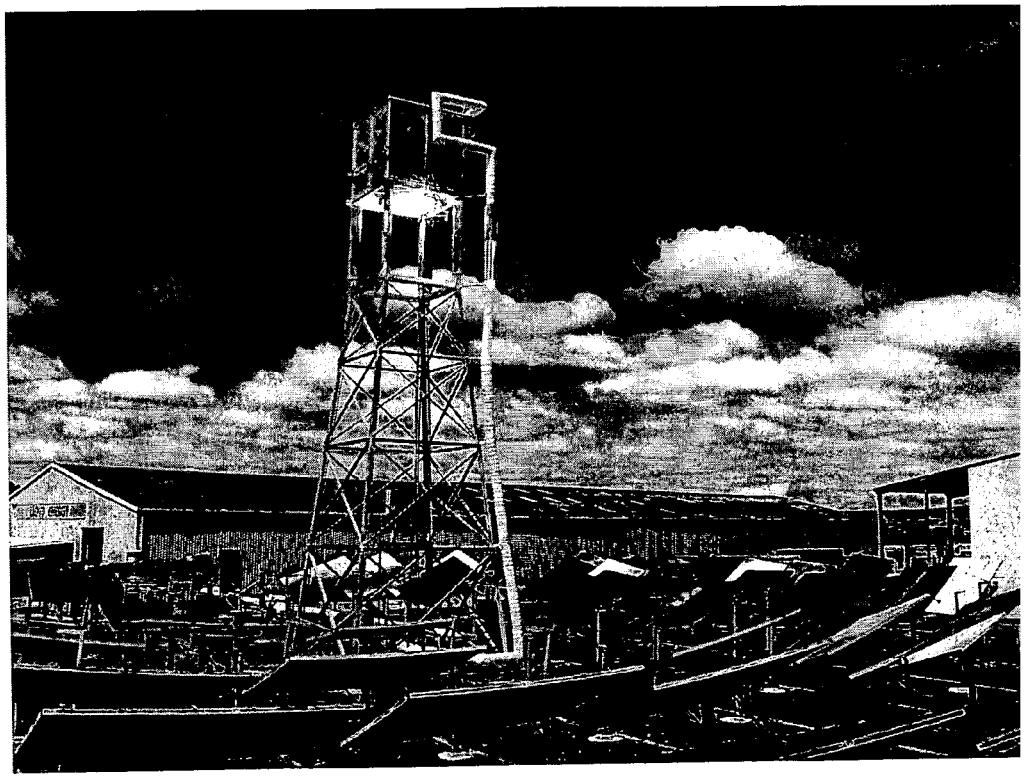
FIGS. 6 to 9 are photographs of solar collectors as described herein.
Figure 7:
Figure 8:
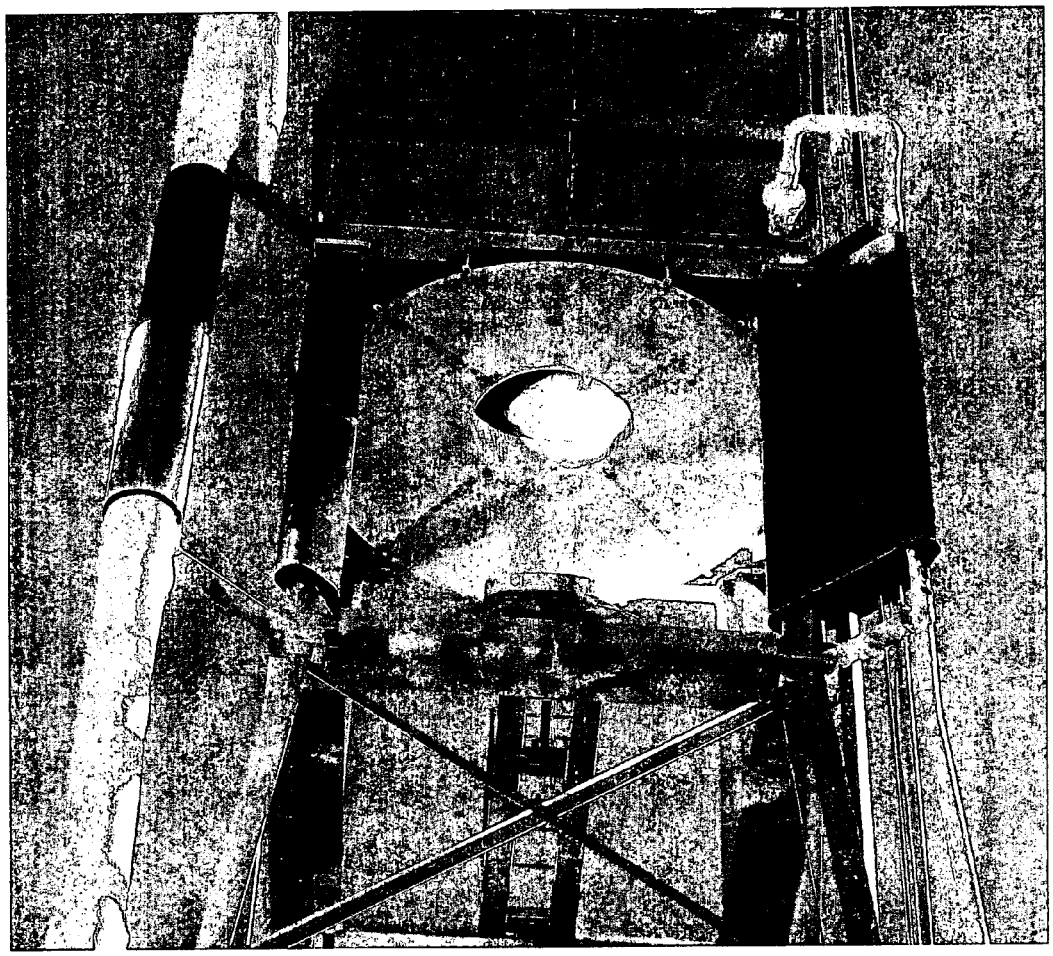

FIGS. 6 to 8 show photographs of the invention or portions thereof. Thus FIG. 6 shows a tower having a solar collector according to the invention and a solar energy concentrator comprising an array of mirrors for concentrating energy on the solar collector. FIGS. 7 and 8 show closer views of the collector, looking upwards at the cavity.

Figure 9:
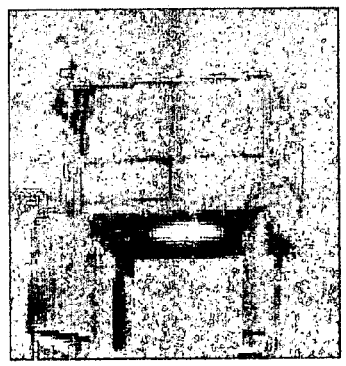

FIG. 9 shows a solar collector according to the invention, having the following specifications:

Dimensions 2.8 m*2.8 m*2.8 m

Weight approximately 14-15 Tonnes (gross); approximately 10 Tonnes (graphite content)

Thermal storage capacity 11.5 GJ (3.2 MWhth)

Thermal output capacity up to 1500 kW

Maximum thermal input rate 500 kW@1000° C.

Typical boiler rating (can be varied): hot water generation capacity (at outlet) pressure 150 bar A (max. 200 bar A), T 280° C. (max. 320° C.); steam generation capacity (at outlet) pressure 40 bar A (max, 50 bar A), T 400° C. (max. 550° C.)

Features of the present invention include:
The elevation of the regulator block on a tower enables high temperatures to be achieved.
The invention provides high thermal regulating density and efficient generation of electricity;
A fully integrated thermal regulating system at the point of collection provides high efficiency;
The modular design provides easy scale-up, simple construction and ready deployment.

In one form the invention provides a solar collection system comprising:
a plurality of slabs of a graphite heat regulating medium arranged around a cavity and in contact with an energy collection device;
a solar energy concentrator to concentrate the sun's rays to heat the energy collection device and thereby heat the heat regulating medium;
a first heat exchanger at least partly inside or in proximity to the heat regulating medium to recover heat energy from the heat regulating medium in a heat transfer fluid; and
a heat transfer fluid circuit to transfer heat in the heat transfer fluid to a second heat exchanger to generate steam.

In another form, the invention provides a method for collecting solar energy and recovering heat energy, said method comprising:
arranging a plurality of slabs of a graphite heat regulating medium around a cavity and in contact with an energy collection device to be heated;
concentrating the sun's rays to heat the energy collection device and thereby heat the heat regulating medium;
recovering heat energy from the heat regulating medium in a heat transfer fluid; and
transferring heat in the heat transfer fluid to a heat exchanger to generate steam.

Figure 11A:
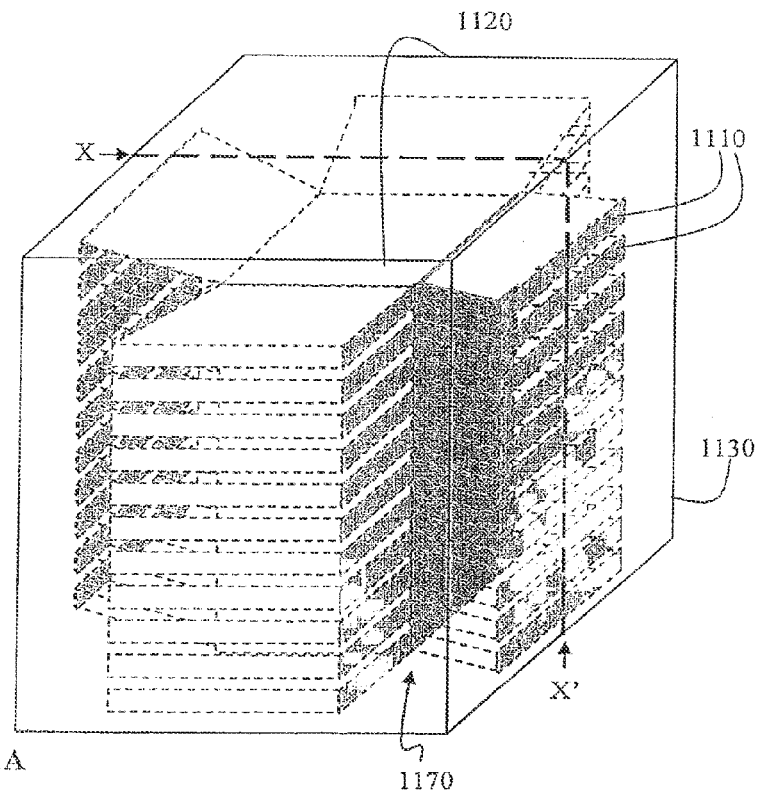
FIGS. 11 to 16 show diagrammatic representations of different aspects of the solar collector.
Figure 11B:
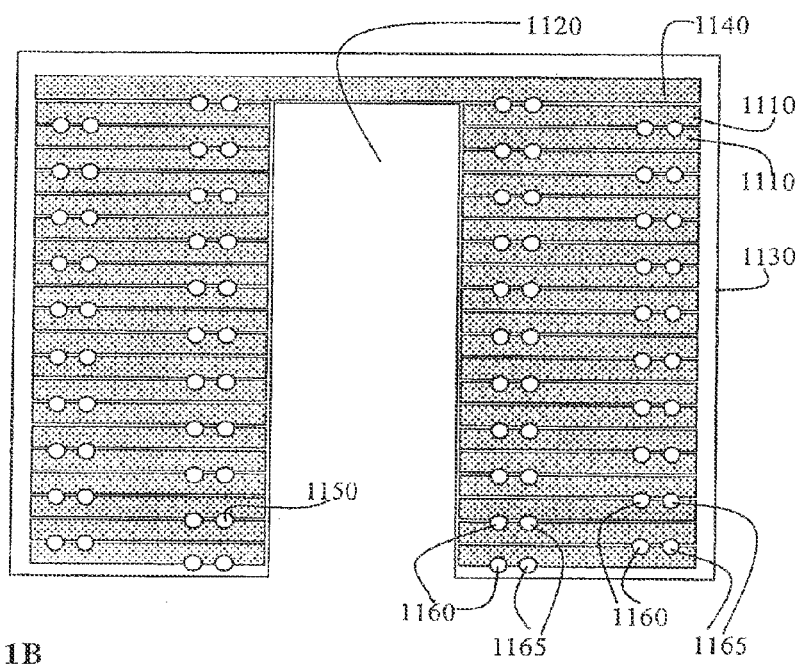

The graphite heat regulating medium may be a synthetic graphite heat regulating medium. The graphite heat regulating medium may be a non synthetic graphite heat regulating medium. FIG. 11 shows the construction of a solar collector according to the present invention. Thus slabs 1110 (only two are indicated specifically, although the figure shows a large number of them) are shown stacked on all four sides of a square aperture 1120, which is lined with an energy collection device (not shown). Slabs 1110 are shown here for simplicity as being approximately rectangular, however as shown in FIG. 10, the actual shape is somewhat more complex. The assembly of slabs 1110 is located inside a housing 1130, and the region between slabs 1110 and housing 1130 is filled with insulating material, commonly a fibrous or porous insulating material. Illustration A of FIG. 11 shows a perspective view of the collector, and illustration B shows a cross-section along X-X'. Illustration B shows top slab 1140 (which is necessarily a different shape and size to side slabs 1110), which sits on top of the energy collection device that lines aperture 1120. Illustration B also shows the disposition of heat exchanger tubing within the assembly of slabs 1110. As may be seen, the heat exchanger tubing fits within cavities (e.g. 1150) which are formed from two matching grooves in adjacent slabs. In each face of the assembly of slabs there are two parallel heat exchanger tubings. These are labelled 1160 and 1165 for the right hand set of slabs in illustration B. It will be understood that other (unlabeled) tubing portions higher up in the assembly are also connected to these. The fluid connections between these tubings are located in spaces at the corners of the assemblage, labelled for example as 1170 in illustration A, although the connections are not shown explicitly for purposes of simplicity (these are shown in later figures). The lower ends of these tubings are connected to a ring main (not shown) and the upper ends to a manifold that passes above housing 1130.

Figure 12:
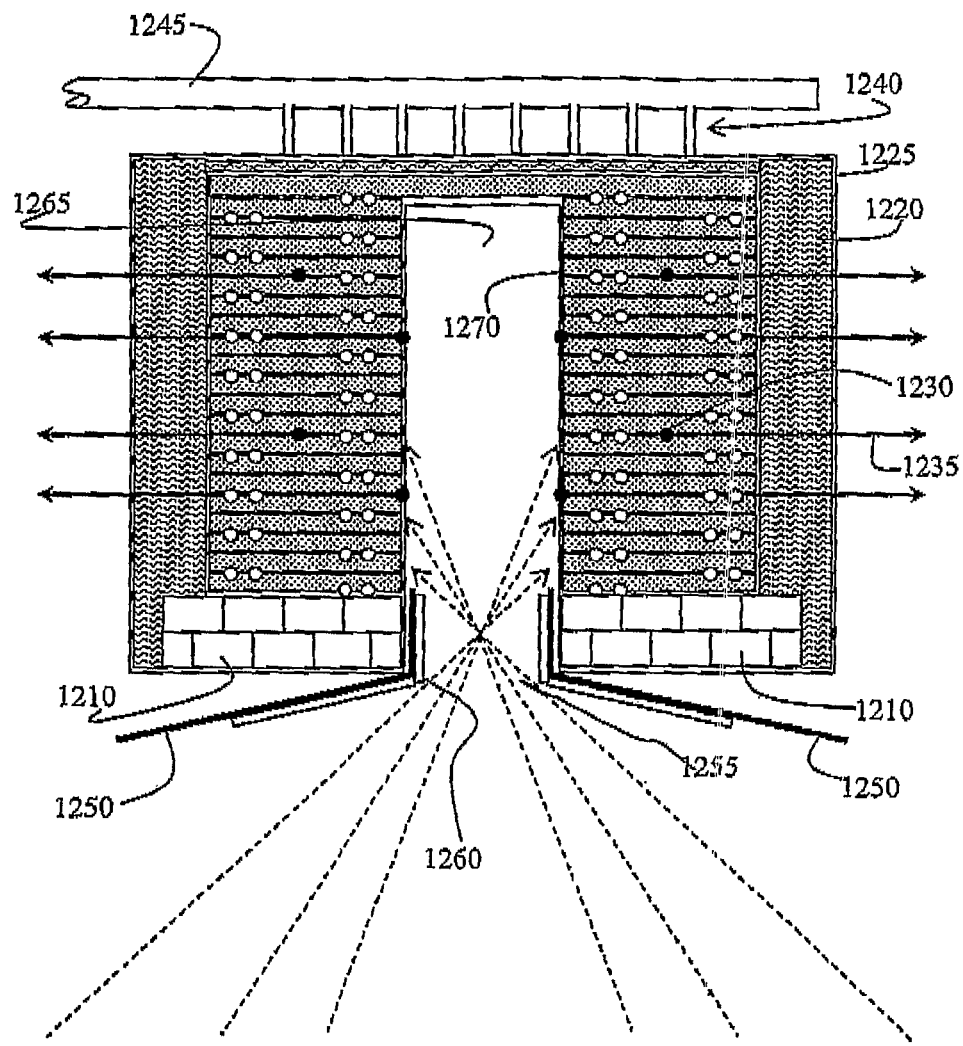

FIG. 12 shows a more detailed cross-section of a solar collector similar to that of FIG. 11. Additional features in FIG. 12 include thermally insulating bricks 1210 which support the slabs of heat regulating medium and which protect them in case of incident solar radiation from below. Thermal insulation 1220 is shown between the slabs and housing 1225. Thermocouples (for example 1230) are shown at varying depths within the slabs for monitoring temperature in the solar collector and for providing data for control of the collector. Temperature related signals are relayed from the thermocouples through electrical connections (for example 1235), which lead to a module controller (not shown). The heat exchanger tubing between the slabs exit the housing through tubes 1240 and their combined outputs (e.g. steam or hot water) pass through manifold 1245. Shield 1250 is provided to protect the lower portion of housing 1225 from solar radiation damage and extends inside the lower regions of cavity 1265. It has a shield aperture, which aligns with aperture 1255 so as to allow solar radiation to enter into cavity 1265. It has insulation 1260 on a surface of part thereof to provide additional shielding. Thus in operation, solar energy from a solar energy concentrator is focussed through the shield aperture and aperture 1255 into cavity 1265 where it impacts on energy collection device 1270. This heats device 1270, which transfers the heat energy to the slabs, and thence to heat transfer fluid in the heat exchanger tubing. In one example, this is converted to steam, which passes through tubes 1240 to manifold 1245. This may be passed to an external heat exchanger or may be used as process steam or to generate electricity directly as required.

Figure 13A:
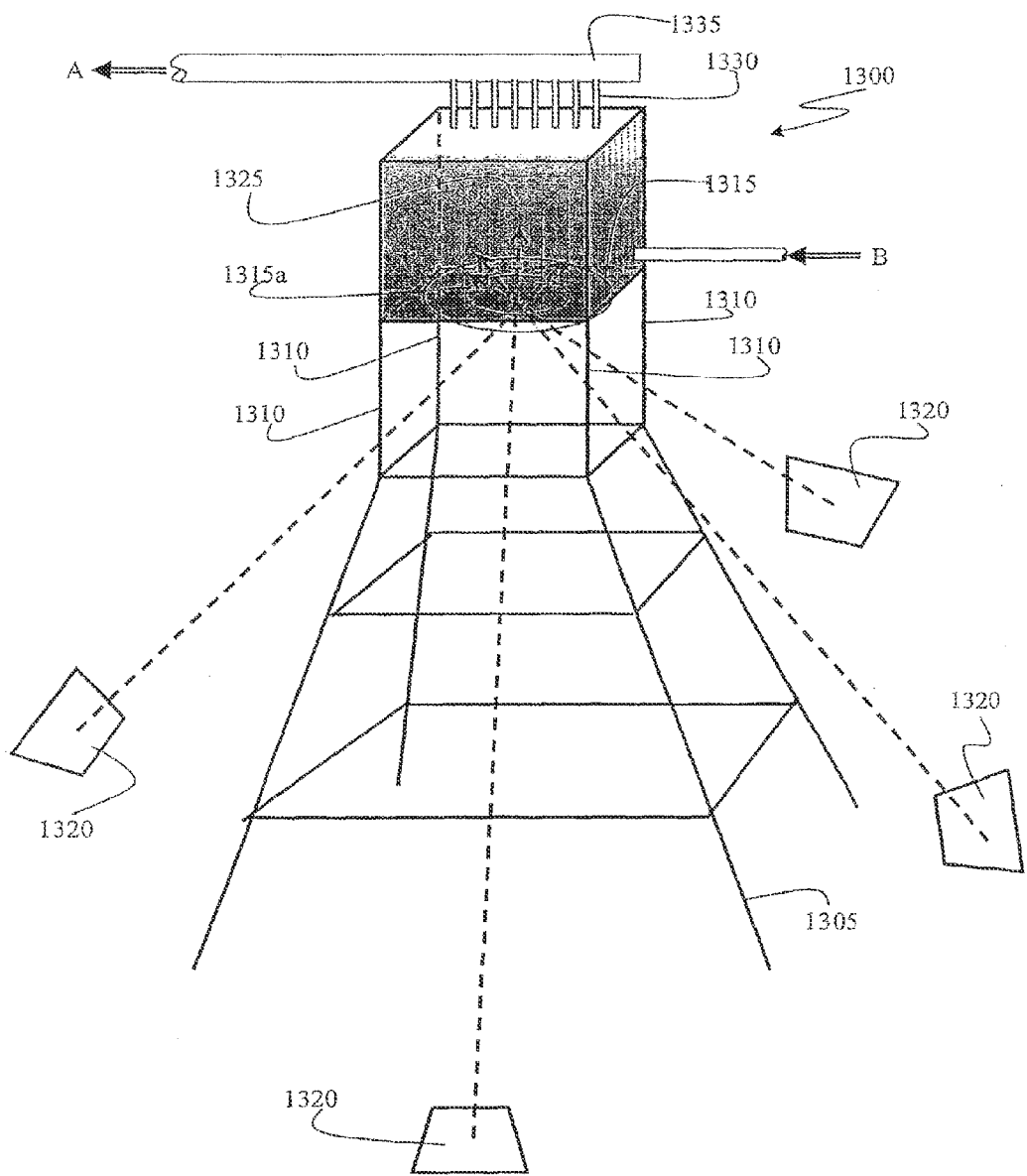

FIG. 13A shows a diagram of a solar energy collection device according to the invention. Thus solar collector 1300 is supported on tower 1305 by means of vertical poles 1310. Circular shield 1315 is shown below collector 1300, and is provided as protection for collector 1300 from solar radiation. A solar energy concentrator is provided in the form of reflectors 1320. These are disposed so as to direct solar radiation into cavity 1325. As described above, solar radiation entering cavity 1325 is used to heat a heat transfer fluid in heat exchanger tubing embedded in collector 1300. This fluid passes out of collector 1300 through tubes 1330 and into manifold 1335 which leads it to where it is subsequently used. Circular shield 1315 has a circular aperture 1315*a*.

Figure 13B:
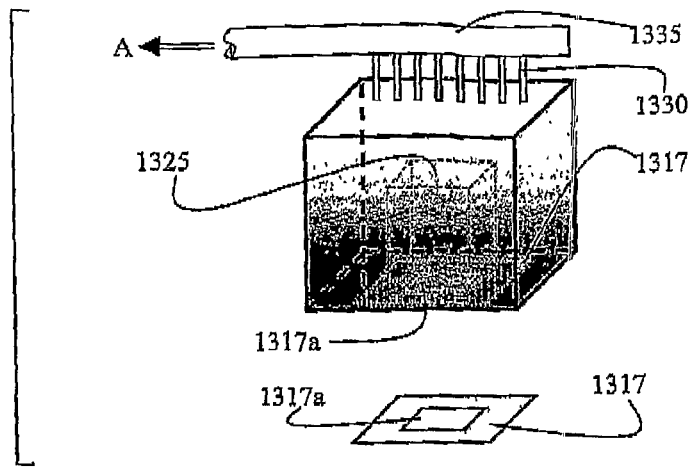

FIG. 13B shows a diagram of a solar energy collection device according to the invention as depicted in FIG. 13A except shield 1317 is a square shield with a square aperture 1317*a*. Alternative shapes for the shield and/or aperture could be used as require (e.g. rectangular, oval, elliptical, diamond polygonal shaped, eta).

Figure 14:
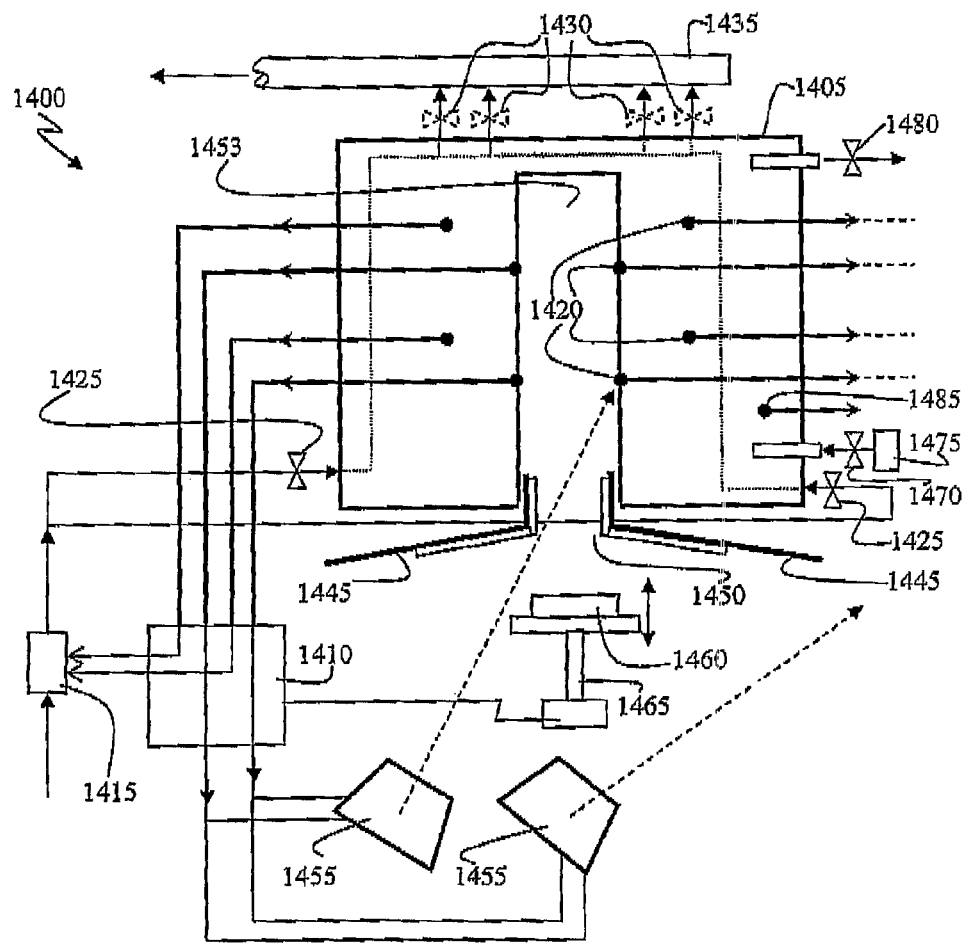

FIG. 14 illustrates some of the control system elements of a solar energy collection device. Device 1400 comprises solar collector 1405. Module controller 1410 is a processor, e.g. computer or PLC (programmable logic controller) for controlling the operation of collector 1405. Station controller 1415 is provided to control a collection of devices similar to device 1400, and is coupled to module controller 1410 in order to send control signals to device 1400 and to receive data signals therefrom. Thermocouples 1420 are located at various positions inside the heat regulating medium of collector 1405 for monitoring temperatures at different locations. These send signals as indicated, either to module controller 1410 or directly to station controller 1415. Valve 1425 controls the flow of heat transfer fluid into the heat exchanger tubing of collector 1405 and valves 1430 control flow of heat transfer fluid out of the heat exchanger tubing to manifold 1435. Valves 1430 are optional and may not be present. In the event that they are not present, heated heat transfer fluid can pass directly into manifold 1435. Shield 1445 is provided to protect the lower face of collector 1405 from incident solar radiation, and has insulation on a part of the surface thereof (illustrated but not numbered). It extends partway into cavity 1453, so as to shield the lower portion from solar radiation. It has shield aperture 1450 which allows solar radiation from reflectors 1455 to enter cavity 1453. Reflectors 1455 are fitted with motors (not shown) which are capable of moving reflectors 1455 in response to control signals from module controller 1410. Plug 1460 is disposed so as to be insertable into shield aperture 1445 so as to restrict heat loss from cavity 1453 at times when there is no solar energy entering the cavity. Plug 1460 is supported on plug insertion mechanism 1465 which is capable of inserting and removing plug 1460, and which responds to a control signal from module controller 1410. An inert gas system is provided so as to prevent oxygen entering collector 1405 and oxidising materials (e.g. the heat regulating medium) therein. Thus inlet valve 1470 controls flow of inert gas from a source of inert gas (1475). In some instances an exit valve 1480 may be present to control flow of inert gas out of collector 1405, although in some instances this is not present, and any inert gas exiting collector 1405 does so from minor unintentional leak points in the housing of collector 1405. Pressure sensor 1485 is disposed inside collector 1405 so as to monitor the pressure of inert gas therein, and to provide a pressure signal to module controller 1405. This enables control of inlet valve 1470 by module controller 1405.

In operation, when insolation is sufficient, module controller 1410 signals plug insertion mechanism 1465 to remove plug 1460 so as to allow solar radiation to enter cavity 1453 through shield aperture 1450. It also signals the motors of reflectors 1455 to direct solar radiation as described into cavity 1453. Station controller 1415 signals valves 1425 to open and to allow the required amount of heat transfer fluid to pass through collector 1405, thereby heating the heat transfer fluid. In an example this fluid is water, which converts to steam as it passes through collector 1405. Station controller 1415 also signals valves 1430 to allow the steam to exit, and control the pressure of the steam as it exits into manifold 1435. A suitable, slightly greater than ambient, pressure of inert gas is maintained in collector 1405. Thus when sensor 1485 signals a pressure to module controller 1410 that is below a predetermined pressure, a signal is sent to valve 1470 to open for sufficient time to increase the pressure of inert gas to the required range. This pressure increase triggers a control signal to close valve 1470 so as to prevent further pressure build up in collector 1405. Thermocouples 1420 provide constant temperature feedback signals to module controller 1410. In the situation shown in FIG. 14, the temperature has risen to an upper limit. This has triggered module controller 1410 to signal the right hand reflector 1455 to direct solar radiation away from cavity 1453 to avoid further temperature increase. As heat transfer fluid passes through collector 1405, energy will be lost, resulting in cooling. This will eventually trigger a signal to reflectors 1455 to both direct solar radiation to cavity 1453 so as to increase the energy input. The function of station controller 1415 is to control the combined operation of a number of controllers such as 1410. Thus it may switch controllers off and on as necessary to provide the required quality and quantity of output energy (e.g. in the form of steam from manifold 1435).

In operation, the heat regulating medium may be heated to a temperature of between about 500 and 1000° C., or about 500 to 700, 700 to 1000 or 600 to 800° C. (e.g. about 500, 550, 600, 650, 700, 750, 800, 850, 900, 950 or 1000° C.). If the temperature threatens to exceed an upper boundary temperature, a control system may either increase the amount, of heat transfer fluid passing through the heat exchanger tubing, so as to increase the removal of heat from the medium, or may turn off (park) one or more reflectors to reduce the incoming energy to the collector. The heating of the heat regulating medium is by means of heat transfer from the energy collection device. Thus at least a part of the surface of the energy collection device facing the cavity is heated by solar radiation which enters the cavity through the aperture.

Figure 15:
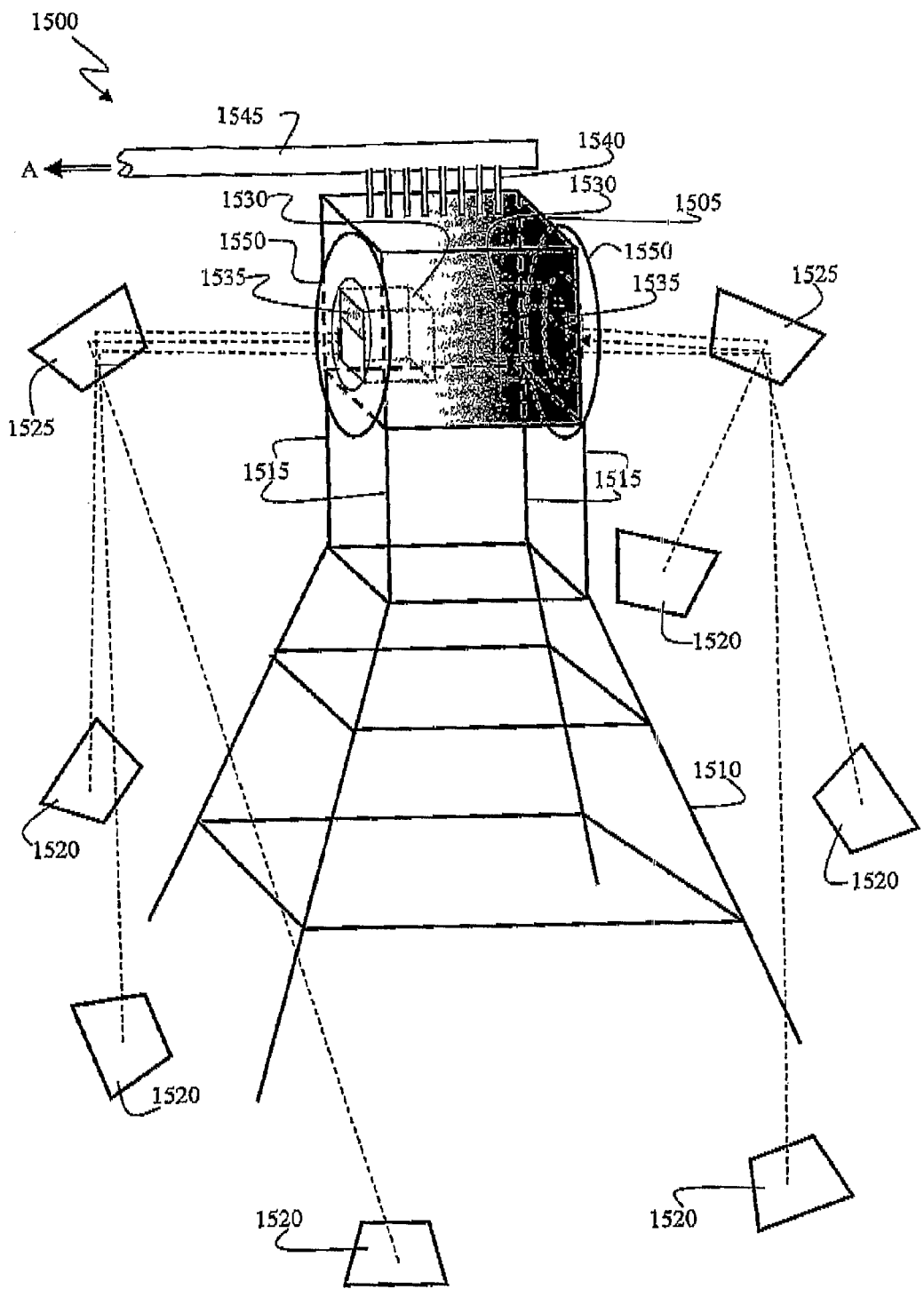

FIG. 15 illustrates a solar collection, device in which solar energy is directed into apertures at the side of the solar collector rather than in the lower surface thereof. Thus in device 1500, solar collector 1505 is supported on tower 1510 by means of four vertical poles 1515. An array of reflectors 1520 is disposed at or near ground level for collecting solar radiation. Commonly, as with the other solar collection devices described herein, these will be disposed around tower 1510, although in some cases they may be only on one side thereof. Only 6 reflectors 1520 are shown for reasons of simplicity, but in practice a far larger field of reflectors is likely to be used. This is illustrated in a later figure. The array of reflectors 1520 will have corridors having no reflectors—these corridors will be arranged so that the reflectors do not direct solar energy towards poles 1515. Elevated reflectors 1525 are disposed so as to reflect solar radiation coming from reflectors 1520 towards solar collector 1505. Solar collector 1505 has two cavities 1530 which are disposed so as to accept concentrated solar radiation from reflectors 1525 through apertures 1535. In some instances apertures 1535 allow radiation only into a lower portion of cavities 1530. This facilitates the trapping of heated air within cavities 1530. Outlets 1540 are provided to convey heated heat transfer fluid from heat exchanger tubing (not shown) in collector 1505 to manifold 1545. Shields are provided in order to protect material surrounding apertures 1535 from damage from stray solar radiation in to use.

In use, solar radiation impinges on reflectors 1520, which have been oriented by means of a control system (similar to that described in connection with FIG. 14) so as to direct the solar radiation to elevated mirrors 1525. As shown, there are only two elevated mirrors and two cavities. In practice there may be more cavities in collector 1505. Each cavity may be associated with a single elevated reflector, or each reflector may be capable of directing solar radiation into more than one cavity (optionally at different times of day) or there may be more than one elevated reflector directing radiation into each cavity. As the radiation impinges on an energy collection device disposed in the cavity, the energy collection device heats and transfers heat energy to heat transfer medium in the collector. This in turn heats heat transfer fluid in heat exchanger tubing within the collector. The heated heat transfer fluid (commonly hot water or steam) then passes out of collector 1505 to conduit 1545 through outlets 1540.

Figure 16A:
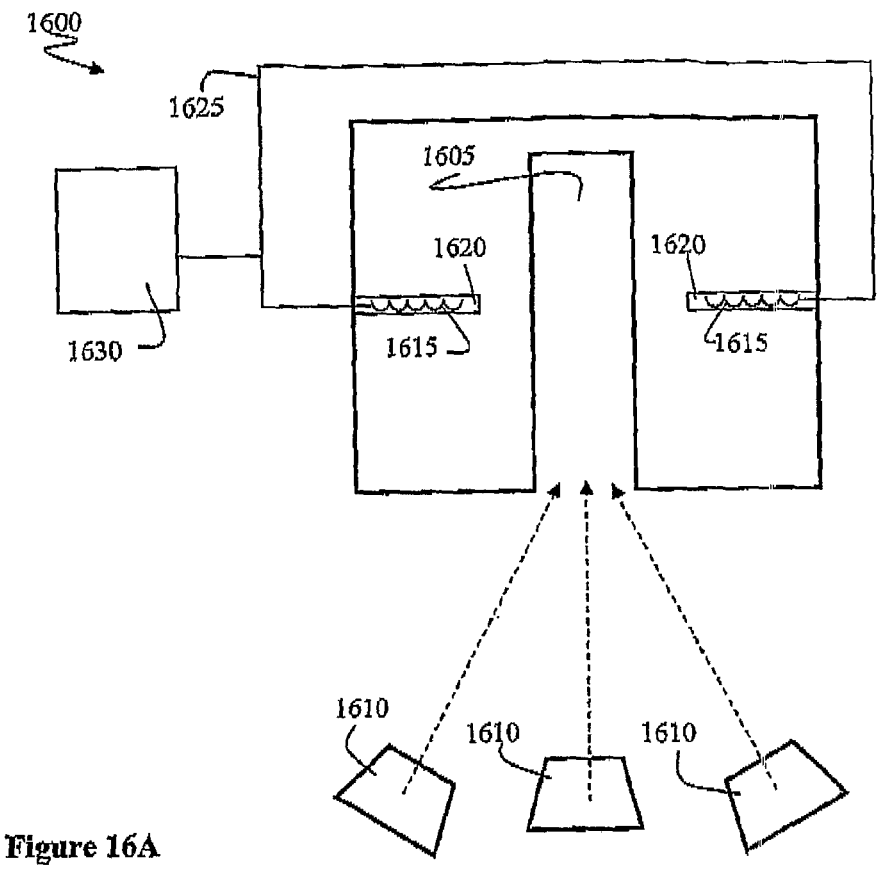
Figure 16B:
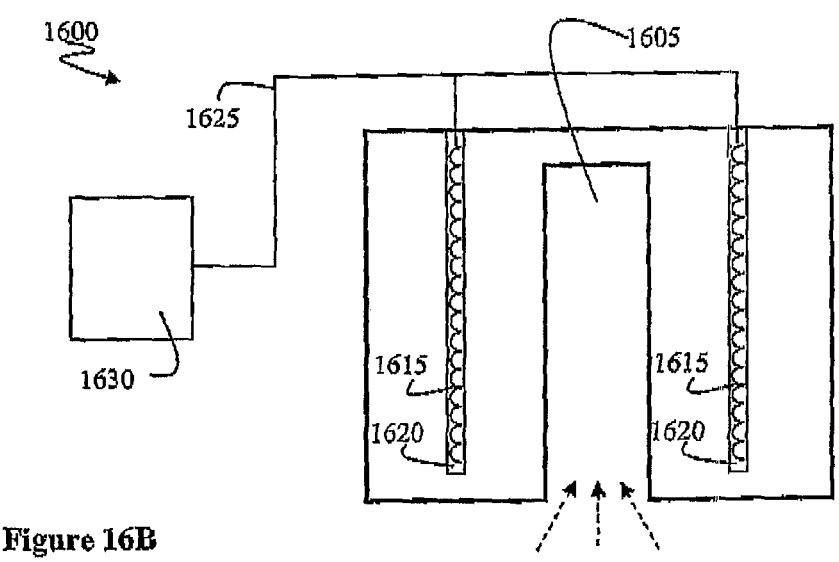

FIGS. 16 (A and B) shows a solar collection device in which a supplementary energy source may be used to complement solar energy as an energy input. Thus in FIG. 16, solar collector 1600 comprises a cavity 1605 for accepting solar radiation from reflectors 1610, as has been discussed previously. Collector 1600 also comprises embedded resistors 1615 in resistor cavities 1620. These are commonly electrically insulated from heat regulating medium in collector 1600. Details of electrical heating of a heat regulating medium such as graphite are provided in WO95/25416, the contents of which are incorporated herein by cross-reference. FIG. 16A shows a situation in which the resistor cavities 1620 are horizontal and FIG. 16B has vertical, resistor cavities 1620. It will be apparent that the resistor cavities 1620 may be at any desired angle, and may pass from the top, bottom or side of collector 1600 (or may pass from more than one of these). There may be only one resistor cavity 1620, or may be two as shown in FIG. 16, or may be 2, 3, 4, 5 or more than 5 as required. A circuit 1625 is provided to transmit electric current from source 1630. Commonly source 1630 will be capable of generating electricity from a source of renewable energy such as wind energy etc. It may be a hydroelectric generator. In use, collector 1600 will absorb solar radiation from reflectors 1600 as described previously. It can also absorb heat energy which is generated from electricity passing through resistors 1615. This facilitates the provision of energy from collector 1600 in a continuous fashion, since, when solar energy is unavailable (e.g. in overcast conditions or at night) energy input from source 1630 can continue to heat collector 1600 and enable it to produce an energy output. In construction of a collector such as that in FIG. 16A, one or more of the slabs (see FIG. 11) may have a preformed resistor cavity 1620 into which the resistors 1615 are fitted, either before or after assembly. In construction of a collector such as that in FIG. 16B, appropriate slabs may have holes which, when the slabs are assembled, line up to form resistor cavities 1620. In this case it is preferable that the resistors 1615 are inserted after assembly of the slabs.

In some forms of this system, there is extra height of heat regulating medium provided above the cavity so as to accommodate resistors 1615. Thus extra slabs of heat regulating medium may be added during construction of the collector, those extra slabs being adapted to accommodate resistors 1615.

Figure 17:
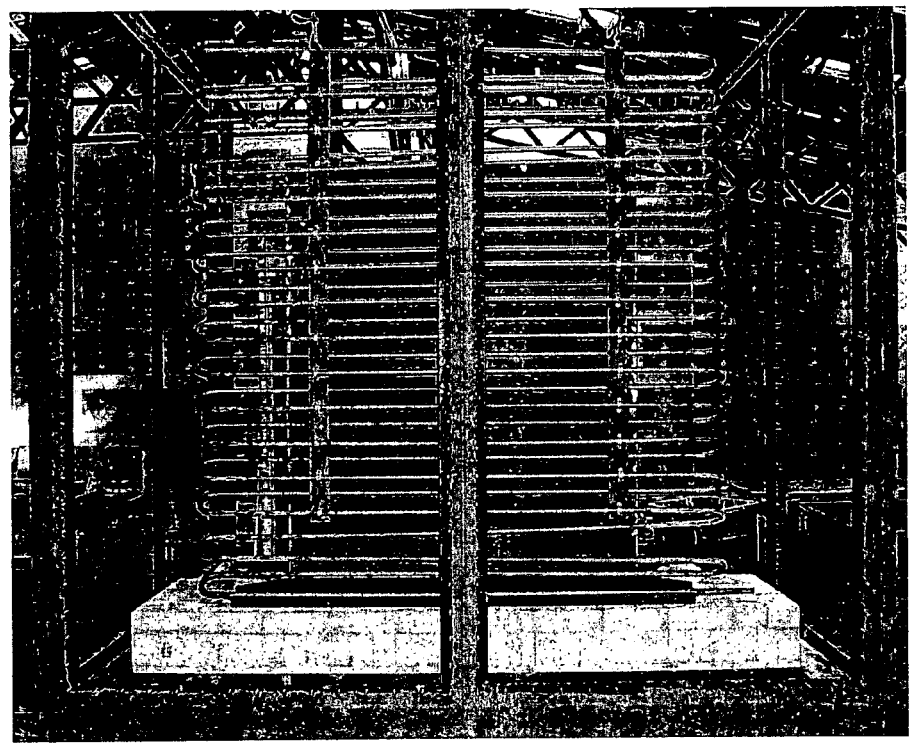
FIGS. 17 to 28 are photographs of the collector and portions thereof, both during construction and in final form.
Figure 18:
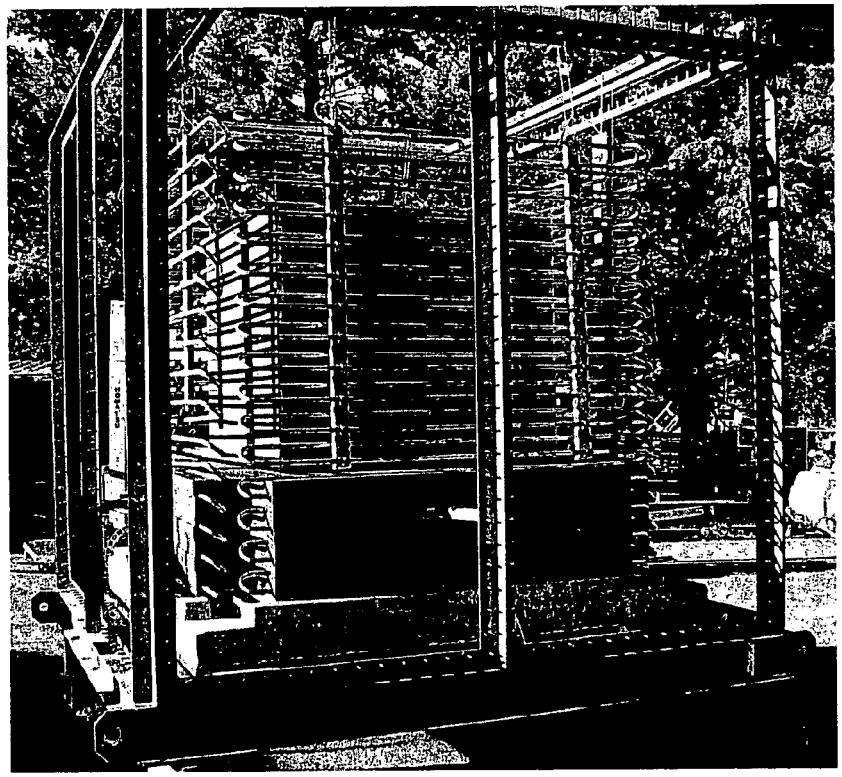
Figure 19:
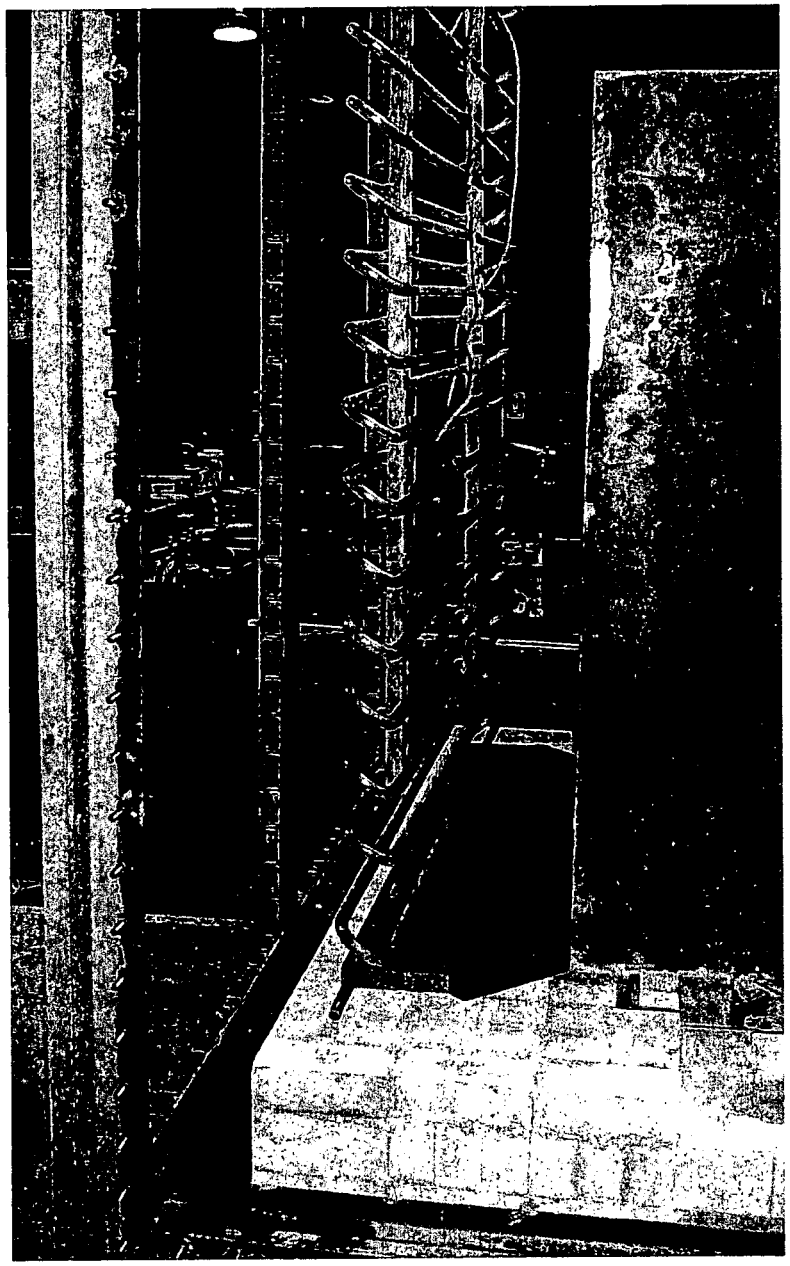
Figure 20:
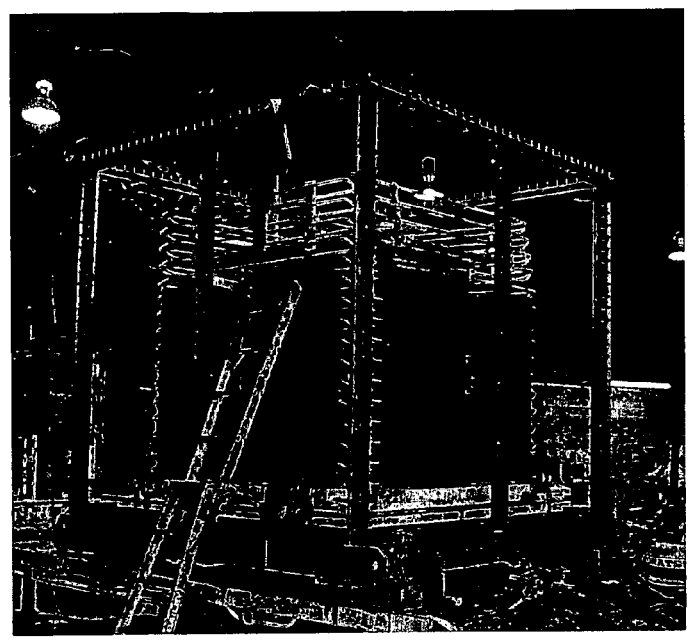
Figure 21:
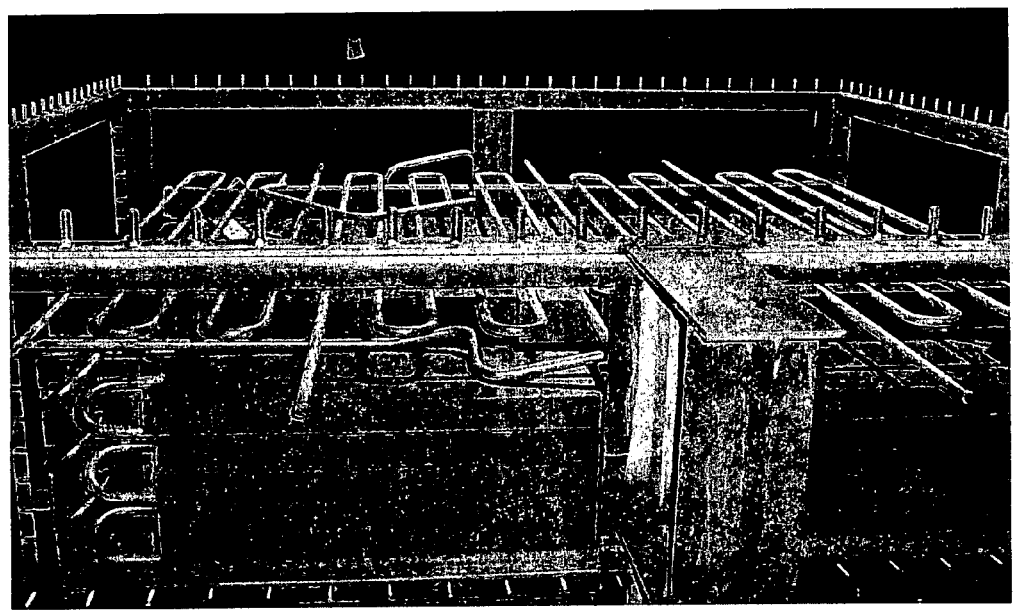

FIGS. 17 to 21 illustrate the construction of a solar collector. In FIG. 17, a frame can be seen which supports and forms part of a housing of the solar collector. A lower face of the solar collector can be seen, on which ceramic bricks are layed. These will support the slabs of heat regulating medium. Above the bricks can be seen the heat exchanger tubing, supported on a frame. Only one set of tubing can be seen here, however similar tubing will be present on each of the four faces. Behind the heat exchanger tubing can be seen one face of the energy collection device, which is in the form of a square cross-sectioned parallelepiped. FIG. 18 shows a further stage of construction of the solar collector. Several of the slabs of heat regulating medium on each face of the collector have been put in place. The curves of the heat exchanger tubing may be seen protruding from the ends of the slabs that have been assembled. FIG. 19 shows a side view of an early stage of construction of a solar collector. This provides a clear view of the heat exchanger tubing. In some embodiments of the invention, a second heat exchanger tubing is present (this would be located between the tubing shown in FIG. 19 and the energy collection device visible on the right of the figure). In this case, these may be fed from below by a single ring main, and may be manifolded above the collector to an outlet manifold. FIG. 20 shows a further stage of construction in which most of the slabs of heat regulating medium are in place. FIG. 21 shows the top of the collector under construction. The heat exchanger tubing, most of which is embedded in the assembly of heat regulating slabs, passes along the top of the energy collection device so that, in use, further energy can be absorbed by heat transfer fluid therein. The outlet tubes for the heat exchanger tubing can be seen extending vertically from the frame across the closer edge of the frame.

Figure 22:
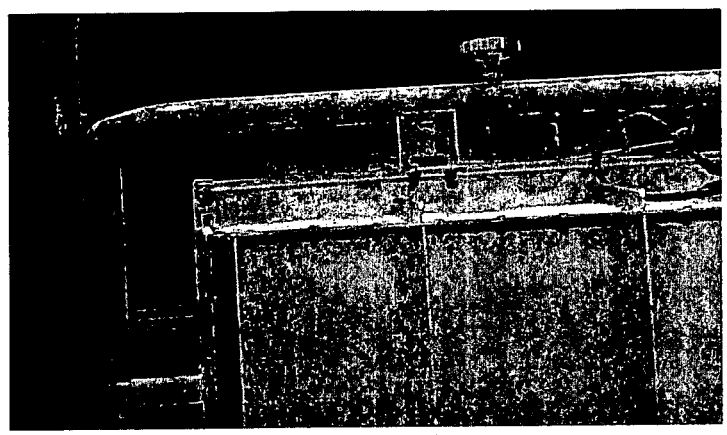
Figure 23:
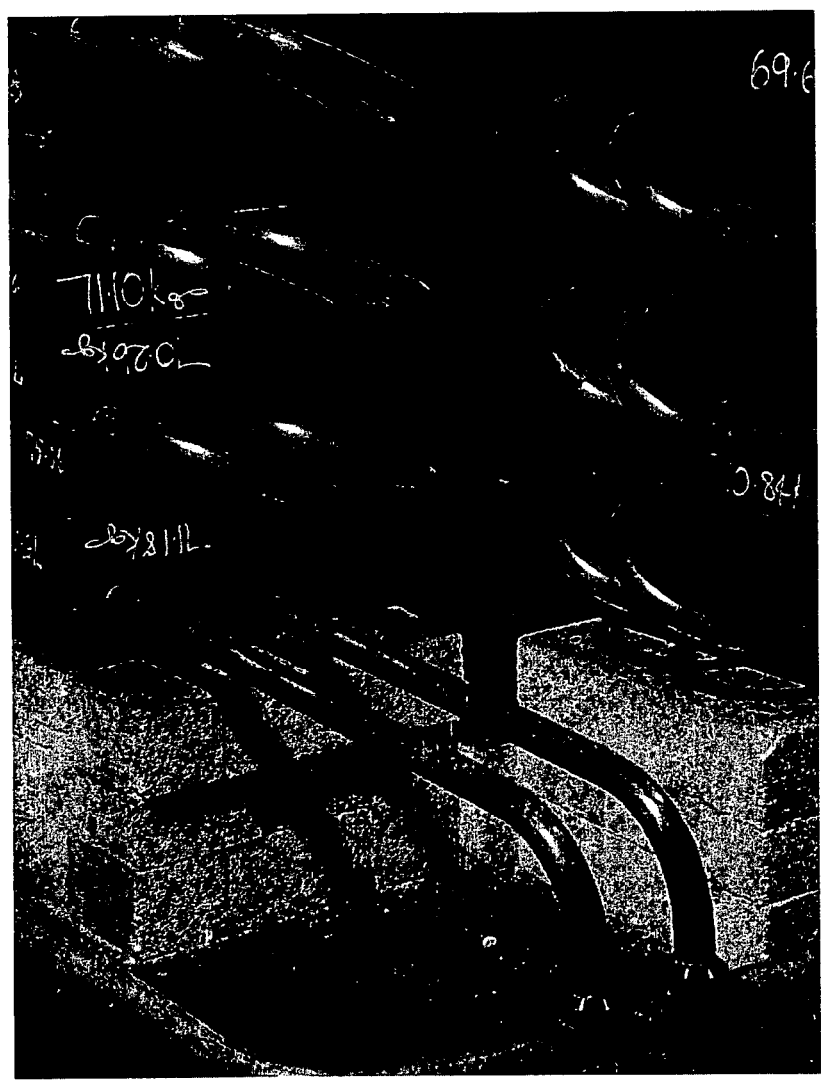
Figure 24:
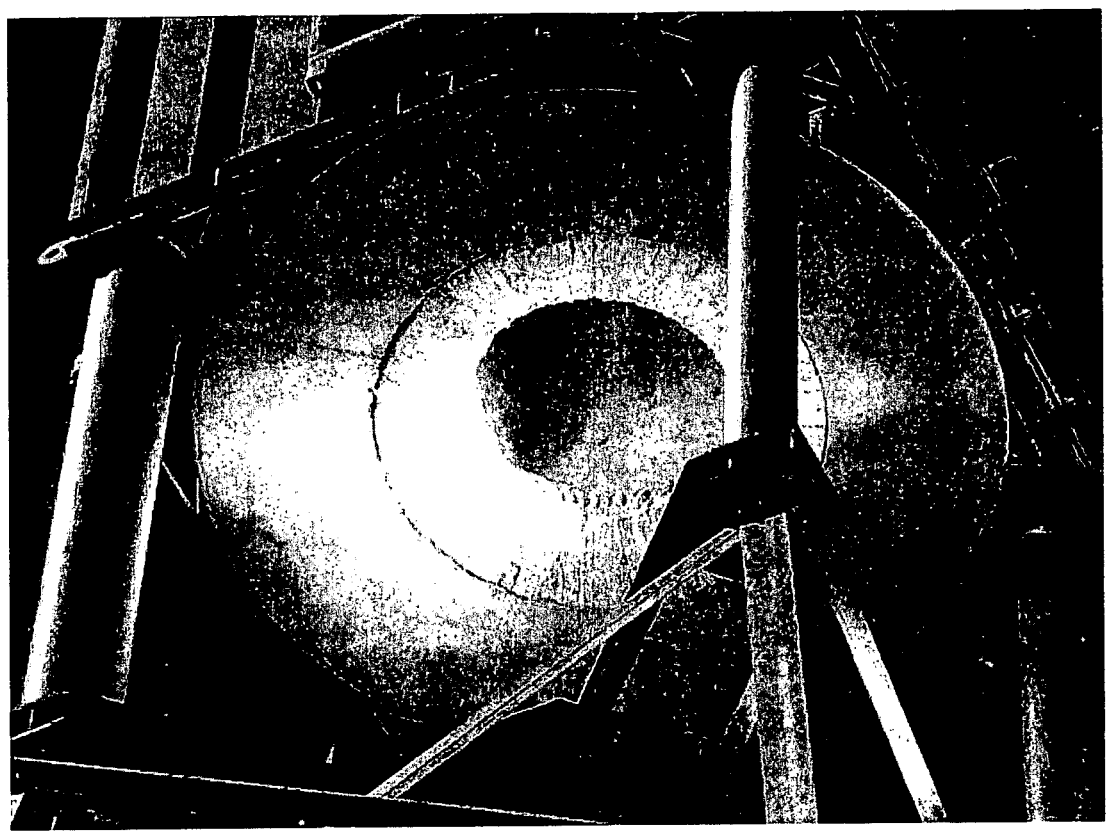
Figure 25:
Figure 26:
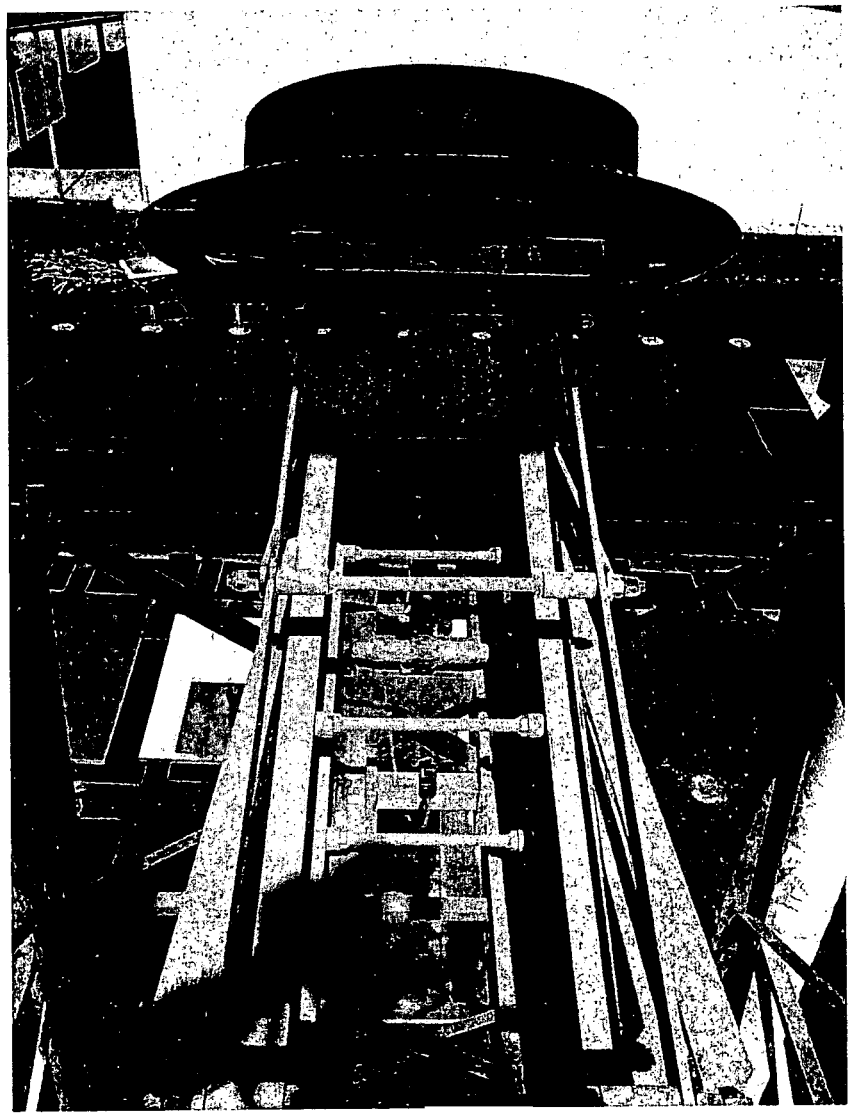
Figure 27:
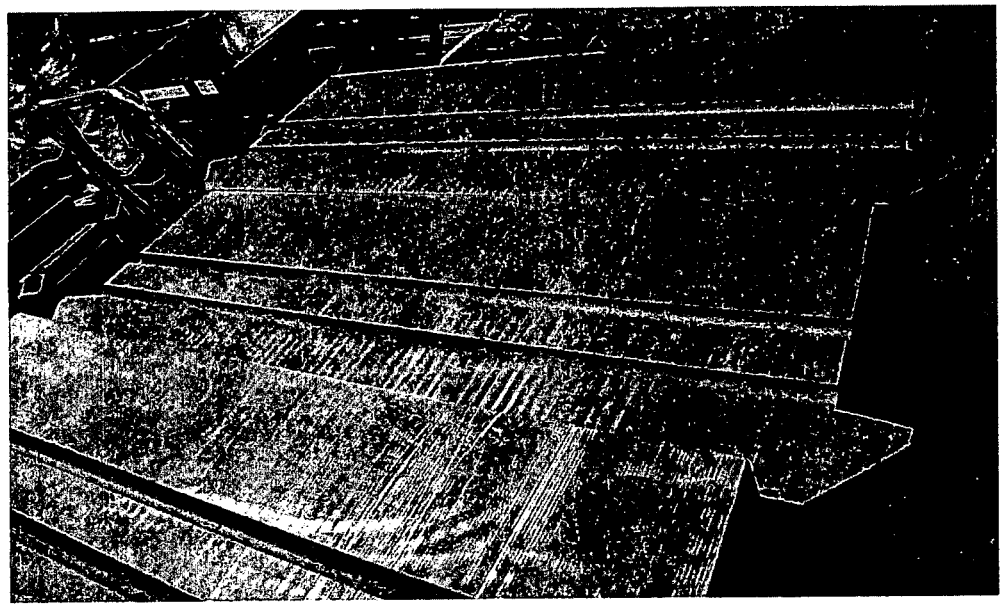
Figure 28:
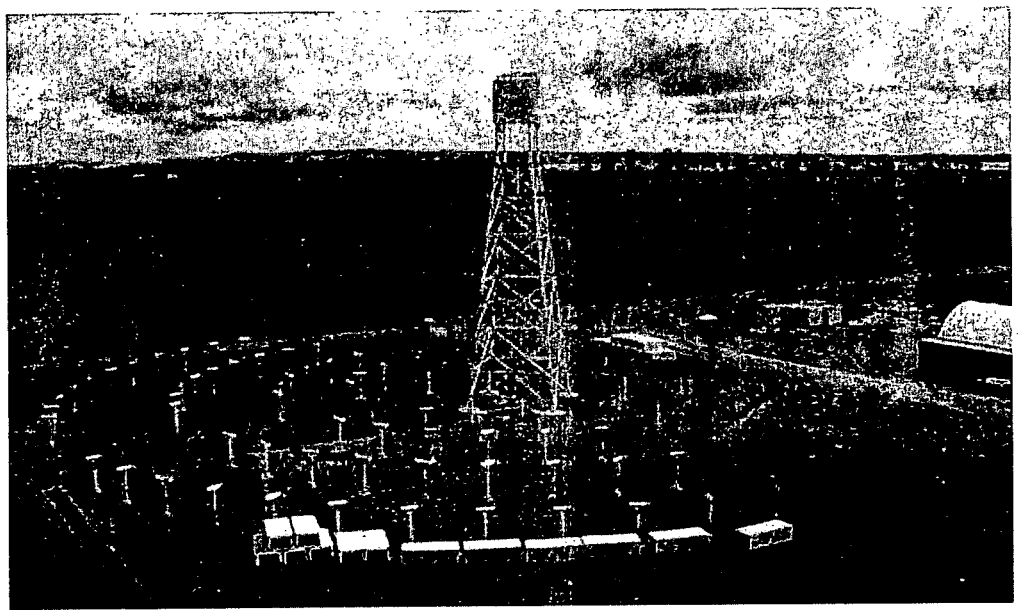

FIG. 22 shows a view of the top of the collector, illustrating the outlet manifold into which the outlet tubes from the heat exchanger open. FIG. 23 shows how two pairs of heat exchanger tubing are arranged on each face of the assembly, and how the heat exchanger tubing fits into tubular holes between two slabs formed from two complementary semicircular cross-section grooves in the two slabs. A corner expansion gap between slabs to allow for thermal expansion in use can also be seen. FIG. 24 shows a view into the cavity from below. Insulation on the shield can be seen. FIG. 25 shows a view of the collector from below. The shield below the collector can be readily seen, as can the insulation provided on the four vertical poles which support the collector. Additionally there is insulation on vertical shafts of at the top of the tower to protect them from stray solar radiation. FIG. 26 shows the plug capable of fitting into the shield aperture when the reflectors are in non-collecting orientations. The plug is mounted on a plug insertion mechanism, in this instance in the form of a scissor lift. Reflectors, in a non-collecting substantially horizontal orientation, may be seen in the background. FIG. 27 shows a stack of slabs of heat regulating medium. This illustrates a suitable shape for the slabs, and shows the grooves in the face of the slab into which heat exchanger tubing will be fitted. FIG. 28 shows a solar collector on top of a tower and surrounded by an as array of reflectors for collecting solar energy and directing it to the collector. This shows the reflectors in a series of concentric circles, and also shows the corridors in the array in which there are no reflectors, so as to avoid directing solar radiation to the poles which support the collector on the tower, thereby reducing the possibility of damage to the poles.

Figure 28A:

FIG. 28A depicts the heated heat transfer fluid as being steam which is directly output from manifold 1335 in the solar collector depleted in FIGS. 13A and 13B or manifold 1545 depicted in FIG. 15 into output tube 2801 from which it emerges as steam that may be used as required.

Figure 28B:
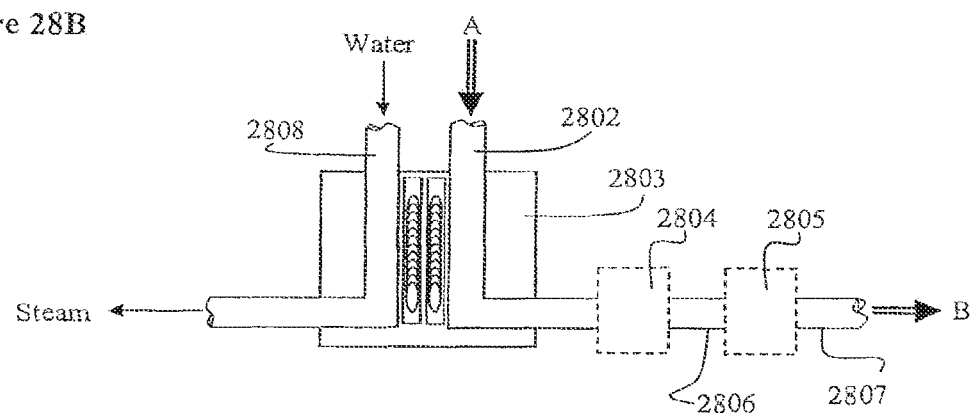

FIG. 28B shows the heated heat transfer fluid (which may be steam or an inert or non inert gas) directly output from manifold 1335 in the solar collector depicted in FIGS. 13A and 13B or manifold 1545 depicted in FIG. 15 into tube 2802 which is in thermal communication with and passes through second heat exchanger 2803. Tube 2802 is coupled to cooler 2804 which in turn is coupled to compressor 2805 (which may be a blower or fan) by tube 2806. Tube 2807 couples compressor 2805 to inlet B. Tube 2808 is in thermal communication with and passes through second heat exchanger 2803 to steam turbine 2809. Steam turbine 2809 is coupled to electric generator 2810 (ac or dc). In use, heated transfer fluid A enters second heat exchanger 2803 via tube 2802 and water in tube 2808 also enters second heat exchanger 2803. Heated transfer fluid A may be an inert or non inert gas or it may be steam. Heated transfer fluid A may be at constant pressure and temperature or at substantially constant temperature and pressure. This may be achieved by controlling and adjusting as necessary the flow rate of heat transfer fluid into the heat regulating medium. As heat transfer fluid in tube 2802 passes through second heat exchanger 2803 it transfers its heat to water in tube 2808 thereby converting it to steam. Because heat transfer fluid is at constant or substantially constant pressure and temperature the steam generated in tube 2808 for water in tube 2808 (which is also usually delivered at constant pressure and temperature) is also at constant or substantially constant pressure and temperature. Steam emerging from tube 2808 drives steam turbine 2809 which in turn drives electric generator 2810 via shaft 2811. After passing through second heat exchanger 2803 heat transfer fluid in tube 2802 passes into cooler 2804 where it is cooled and then passes into compressor 2805 via, tube 2806 where it is compressed. The cooled and compressed heat transfer fluid is then recycled to inlet B via tube 2807.

Figure 28C:
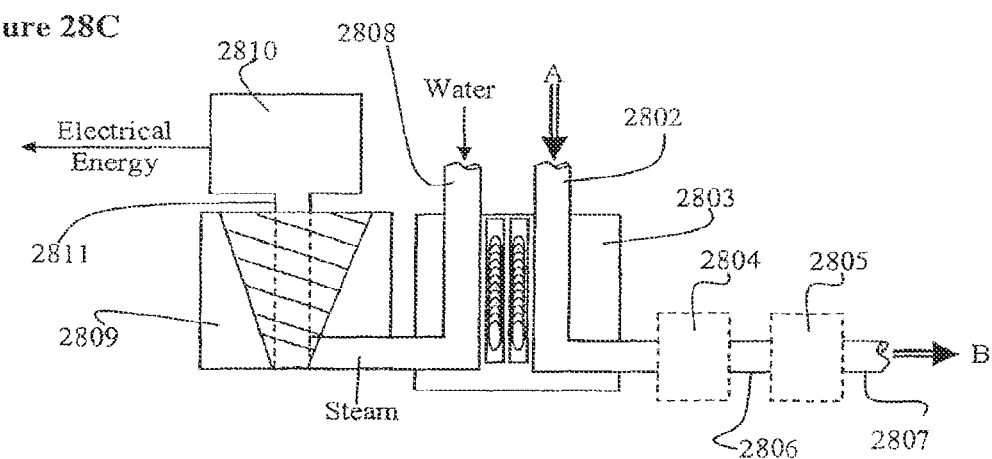
Figure 28D:
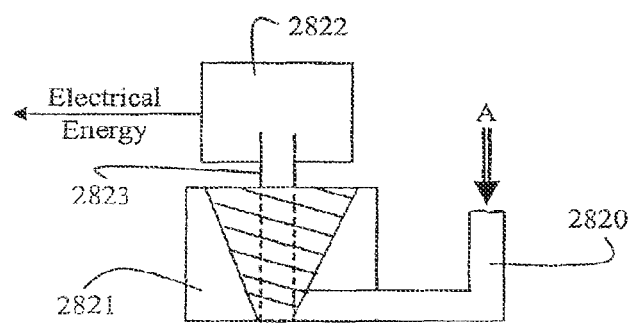

FIG. 28C shows the heated heat transfer fluid directly output from manifold 1335 in the solar collector depicted in FIGS. 13A and 13B or manifold 1545 depicted in FIG. 15 into tube 2820 which passes to steam turbine 2821. Steam turbine 2821 is coupled to electric generator 2822 (ac or dc) via shaft 2823. In use, heated transfer fluid A enters tube 2820 at a constant pressure and temperature or at substantially constant temperature and pressure. This may be achieved by controlling and adjusting as necessary the flow rate of heat transfer fluid into the heat regulating medium (which may be synthetic graphite or non synthetic graphite, for example). Heat transfer fluid A (which is steam or in other embodiments may be an inert or non-inert gas) emerging from tube 2820 drives steam turbine 2821 (or gas turbine 2821 when heat transfer fluid A is an inert or non inert gas) which in turn drives electric generator 2822 via shaft 2823.

Figure 29A:
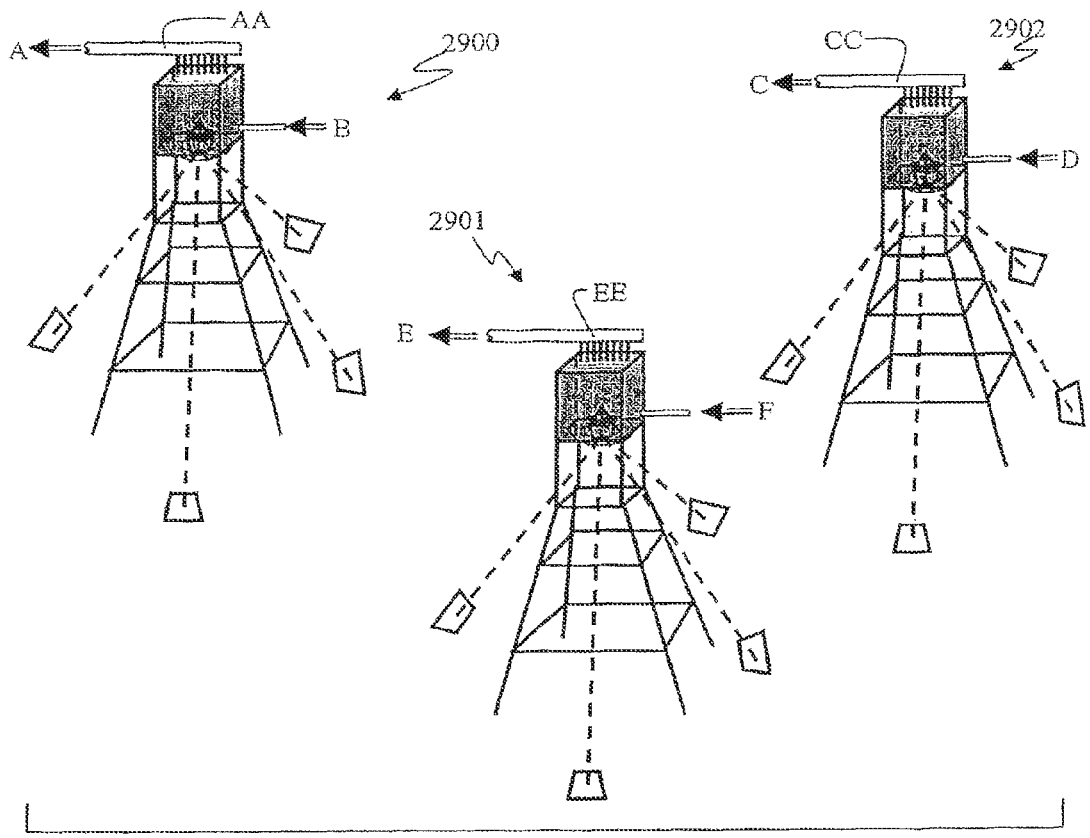

FIG. 29A depicts three solar collectors 2900, 2901 and 2902 of the invention outputting heated heat transfer fluids A, E and C respectively (there could be e.g. 2, 3, 4, 5, 6, 7, 8, 9, 10, 11, 12, 13, 14, 15, 16, 17, 18, 19, 20, 25, 30, 35, 40, 45, 50, 60, 70, 80, 90, or 100 or more collectors—3 collectors are described in here to illustrate various configurations) from manifolds AA, EE and CC respectively. Collectors 2900, 2901 and 2902 are each essentially the same as that described in detail in FIGS. 13 A and 13B (or alternatively could be as described in detail with reference to FIG. 15 or could be a combination of the towers of FIGS. 13A and 13B and FIG. 15 or variations thereof).

Figure 29B:
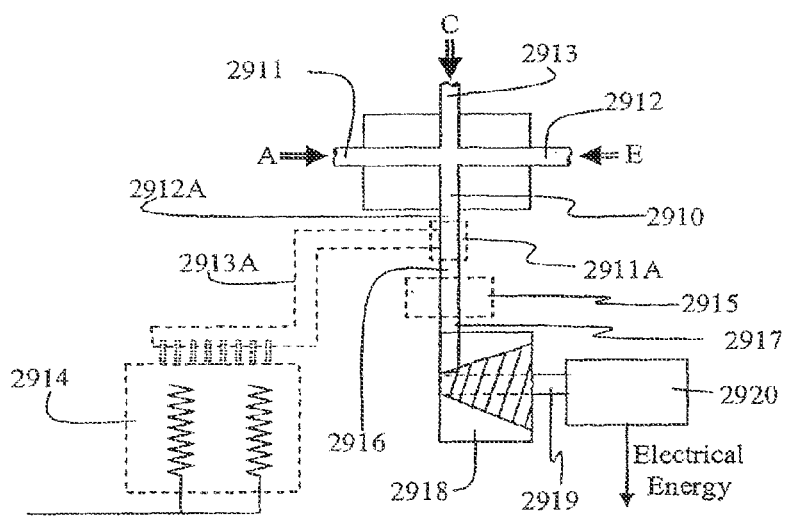

As depicted in FIG. 29B heated heat transfer fluids A, E and C from FIG. 29A combine in manifold 2910 via input tubes 2911, 2912 and 2913 to form a combined heated heat transfer fluid in manifold 2910.

Combined heated heat transfer fluid from manifold 2910 may be mixed with additional heat transfer fluid from tube 2913A in optional manifold 2911A which coupled to manifold 2910 via tube 2912A. Alternatively combined heated heat transfer fluid from manifold 2910 may be heated with additional heat transfer fluid from tube 2913A in thermal communication with optional heat exchanger 2911A (in place of optional manifold 2911A) which is coupled to manifold 2910 via tube 2912A. Additional heated heat transfer fluid in tube 2913A may be sourced from a heat storage apparatus 2914 which may comprise a heat regulating medium, a heat exchanger comprising tubes for evaporating or heating a working fluid contained therein, the tubes being in thermal communication with the heat regulating medium, to recover heat stored in the heat regulating medium and one or more electrical resistors operatively associated with the heat regulating medium to heat the heat regulating medium—examples of such heat storage apparatus are described in WO2005088218 the contents of which are incorporated by cross reference. Electricity used to heat heat storage apparatus 2914 may be of peak electricity or electricity from a renewable source such as windpower from a windmill or solar energy via a solar energy electrical conversion apparatus or hydroelectric power or electrical energy from tidal power or electrical energy derived from a geothermal source of heat.

Heated heat transfer fluid from 2911A. may pass thorough optional atempecator 2915 via tube 2916 where it may be cooled to a desired temperature by spraying droplets of water through the heated heat transfer fluid. Tube 2917 is coupled to steam turbine 2918 and atemperator 2915. Steam turbine 2918 is coupled to electric generator 2920 (ac or dc) via shaft 2919. In use, heated heat transfer fluids A, B and C (which may be gas or steam) enter manifold 2911, 2912 and 2913 to form a heated combined heat transfer fluid.

The combined heat transfer fluid may be combined with an additional heated heat transfer fluid in optional manifold 2911A or if an optional second heat exchanger 2911A is used in place of manifold 2911A, the combined heat transfer fluid may be heated to a desired temperature Thereafter the temperature of the combined heated transfer fluid may be adjusted in atemperator 2915. Combined heated transfer fluid in tube 2917 may be at constant pressure and temperature or at substantially constant temperature and pressure. This may be achieved by controlling and adjusting as necessary the flow rate of heat transfer fluid into the heat regulating mediums of collectors 2900, 2901 and 2902 as required. Steam emerging from tube 2917 drives steam turbine 2918 which in turn drives electric generator 2920 (which may be ac or de) via shaft 2919.

Figure 29C:
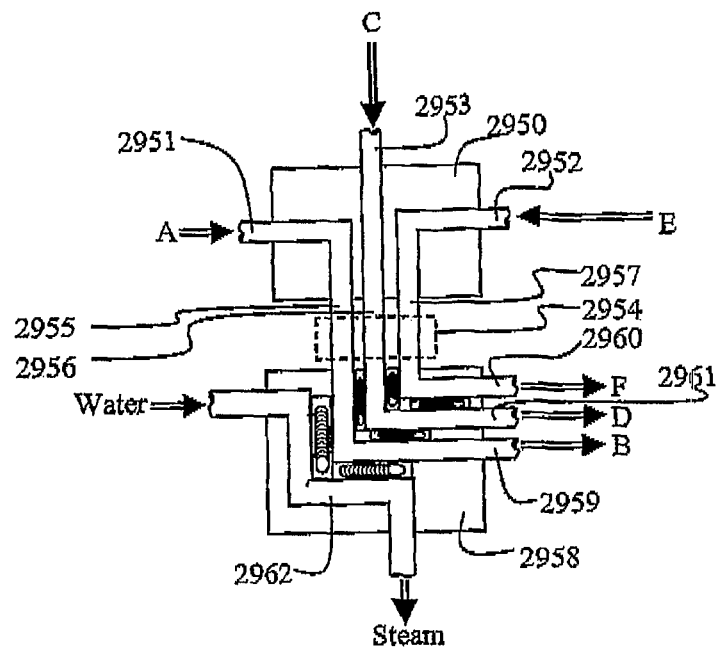

As depicted in FIG. 29C heated heat transfer fluids A, E and C from FIG. 29A pass through support block 2950 via input tubes 2951, 2952 and 2953 into optional atemperator 2954 via tubes 2955, 2956 and 2957 where the temperatures of heated heat transfer fluids A, E and C may be adjusted (i.e. cooled) as necessary. The temperature adjusted heated heat transfer fluids A, E and C then passes through heat exchanger 2958 in tubes 2959, 2960 and 2961 which are in thermal communication with heat exchanger 2958. As heat transfer fluid in tubes 2959, 2960 and 2961 pass through heat exchanger 2958 it transfers its heat to water in tube 2962 thereby converting it to steam. The heat transfer fluids in tubes 2959, 2960 and 2961 may be at constant or substantially constant pressure and temperature in which case the steam generated in tube 2962 (which is also usually delivered at constant pressure and temperature) is also at constant or substantially constant pressure and temperature. Steam emerging from tube 2962 may be used for any desired use such as an industrial use or to drive a steam turbine (not shown) which in turn may drive an electric generator (not generator). After passing through heat exchanger 2958 heat transfer fluid in tubes 2959, 2960 and 2961 may passes into coolers (not shown) where they are cooled and then passes into compressors (not shown) where they are compressed. The cooled and compressed heat transfer fluid may be then recycled to inlets B, F and D respectively of the collectors of FIG. 29A.

Figure 29D:
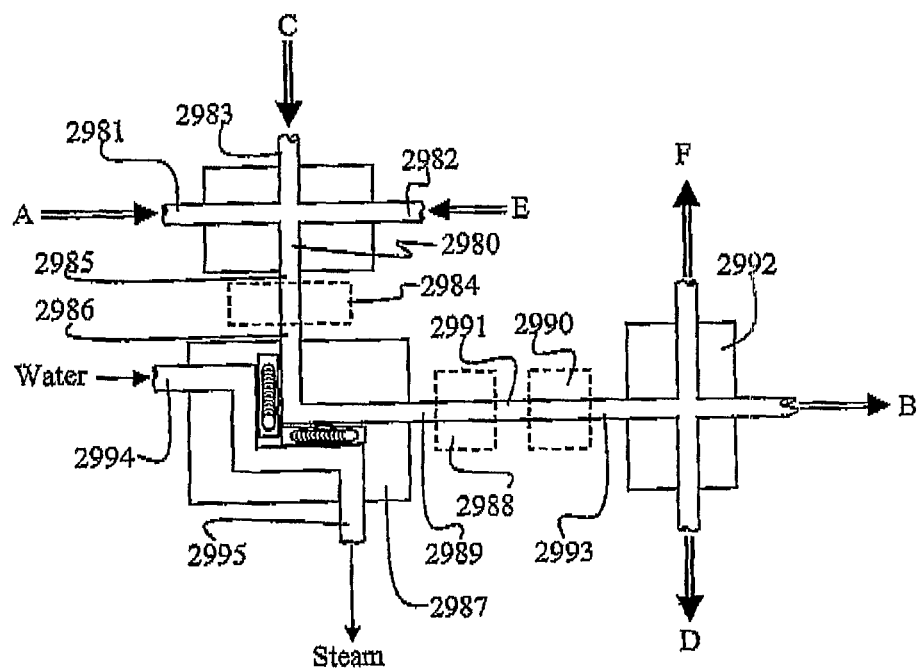

As depicted in FIG. 29D heated heat transfer fluids A, B and C from FIG. 29A combine in manifold 2980 via input tubes 2981, 2982 and 2983 to form a combined heated heat transfer fluid in manifold 2980. Combined heated heat transfer fluid from manifold 2980 may pass thorough optional atemperator 2984 via tube 2985 where it may be cooled to a desired temperature by spraying droplets of water trough the combined heated heat transfer fluid. Tube 2986 is coupled to heat exchanger 2987 and atemperator 2984 and is in thermal communication with heat exchanger 2987. Heat exchanger 2987 is coupled to cooler 2988 via tube 2989. Compressor 2990 is coupled to cooler 2988 by tube 2991. Splitter 2992 is coupled to compressor 2990 by tube 2993. Heat exchanger 2987 has tube 2994 which is thermal communication with heat exchanger 2987. In use, heated heat transfer fluids A, E and C (which may be gas or steam) enter manifolds 2981, 2982 and 2983 to form a heated combined heat transfer fluid. Thereafter the temperature of the combined heated transfer fluid may be adjusted in atemperator 2984. Combined heated transfer fluid in tube 2986 may be at constant pressure and temperature or at substantially constant temperature and pressure. This may be achieved by controlling and adjusting as necessary the flow rate of heat transfer fluid into the heat regulating mediums of collectors 2900, 2901 and 2902 as required. Heat is transferred in heat exchanger 2987 from combined heated heat transfer fluid in tube 2986 to water in tube 2994 to form steam which is output from heat exchanger 2987. The output steam may be at constant pressure and temperature or at substantially constant temperature and pressure. Steam emerging from tube 2995 may be used as steam as required or it may be used to drive a steam turbine (not shown) which in turn may drive an electric generator (not shown—which may be ac or dc) via a shaft (not shown). The combined heat transfer fluid on emerging from heat exchanger 2987 passes via tube 2989 to cooler 2988 where it is cooled to a desired temperature and thence to compressor 2990 (where it is compressed) and thereafter to splitter 2992 which splits the combined heat transfer fluid into heat transfer fluids B, F and D which are recycled to the respective inlets of the collectors 2900, 2901 and 2902 as shown in FIG. 29A.

The invention claimed is:

1. A solar collector comprising:
   a heat regulating medium defining a cavity therein and having an aperture communicating with the cavity for allowing solar energy incident on the aperture to enter the cavity through the aperture, said heat regulating medium being disposed within a housing;
   a gas that does not substantially react with the heat regulating medium at the maximum operating temperature of the medium and/or a low pressure atmosphere within the housing;
   an energy collection device disposed in the cavity and in thermal contact with the heat regulating medium to collect solar energy entering the cavity; and
   a heat exchanger in thermal contact with the heat regulating medium;
wherein the heat regulating medium comprises graphite, graphite particles embedded in a thermally conductive matrix, pure carbon or a mixture of any two or more of these, wherein the heat regulating medium is formed from a plurality of adjoining heat regulator slabs, at least some of which having grooves therein, and wherein heat exchanger tubing is disposed within the grooves.

2. The solar collector of claim 1, wherein the energy collection device is in physical contact with the heat regulating medium.

3. The solar collector of claim 1, wherein the energy collection device is a layer having a thickness of about 1 to about 10 mm.

4. The solar collector of claim 1 comprising a protective layer on a surface of the energy collection device abutting the cavity.

5. The solar collector of claim 1, wherein the heat exchanger tubing is capable of accepting a heat transfer fluid, said tubing being at least partly embedded in the heat regulating medium, wherein different portions of the tubing are embedded in the heat regulating medium at different distances from the energy collection device.

6. The solar collector of claim 1, wherein the heat exchanger tubing is coupled to a source of water and wherein, in use, the water is converted in the tubing to steam, said tubing being capable of withstanding an internal steam pressure of up to a pressure between about 10 and about 100 bar.

7. The solar collector of claim 1 additionally comprising a thermally insulating layer at least partially surrounding the heat regulating medium, wherein the insulating layer comprises either: a thermally insulating solid having pores and/or voids, said pores and/or voids including the gas therein, or an at least partial vacuum to insulate the heat regulating medium.

8. The collector of claim 1, wherein the collector has facility for absorbing energy from a source other than solar energy.

9. The solar collector of claim 1 comprising a shield disposed below the housing for protecting a lower portion of the housing from damage, said shield having a shield aperture for allowing solar energy to pass through the shield into the cavity, wherein the shield and the housing are separated by a gap.

10. The solar collector of claim 1 comprising a removable plug for inhibiting reirradiation from the cavity.

11. The solar collector of claim 10 comprising a plug insertion mechanism for inserting and removing the plug, wherein the plug insertion mechanism is coupled to a module controller, said module controller being configured to control the plug insertion mechanism so as to insert the plug at times when solar energy ceases to be directed to the aperture and to remove the plug at times shortly before solar energy commences to be directed to the aperture.

12. A solar energy collection device comprising:
   a solar collector comprising (i) a heat regulating medium defining a cavity therein and having an aperture communicating with the cavity for allowing solar energy incident on the aperture to enter the cavity through the aperture, said heat regulating medium being disposed within a housing; (ii) a gas that does not substantially react with the heat regulating medium at the maximum operating temperature of the medium and/or a low pressure atmosphere within the housing; (iii) an energy collection device disposed in the cavity and in thermal contact with the heat regulating medium to collect solar energy entering the cavity; and (iv) a heat exchanger in thermal contact with the heat regulating medium; wherein the heat regulating medium comprises graphite, graphite particles embedded in a thermally conductive matrix, pure carbon or a mixture of any two or more of these, wherein the heat regulating medium is formed from a plurality of adjoining heat regulator slabs, at least some of which having grooves therein, and wherein heat exchanger tubing is disposed within the grooves; and
   a solar energy concentrator capable of concentrating solar energy and disposed so as to be capable of directing the concentrated solar energy through the aperture of the solar collector and into the cavity.

13. The solar energy collection device of claim 12, wherein the concentrator comprises:
   an array of reflectors;
   a tracking device for moving the reflectors so as to direct the concentrated solar energy through the aperture of the solar collector and into the cavity thereof; and
   a support structure on which the solar collector is mounted, wherein the support structure comprises a tower and the solar collector is mounted on said tower by means of at least three substantially vertical poles and said array comprising one corridor corresponding to each of the substantially vertical poles, said corridors having no reflectors therein, whereby the array is capable of directing the concentrated solar energy between the poles and through the aperture.

14. The solar energy collection device of claim 13, wherein at least one of the poles is hollow and at least one of the following passes through a hollow pole:
   a heat transfer fluid passing into the heat exchanger tubing of the solar collector;
   steam or hot water formed in the heat exchanger tubing of the solar collector;

electrical connections for conveying a signal from one or more thermocouples in the solar collector to a module controller; and connections for conveying a signal to a plug insertion mechanism to insert or remove the plug.

15. The solar energy collection device of claim 12 comprising a module controller for controlling the operation of the solar collection device, said module controller being capable of controlling at least one of:

movement of the solar collection device so as to direct the concentrated solar energy through the aperture of the solar collector and into the cavity, or so as to place the solar collection device, or at least one reflector of said solar collection device, in a non-collecting orientation if required;

insertion or removal of a plug into the aperture or into a shield aperture;

water inflow into the collector; and hot water or steam outflow from the collector.

16. The solar energy collection device of claim 15, wherein the solar collector comprises at least one thermocouple for determining a temperature within the solar collector, whereby the thermocouple(s) is (are) configured to provide a temperature related signal to the module controller for controlling the operation of the solar collection device.

17. The solar energy collection device of claim 12, wherein the heat exchanger is coupled to an electricity generator which is capable of being powered by a heated heat transfer fluid, so that, in use, solar energy incident on the aperture of the collector is transmitted in the form of heat to a heat transfer fluid in the heat exchanger, which heat exchange fluid is transferred to the electricity generator so as to generate electricity.

18. A solar energy collection system comprising:

a plurality of solar energy collectors, each comprising (i) a heat regulating medium defining a cavity therein and having an aperture communicating with the cavity for allowing solar energy incident on the aperture to enter the cavity through the aperture, said heat regulating medium being disposed within a housing; (ii) a gas that does not substantially react with the heat regulating medium at the maximum operating temperature of the medium and/or a low pressure atmosphere within the housing; (iii) an energy collection device disposed in the cavity and in thermal contact with the heat regulating medium to collect solar energy entering the cavity; and (iv) a heat exchanger in thermal contact with the heat regulating medium; wherein the heat regulating medium comprises graphite, graphite particles embedded in a thermally conductive matrix, pure carbon or a mixture of any two or more of these, wherein the heat regulating medium is formed from a plurality of adjoining heat regulator slabs, at least some of which having grooves therein, and wherein heat exchanger tubing is disposed within the grooves;

at least one solar energy concentrator; and a station controller for controlling the solar energy collection collectors and/or the solar energy concentrator(s);

wherein said controller is coupled to the solar energy concentrator(s) so as to increase or decrease the total solar energy input to the solar energy collectors as required and wherein each solar energy collector is disposed so as to be capable of receiving concentrated solar energy from at least one solar energy concentrator.

19. A method for collecting and regulating solar energy, said method comprising:

providing a solar energy collection device comprising (A) a solar collector comprising (i) a heat regulating medium defining a cavity therein and having an aperture communicating with the cavity for allowing solar energy incident on the aperture to enter the cavity through the aperture, said heat regulating medium being disposed within a housing; (ii) a gas that does not substantially react with the heat regulating medium at the maximum operating temperature of the medium and/or a low pressure atmosphere within the housing; (iii) an energy collection device disposed in the cavity and in thermal contact with the heat regulating medium to collect solar energy entering the cavity; and (iv) a heat exchanger in thermal contact with the heat regulating medium; wherein the heat regulating medium comprises graphite, graphite particles embedded in a thermally conductive matrix, pure carbon or a mixture of any two or more of these, wherein the heat regulating medium is formed from a plurality of adjoining heat regulator slabs, at least some of which having grooves therein, and wherein heat exchanger tubing is disposed within the grooves; and (B) a solar energy concentrator capable of concentrating solar energy and disposed so as to be capable of directing the concentrated solar energy through the aperture of the solar collector and into the cavity; and allowing solar energy to impinge on the solar energy concentrator of said device;

thereby concentrating said solar energy on the solar collector of said device so as to heat the heat regulating medium of said device.

20. The method of claim 19 comprising controlling the solar energy concentrator so as to direct concentrated solar energy into the aperture, wherein the solar energy concentrator comprises an array of reflectors and wherein the step of controlling comprises detecting a temperature at a position within the solar energy collector and orienting at least one of said reflectors to a non-collecting orientation so as to prevent said temperature exceeding a predetermined upper limit.

21. The method of claim 19 additionally comprising the steps of:

a) controlling the solar energy concentrator so that said concentrator is in a non-collecting orientation; and b) inserting a plug so as to restrict loss of heat from the cavity of the solar energy collector;

when it is desired not to collect solar energy.

22. The method of claim 21 additionally comprising the steps of:

c) removing the plug so as to allow concentrated thermal energy to enter the cavity through the aperture; and d) controlling the solar energy concentrator so that said concentrator is in a collecting orientation in which it directs concentrated solar energy through the aperture into the cavity;

when it is again desired to collect solar energy.

23. The method of claim 19, wherein said solar energy collection device forms part of a solar energy collection system, said system comprising:

a plurality of solar energy collectors, each comprising (i) a heat regulating medium defining a cavity therein and having an aperture communicating with the cavity for allowing solar energy incident on the aperture to enter the cavity through the aperture, said heat regulating medium being disposed within a housing; (ii) a gas that does not substantially react with the heat regulating medium at the maximum operating temperature of the medium and/or a low pressure atmosphere within the housing; (iii) an energy collection device disposed in the cavity and in thermal contact with the heat regulating medium to collect solar energy entering the cavity; and (iv) a heat exchanger in thermal contact with the heat regulating medium; wherein the heat regulating medium comprises graphite, graphite particles embedded in a thermally conductive matrix, pure carbon or a mixture of any two or more of these, wherein the heat regulating medium is formed from a plurality of adjoining heat regulator slabs, at least some of which having grooves therein, and wherein heat exchanger tubing is disposed within the grooves;

at least one solar energy concentrator; and a station controller for controlling the solar energy collection collectors and/or the solar energy concentrator(s), wherein said controller is coupled to the solar energy concentrator(s) so as to increase or decrease the total solar energy input to the solar energy collectors as required and, wherein each solar energy collector is disposed so as to be capable of receiving concentrated solar energy from at least one solar energy concentrator, said system having a single system output, said method comprising controlling the solar energy collection devices of said solar energy collection system by means of the station controller, said controlling comprising switching one or more of said devices on or off as required to obtain a desired quality of system output.

24. A method for preparing a solar collector, said collector comprising (i) a heat regulating medium defining a cavity therein and having an aperture communicating with the cavity for allowing solar energy incident on the aperture to enter the cavity through the aperture, said heat regulating medium being disposed within a housing; (ii) a gas that does not substantially react with the heat regulating medium at the maximum operating temperature of the medium and/or a low pressure atmosphere within the housing; (iii) an energy collection device disposed in the cavity and in thermal contact with the heat regulating medium to collect solar energy entering the cavity; and (iv) a heat exchanger in thermal contact with the heat regulating medium; wherein the heat regulating medium comprises graphite, graphite particles embedded in a thermally conductive matrix, pure carbon or a mixture of any two or more of these, wherein the heat regulating medium is formed from a plurality of adjoining heat regulator slabs, at least some of which having grooves therein, said method comprising:

providing the heat exchanger tubing, the tubing comprising a plurality of parallel tubing portions disposed around an energy collection device and mounted on a base, said energy collection device comprising four vertical rectangular panels arranged in a square and a square top attached to an upper horizontal edge of the four vertical panels; and assembling between said tubing portions the plurality of slabs of the heat regulating medium such that the heat regulating medium contacts the four outer vertical faces and the top of the energy collection device, and such that the tubing is disposed within the grooves of the heat regulator slabs.

25. The method of claim 24 additionally comprising locating the energy collection device, assembled within a housing and sealing said housing to a lower rim of the energy collection device.

* * * * *